United States Patent [19]
Sander

[11] 4,383,296
[45] May 10, 1983

[54] COMPUTER WITH A MEMORY SYSTEM FOR REMAPPING A MEMORY HAVING TWO MEMORY OUTPUT BUSES FOR HIGH RESOLUTION DISPLAY WITH SCROLLING OF THE DISPLAYED CHARACTERS

[75] Inventor: Wendell B. Sander, San Jose, Calif.

[73] Assignee: Apple Computer, Inc., Cupertino, Calif.

[21] Appl. No.: 150,630

[22] Filed: May 16, 1980

[51] Int. Cl.³ .......................... G06F 13/06; G06F 3/14
[52] U.S. Cl. ..................................... 364/200; 340/726; 340/799
[58] Field of Search ... 364/200 MS File, 900 MS File; 340/726, 798, 799; 358/17

[56] References Cited

U.S. PATENT DOCUMENTS

| | | | |
|---|---|---|---|
| 3,821,730 | 6/1974 | Carey et al. | 340/799 X |
| 3,893,075 | 7/1975 | Orban et al. | 340/799 X |
| 3,903,510 | 9/1975 | Zobel | 340/726 X |
| 3,980,992 | 9/1976 | Levy et al. | 364/200 |
| 4,136,359 | 1/1979 | Wozniak | 358/17 |
| 4,150,364 | 4/1979 | Baltzer | 364/900 X |

FOREIGN PATENT DOCUMENTS

| | | |
|---|---|---|
| 1351590 | 5/1974 | United Kingdom . |
| 1482819 | 8/1977 | United Kingdom . |
| 1496563 | 12/1977 | United Kingdom . |
| 1524873 | 9/1978 | United Kingdom . |

*Primary Examiner*—Raulfe B. Zache
*Attorney, Agent, or Firm*—Blakely, Sokoloff, Taylor & Zafman

[57] ABSTRACT

A microcomputer system with video display capability, particularly suited for small business applications and home use is described. The CPU performance is enhanced by permitting zero page data to be stored throughout the memory. The circuitry permitting this capability also provides a pointer for improved direct memory access. Through unique circuitry resembling "bank switching" improved memory mapping is obtained. Four-bit digital signals are converted to an AC chroma signal and a separate luminance signal for display modes. Display modes include high resolution modes, one of which displays 80 characters per line.

22 Claims, 9 Drawing Figures

COMPUTER WITH A MEMORY SYSTEM FOR REMAPPING A MEMORY HAVING TWO MEMORY OUTPUT BUSES FOR HIGH RESOLUTION DISPLAY WITH SCROLLING OF THE DISPLAYED CHARACTERS

BACKGROUND OF THE INVENTION

The invention relates to the field of digital computers, particularly microcomputers, having video display capabilities.

Prior Art

In the last few years, there has been rapid growth in the use of digital computers in homes by hobbyists, for small business and for routine engineering and scientific application. For the most part, these needs have been met with self-contained, relatively inexpensive microcomputers or microprocessors with essential peripherals, including disc drives and with relatively easy to manage computer programs. The design for computers for these needs requires considerable ingenuity since each computer must meet a wide range of applications and because this market is particularly cost conscious.

A home or small business computer must, for example, operate with a number of different program languages, including those requiring relatively large memories, such as Pascal. The computer should interface with a standard raster scanned display and provide a wide range of display capabilities, such as high density alpha-numeric character displays needed for word processing in addition to high resolution graphics displays.

To meet these specialize computer needs, generally requires that a relatively inexpensive microprocessor be used and that the capability of the processor be enhanced through circuit techniques. This reduces the overall cost of the computer by reducing, for example, power needs, bus structures, etc. Another important consideration is that the new computers be capable of using programs developed for earlier models.

As will be seen, the presently described microcomputer is ideally suited for home and small business applications. It provides a wide range of capabilities including advanced display capabilities not found in comparable prior art computers.

The closest prior art computer known to applicant is commercially available under the trademark, Apple-II. Portions of that computer are described in U.S. Pat. No. 4,136,359.

SUMMARY OF THE INVENTION

A digital computer which includes a central processing unit (CPU) and a random-access memory (RAM) with interconnecting address bus and data bus is described. One aspect of the present invention involves the increased capability of the CPU by allowing base page or zero page data to be stored throughout the memory. Alternate stack locations and an improved direct memory access capability are also provided by the same circuitry. Detection means are used for detecting a predetermined address range such as the zero page. This detection means causes a special register (Z-register) to be coupled into the address bus. The contents of this Z-register provide, for example, a pointer during direct memory access, or alternate stack locations for storing data normally stored on page one.

The memory of the invented computer is organized in an unusual manner to provide compatibility with the 8-bit data bus and yet provide high data rates (16-bits/MHz) needed for high resolution displays. A first plurality of memory devices are connected to a first memory output bus; these memory devices are also connected to the data bus. The memory includes a second plurality of memory devices which are also connected to the data bus; however, the outputs of these second devices are coupled to a second output memory bus. First switching means permit the first and second memory buses to be connected to the display for high data rate transfers. Second switching means permit either one of the memory buses to be connected to the data bus during non-display modes.

The addressing capability of the memory is greatly enhanced not only through bank switching, but through a novel remapping which does not require the CPU control associated with bank switching. In effect, the "unused" bits from one of the first and second memory buses are used for remapping purposes. This mode of operation is particularly useful for providing toggling between two separate portions of the memory.

The display subsystem of the described computer generates video color signal in a unique manner. A 4-bit color code as used in the prior art, is also used with the described display subsystem. However, this code is used to generate an AC chrominance signal and a separate DC luminance signal. This provides enhanced color capability over similar prior art color displays.

BRIEF DESCRIPTION OF THE DRAWINGS

FIG. 2 is a circuit diagram primarily showing the address bus and the logic means associated with this bus.

FIG. 3 is a circuit diagram primarily showing the data bus and its interconnection with the memory buses (A bus and B bus), bootstrap read-only memory, and input/output ports.

FIG. 4 is a circuit diagram primarily showing the circuitry for selecting between address signals from the address bus and display counter signals.

FIG. 5 is a circuit diagram primarily showing the generation of various "select" signals for the memory devices.

FIG. 6 is a circuit diagram showing the organization of the random-across memory and its interconnection with the data bus and memory output buses.

FIG. 7 is a circuit diagram showing the circuitry for generating the digital signals used for the video display.

FIG. 8 is a circuit diagram of the circuitry used to convert the digital signals to analog video signals.

DETAILED DESCRIPTION OF THE INVENTION

A microcomputer system capable of driving a raster scanned video display is disclosed. In the following description, numerous specific details such as specific part numbers, clock rates, etc, are set forth to provide a thorough understanding of the present invention. However, it will be obvious to one skilled in the art that the inventive concepts described in this patent may be practiced without these specific details. In other instances, well-known circuits have been shown in block diagram form in order not to obscure the present invention in unnecessary detail.

Figure 1:
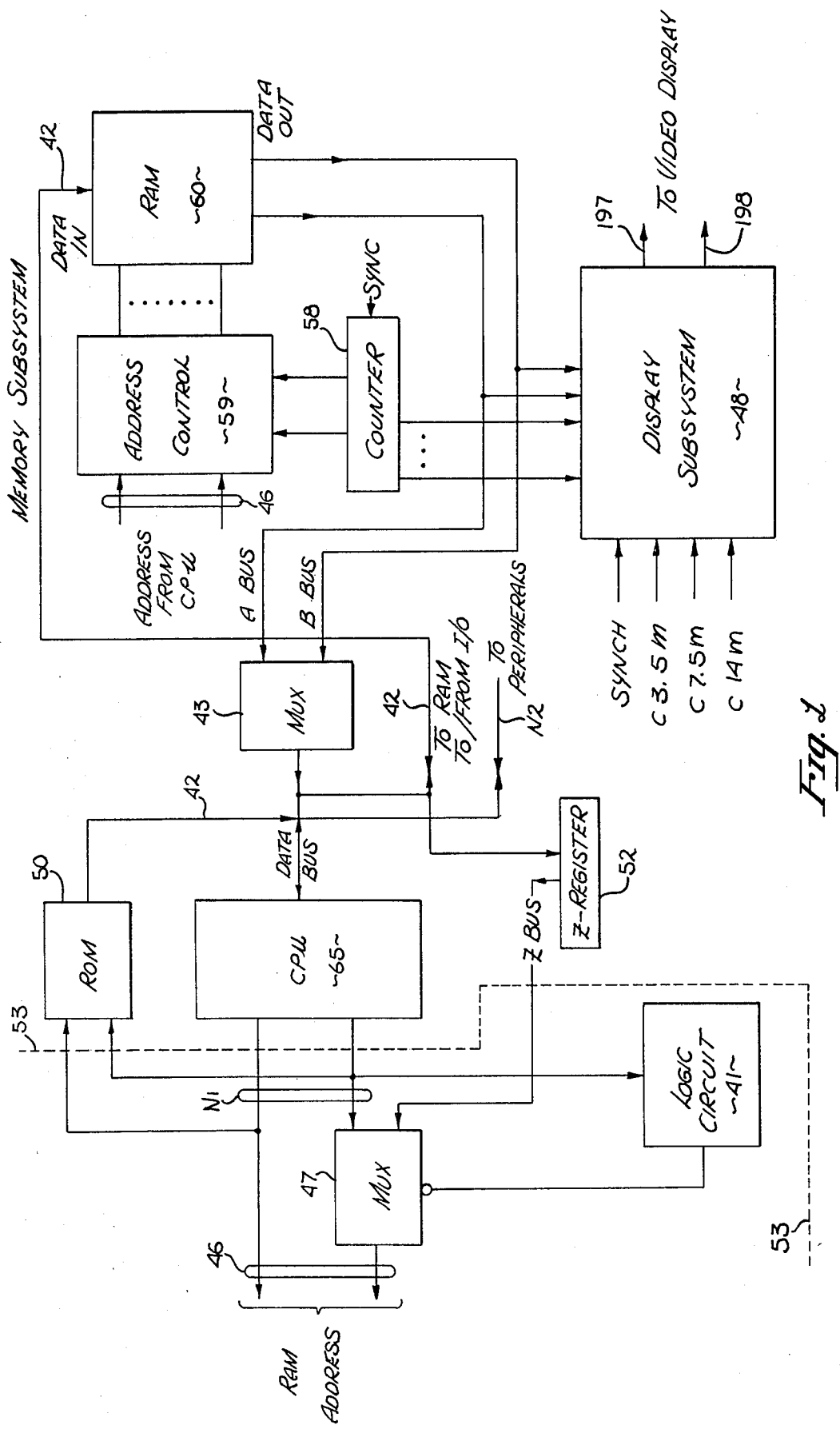
FIG. 1 is a block diagram showing the major components and subsystems of the invented and described microcomputer system.

Referring first to FIG. 1, in general the described computer includes a central processing unit (CPU) 65, its associated data bus 42, address bus 46, a memory subsystem and a display subsystem 58.

The address bus 46 from the CPU is coupled to the memory subsystem to permit the selection of locations in memory. Some of the address signals pass through a multiplexer 47. For some modes of operation, signals from a register 52 are coupled through the multiplexer 47 onto the bus 46. The register 52 is identified as the Z-register and is coupled to the multiplexer 47 by the Z bus. The general description of the multiplexer 47 and its control by the logic circuit 41 are described in detail in conjunction with FIG. 2. In general, the circuitry shown to the left of the dotted line 53 is included in FIG. 2 while the CPU 65, memory 50, data bus 42 and multiplexer 43 are shown in detail in FIG. 3.

The address bus N1 is coupled to the read-only memory 50. The output of this memory is coupled to the computer's data bus 42. The read-only memory (ROM) 50, as will be described, stores test routines, and other data of a general bootstrap nature for system initialization.

The data bus 42 couples data to the random-access memory (RAM) 60 and to and from I/O ports. This bus also couples data to the Z-register 52 and other commonly used registers not illustrated. The data bus 42 receives data from the RAM 60 through the A bus and B bus which are selected by multiplexer 43. The peripheral Bus N2 is used, as is better illustrated in FIG. 3, for coupling to peripherals.

Figure 4:
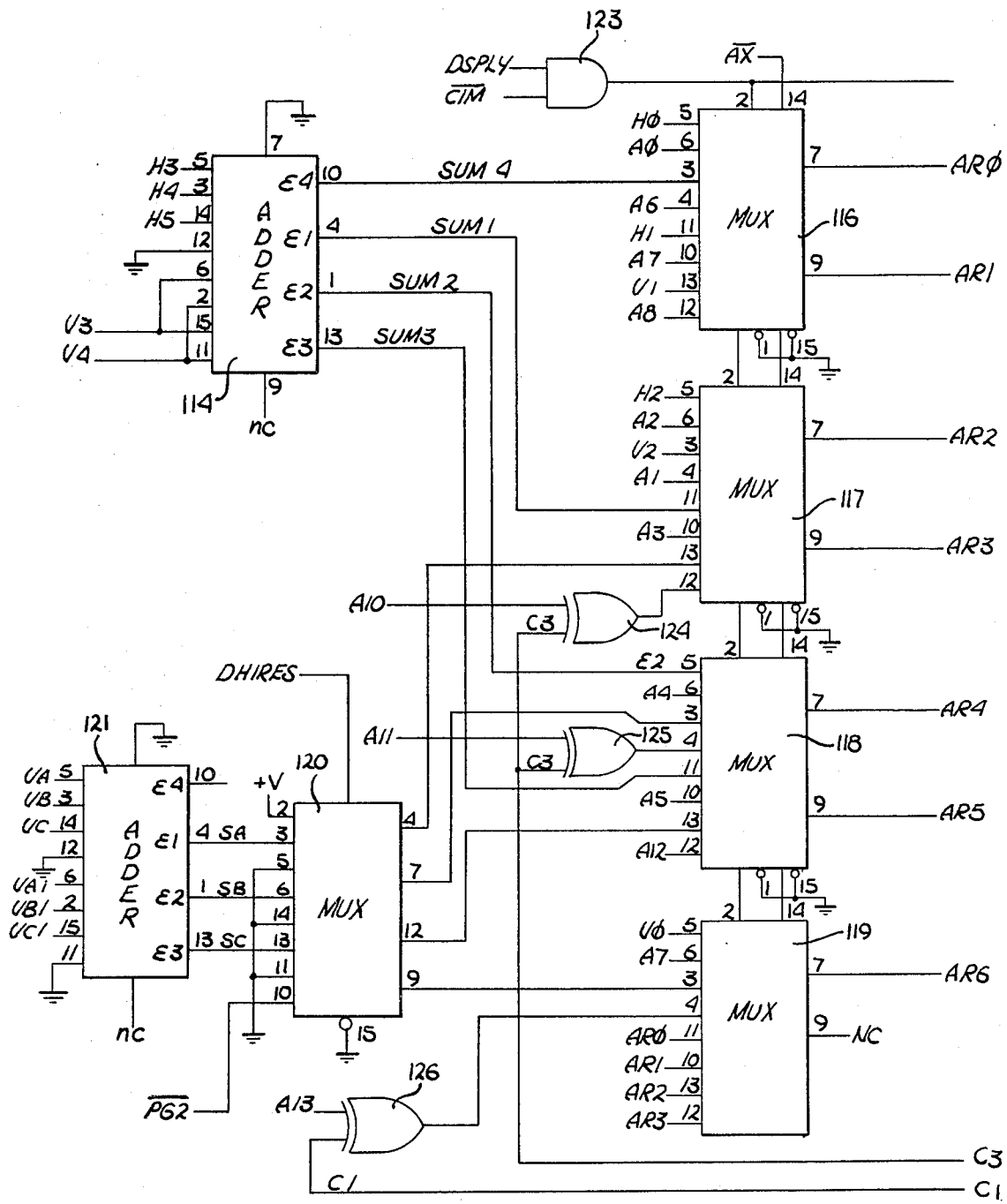
FIGS. 4, 5 and 6 show the memory subsystem.
Figure 5:
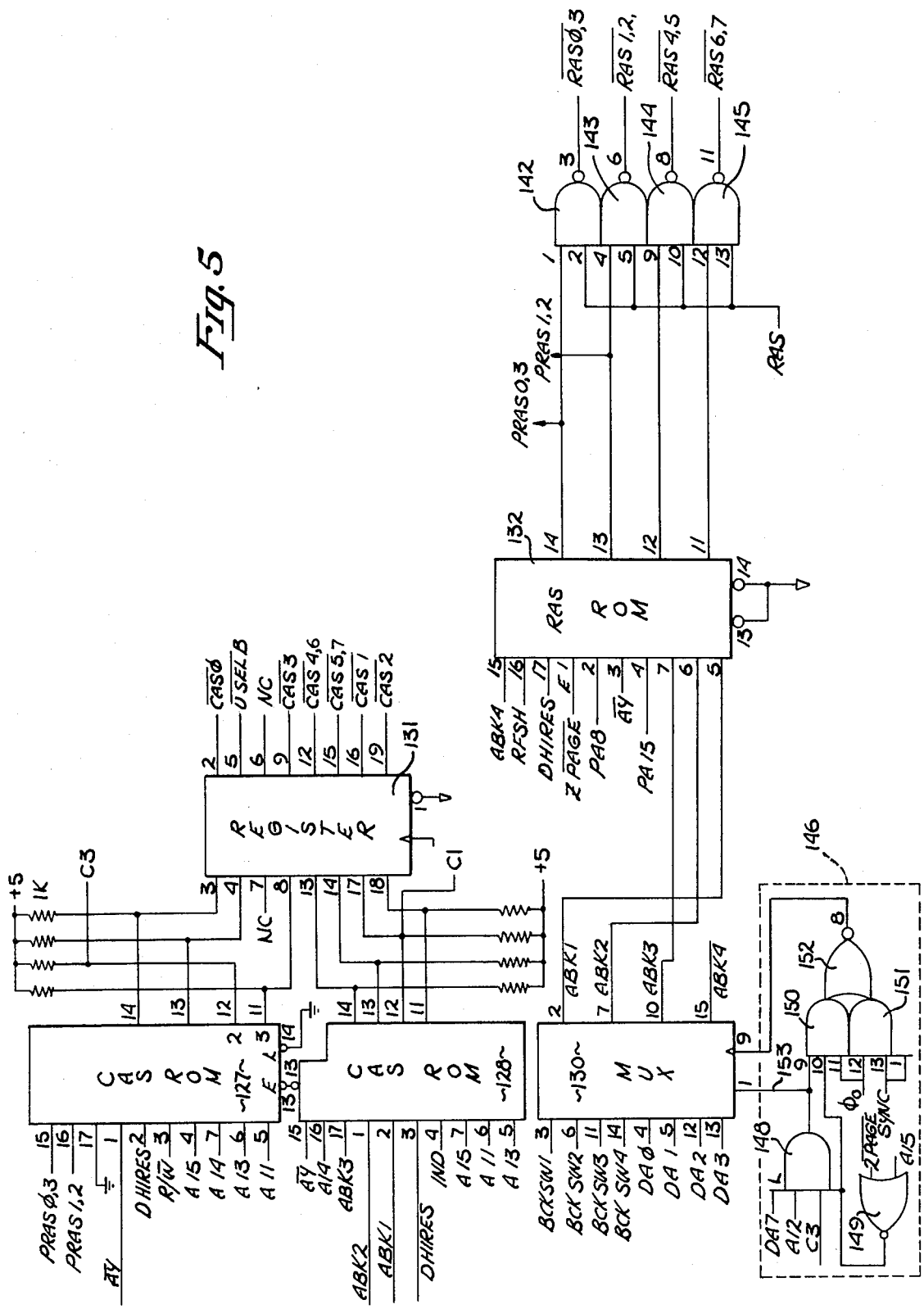
Figure 6:
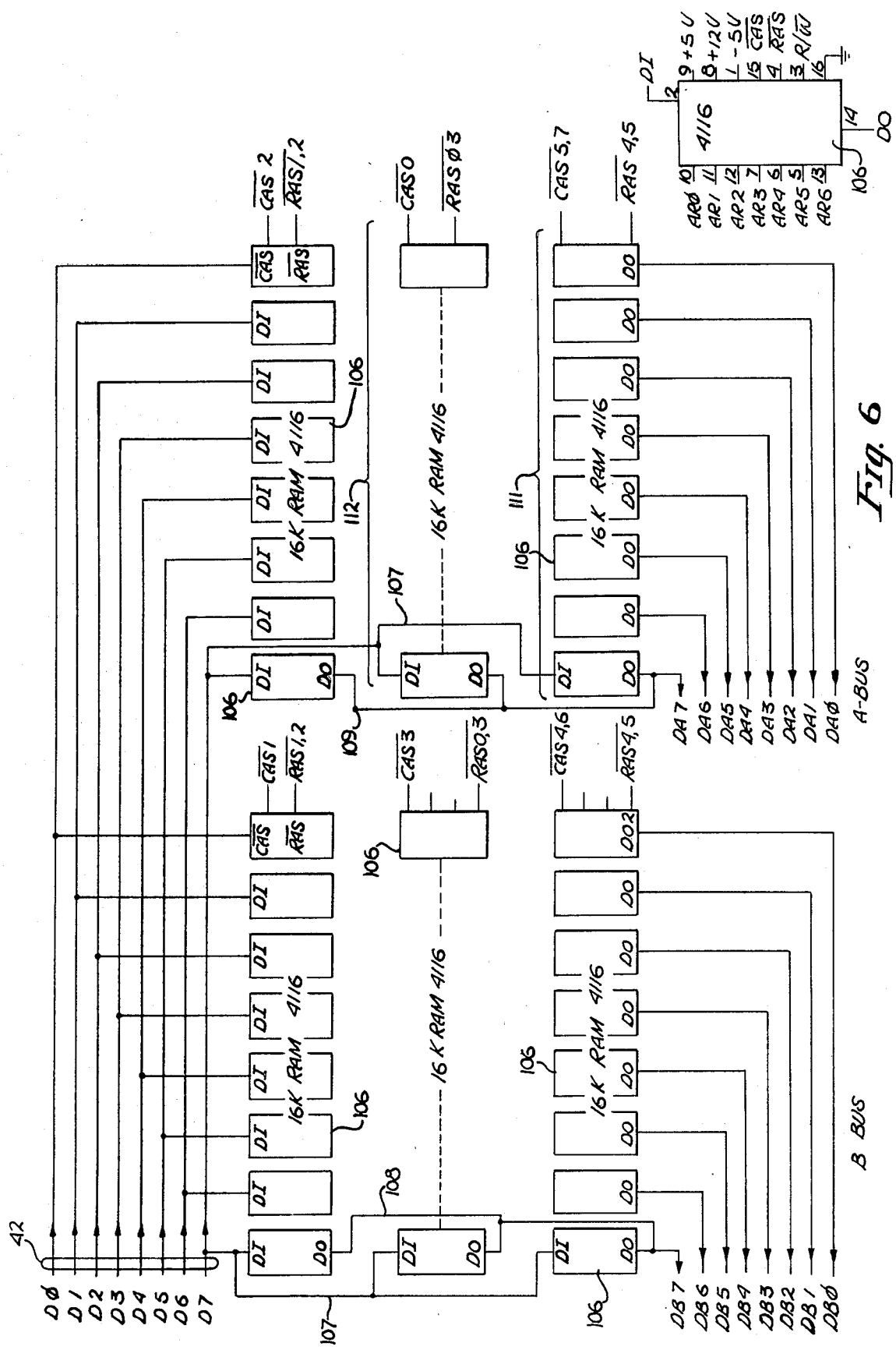

The memory subsystem is shown in detail in FIGS. 4, 5 and 6. The address control means which receives addresses on bus 46, makes the final selection of memory locations within the RAM 60. Bank switching, addressing for display purposes, scrolling and other memory mapping is controlled by the address control means 59 as will be described in greater detail in conjunction with FIGS. 4 and 5. The PAM 60 is shown in detail in FIG. 6. The counter 58 which is sychronized with the horizontal and vertical display signals, provides signals both to the address control means 59 and to the display subsystem 48.

The display subsystem receives data from the RAM 60 on the A bus and B bus and converts these digital signals to video signals which control a standard raster scanned display. A standard NTSC color signal is generated on line 197 and a black and white video signal on line 198. The same signals used to generate these video signals can be used to generate separate red, green, blue (RGB) video signals. The display subsystem 48 receives numerous timing signals including the standard color reference signal shown as 3.5 MHz (C3.5M). This subsystem is described in detail in FIGS. 7 and 8.

COMPUTER ARCHITECTURE

Figure 3:
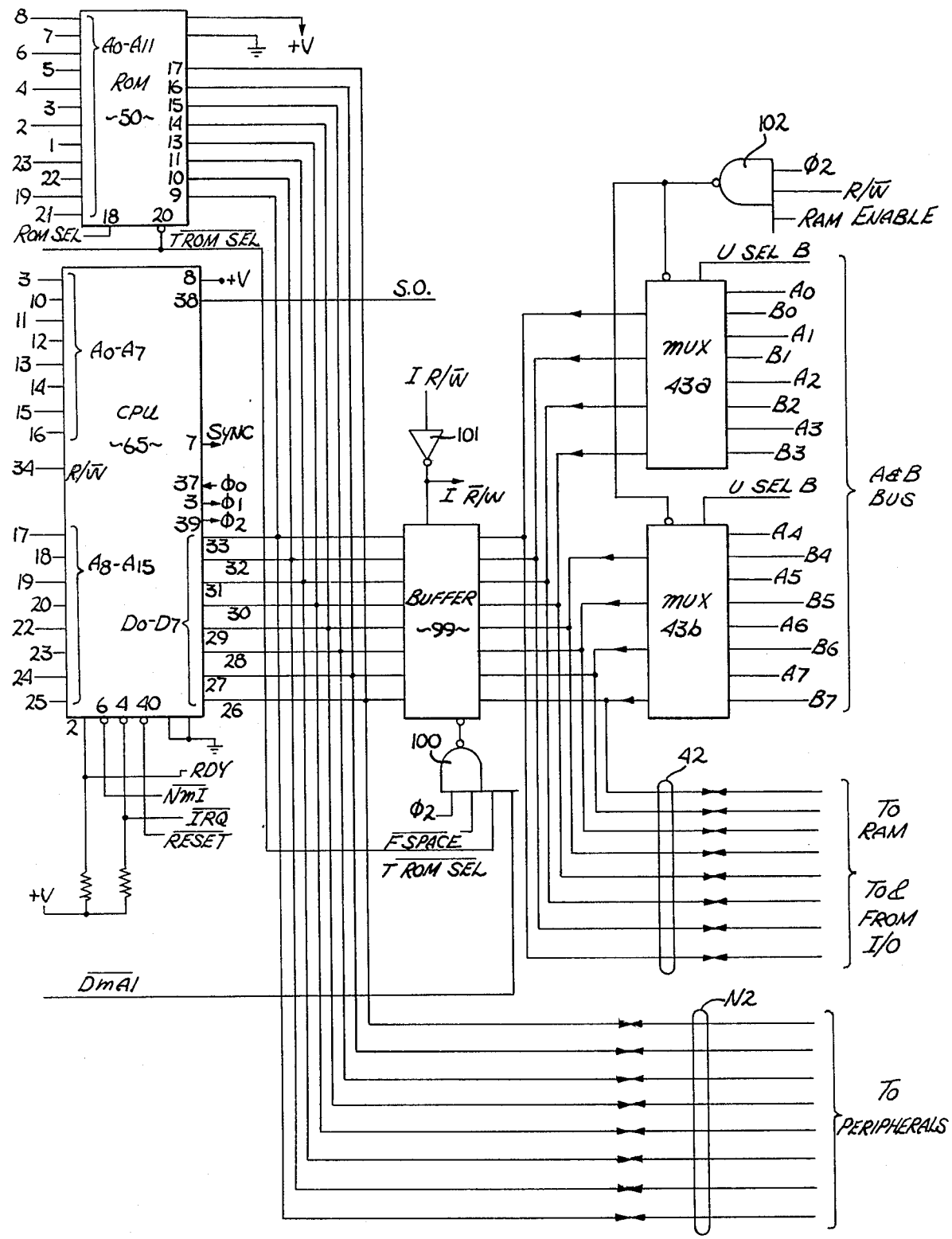

In the presently preferred embodiment, the CPU 65 (microprocessor) employed with the described computer is a commercially available component, the 6502A. This 8-bit processor (8-bit data bus) which has a 16-bit address bus is shown in FIG. 3 with its interconnections to the remainder of the computer. The pin number for each interconnection is shown adjacent to the corresponding line. In many cases, the nomenclature associated with the 6502A (CPU 65) is used in this application. For example, pin 6 receives the nonmaskable interrupt signal ($\overline{NMI}$), and pin 4 is coupled to receive the interrupt request signal ($\overline{IRQ}$). Some of the signals employed with the CPU 65, which are well-known in the art, and which are not necessary for the understanding of the present invention are not described in detail in this application, such as the various synchronization signals and clocking signals. The address signals from the CPU 65 are identified as $A_0$–$A_7$ and $A_8$–$A_{15}$. The data signals associated with the CPU 65 are shown as $D_0$–$D_7$. As will be apparent to one skilled in the art, the inventive concepts described in this application may be employed with other microprocessors.

Figure 2:
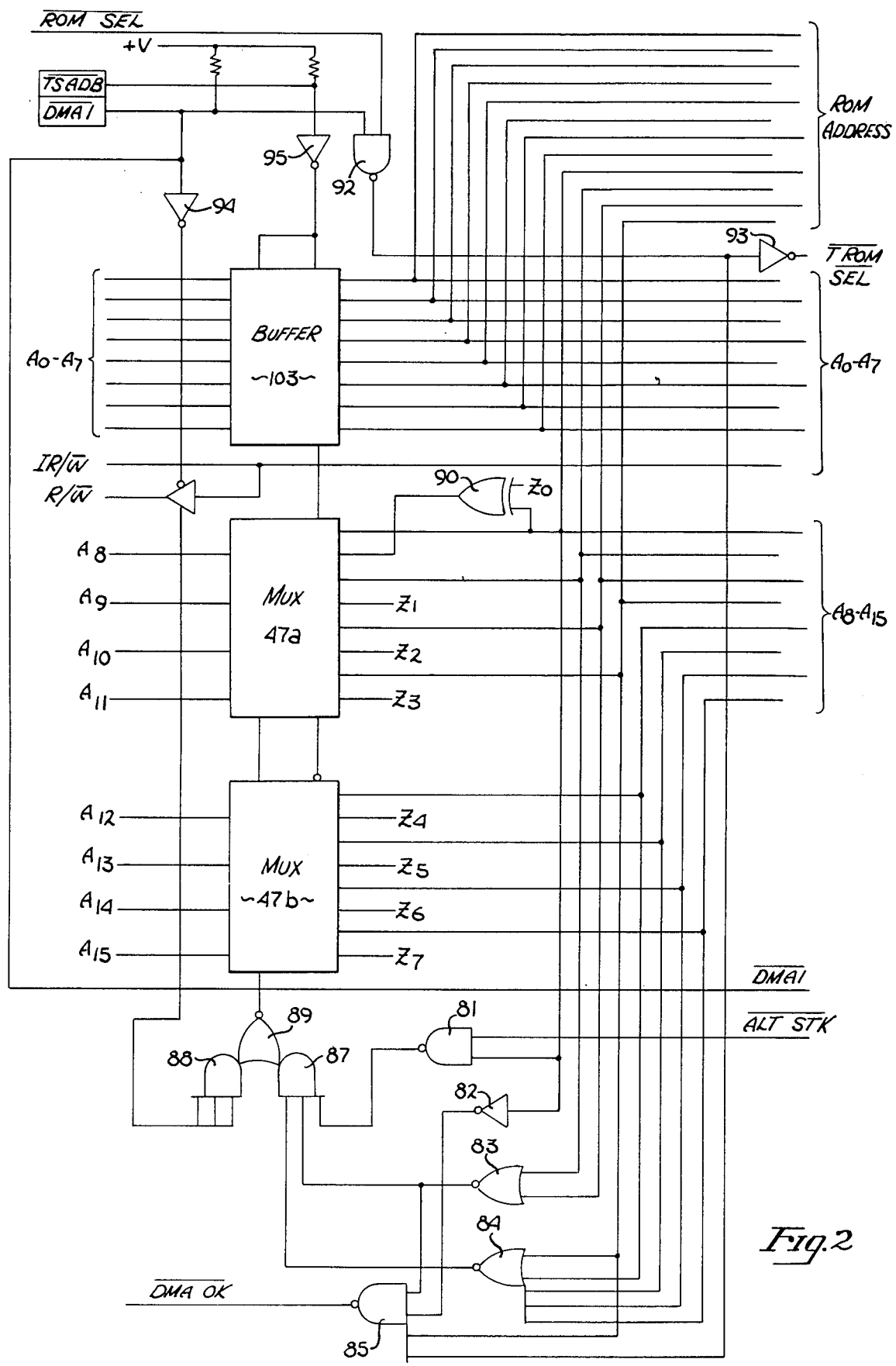
FIGS. 2 and 3 together show the central processing unit (CPU) and the architecture associated with this CPU, particularly the address bus and data bus.

Referring now to FIGS. 2 and 3, the general architecture, particularly the architecture associated with the CPU 65 can best be seen. The address signals $A_0$–$A_7$ are coupled to a buffer 103 by the bus shown primarily in FIG. 2. These address signals are also coupled to the ROM 50. The signals $A_0$–$A_7$ after passing through the buffer 103 are coupled to the memory subsystem. The address signals $A_8$–$A_{15}$ (higher order address bits) are coupled through lines shown in FIG. 2 to the multiplexers 47a and 47b. The contents of the Z-register 52 of FIG. 1 is also connected to the multiplexers 47a and 47b through the Z-bus ($Z_1$–$Z_7$). The multiplexers 47a and 47b allow the selection of either the signals $A_8$–$A_{15}$ from the CPU 65 or the contents of the Z-register ($Z_1$–$Z_7$) for addressing the RAM 60. The output of these multiplexers are shown as $A_8$–$A_{15}$; this designation is used even when the Z-bus is selected. Note in the case of the $Z_0$ signal, this signal is coupled to the multiplexer 47a through the exclusive OR gate 90 for reasons which are explained later. The address signals $A_8$–$A_{11}$ are also coupled to the ROM 50, thus the signals $A_0$–$A_{11}$ are used for addressing the ROM 50. The signals $A_8$–$A_{15}$ are connected to the logic circuit shown in the lower left-hand corner of FIG. 2; this logic circuit corresponds to the logic circuit 41 of FIG. 1.

The input and output data signals from the CPu 65 are coupled by a bidirectional bus to the bidirectional buffer 99 (FIG. 3). This buffer is selectively disabled by gate 100 to allow the output of ROM 50 to be communicated to CPU 65 and during other times not pertinent to the present discussion. The direction of flow through the buffer 99 is controlled by a read/write signal coupled to the buffer through inverter 101. Data from the CPU 65 is coupled through the buffer 99 and bus 42 to the RAM 60 or to I/O ports. Data from the RAM 60 is communicated to CPU 65 or bus N2 from the A bus and B bus through the buffer 99. The 4 lines of the A bus and 4 lines of the B bus are coupled to the multiplexer 43a. Similarly, the other 4 lines of the A and B buses are coupled to the multiplexer 43b. Multiplexers 43a and 43b select the 8 lines of the A bus or B bus and communicate the data through to buffer 99 and bus 42. These multiplexers are selectively disabled (for example, during writing) by gate 102. As will be described later, the 16 lines of the A bus and B bus permits the reading of 16-bits from the RAM at one time. This provides a data rate of 16-bits/MHz which is necessary, for example, for an 80 character per line display. The data is loaded into the RAM 60, 8-bits at a time.

The ROM 50, as mentioned, stores test programs, data needed to initialize various registers, character generation data (for RAM 162 of FIG. 7) and other related data. Specific programs employed in the presently preferred embodiment of the computer are set forth in Table 1. The ROM 50 is selected by control signals coupled to its pins 18 and 20, identified as signals ROM SEL and $\overline{\text{T ROM SEL}}$. Any one of a plurality of commercially available read-only memories may be used for the ROM 50. In the presently preferred embodiment, commercially available Part No. SY2333 is used.

Referring now to this logic circuit (lower left-hand corner of FIG. 2), the NAND gate 81 receives the address signal $A_8$ and also the alternate stack signal identified as $\overline{\text{ALT STK}}$. The output of this gate provides one input to the AND gate 87. The $A_8$ signal is also coupled through the inverter 82 to one input terminal of the NAND gates 85 and 86. The address signals $A_9$ and $A_{10}$ are coupled to the input terminals of the NOR gate 83. The output of this gate is coupled to one input terminal of the NAND gates 85 and 86 and the AND gate 87. The address signals $A_{11}-A_{15}$ are coupled to the input terminals of the NOR gate 84. The signal $A_{11}$ is also coupled to an input terminal of the NAND gate 85.

The outputs of the AND gates 87 and 88 (through NOR gate 89), controls the multiplexers 47a and 47b. When the output of gate 89 is low the Z-bus is selected, otherwise the address signals from the CPU 65 are selected.

The logic circuit above-described, along with the Z-bus and Z-register provide enhanced performance for the computer. First, this circuit permits the zero page or base page data to be stored throughout the RAM 60 rather than just on zero page. Secondly, this circuit enables addressing of alternate stack locations (other than page one). Lastly, this circuit through the Z-register provides a RAM pointer for direct memory access (DMA).

Assume for purposes of discussion that the CPU 65 is addressing the zero page of memory. That is, the higher order address bits $A_8-A_{15}$ are all zeros. The zeros for $A_9-A_{15}$ are detected by the gates 83 and 84. If all the inputs to these gates are zeros, the outputs of these gates are high which condition is communicated to the gate 87. $A_8$ which is also low, insures that the output of gate 81 will be high. Thus, all the inputs to gate 87 are high, causing the signal at the output of the gate 89 to drop. When this occurs, the Z-bus is selected. Instead of all the binary zeros from the CPU being coupled to the main memory (RAM 60), the contents of the Z-register form part of the address for the memory. Therefore, even though the CPU 65 has selected the zero page, nonetheless data may be written into or from any location of RAM 60 (including the zero page). This enhances the performance of the CPU, since for example, the time consumed in shifting data to and from a single zero page is minimized.

Normally, the CPU 65 selects page one for stack locations. This occurs when $A_8$ is high and $A_9-A_{15}$ are low. Assume first that the alternate stack locations have not been selected. Both inputs to gate 81 are high and its output is low. The low input to the gate 87 prevents the selection of the Z-bus. Thus, for these conditions the address signals $A_0-A_7$ select stack locations on page one.

Next assume that page one has been selected by the CPU and that the $\overline{\text{ALT STK}}$ signal is low, indicating the alternate stack locations are to be selected. (A flag is set by the CPU to change the $\overline{\text{ALT STK}}$ signal). Since the $\overline{\text{ALT STK}}$ signal is low and $A_8$ is high, a high output occurs from the gate 81. All the inputs to gates 83 and 84 are low, therefore, high outputs occur from both these gates. The conditions of gate 87 are met, causing a high output from this gate and lowering the output from the gate 89. The Z-bus is thus selected by the multiplexers 47a and 47b. This allows the contents of the Z-register to be used as alternate locations. Non-zero page locations are assured by inverting $A_8$. The exclusive OR gate 90 acts as a selective inverter. If $A_8$ is high and $Z_0$ is low, then $A_8$ at the output of the multiplexer 47a will be low. Note that during zero page selection when $A_8$ is low, the $Z_0$ signal is directly communicated through gate 90 to the output of multiplexer 47a.

Thus, the logic circuits along with the $\overline{\text{ALT STK}}$ signal allows alternate stack locations to be selected through the Z-bus. This further enhances the performance of the CPU which would otherwise be limited to page one for stack locations.

The logic circuit of FIG. 2 is also used along with the Z-register to provide a pointer during direct memory access (DMA). Assume that direct access to the computer's memory is required by a peripheral apparatus. To initiate the DMA mode the CPU provides an address between F800 and R8FF. Through a logic circuit not illustrated in FIGS. 2 and 3, the $\overline{\text{ROM SEL}}$ signal is brought low for addresses between F000 and FFFF. This signal is communicated to gate 93 and causes the output of gate 92 to rise ($\overline{\text{DMA 1}}$ is high at this time). This rise in potential is communicated to one input of the gate 85. Additionally, gate 85 senses that the address bits $A_8$, $A_9$ and $A_{10}$ are low. This information is coupled to gate 85 through the inverter 82 and the NOR gate 83 as high signals. Also the fact that $A_{11}$ is high is directly communicated to gate 85. Thus, with the address between F800 and F8FF the $\overline{\text{DMA OK}}$ signal drops in potential. This is sensed by the peripheral apparatus which in turn causes the $\overline{\text{DMA 1}}$ signal to drop and provides a ready signal to the CPU 65. With the completion of this handshake, data may begin to be transferred to the RAM.

The $\overline{\text{DMA 1}}$ signal through gate 93 and inverter 93 forces the $\overline{\text{T ROM SEL}}$ signal low. This signal in addition to being communicated to the ROM 50, is coupled to the buffer 99 through gate 100, disabling this buffer (during the reading of ROM 50). Also, the ready signal causes the CPU to come to a hard stop. Importantly, the $\overline{\text{DMA 1}}$ signal, after passing through the inverter 94 and the gates 88 and 89, assures the selection of the Z-register. The contents of the Z-register are fixed and provide a pointer to a page in the RAM.

Under the above conditions, the CPU increments the lower 8-bits of the address signal. The ROM 50 furnishes the instructions for incrementing the address, specifically SBC #1 and BEQ. The peripheral apparatus provides the data or receives the data in synchronization with the CPU operation. The peripheral also furnishes a read/write signal to indicate which operation is to occur. Data is then written into RAM via bus N2 and bus 42, or read from RAM via the A and B buses and bus N2.

Importantly, with the above DMA arrangement, addresses from the peripheral apparatus are not necessary and the Z-register is used to provide a pointer to a page in RAM 60.

MEMORY SUBSYSTEM

The memory sybsystem shown in FIG. 1 as the address control means 59 and RAM 60 is illustrated in detail in FIGS. 4, 5 and 6 as mentioned. In FIGS. 4 and 5, the memory control means is shown, while in FIG. 6 the memory devices and their organization are illustrated. The address control means of FIGS. 4 and 5 receives the address signals from the CPU 65 ($A_0$–$A_{15}$), the count in the vertical and horizontal counters (counter 58 of FIG. 1) which are used during display modes, control signals from the CPU and other signals. In genreal, this control means develops the address signals which are coupled to the RAM of FIG. 6 including the column address and row address signals, commonly referred to as $\overline{CAS}$ and $\overline{RAS}$. Other related functions are also shown in FIGS. 4 and 5, such as the circuitry which provides display scrolling, indirect RAM addressing and memory mapping.

The CPU of FIG. 3 provides a 16-bit address for addressing the memory. Under ordinary circumstances this address limits the memory capacity to 64K bytes. This size memory is insufficient in many applications, as for example, to effectively use the Pascal program language. As will be described in greater detail, the address control means of FIGS. 4 and 5 enable the use of a memory having a 96K byte or 128K byte capacity. One well-known technique which is used with the present invention for increasing this capacity is bank switching; this switching occurs under the contol of the CPU. In addition, the address control means uses a unique indirect addressing mode which provides the benefits of bank switching, however, this mode does not require CPU control. This greately enhances CPU operation with the larger memory (as will be described) when compared to the CPU controlled bank switching.

Referring first to FIG. 6, the RAM configuration is illustrated for a capacity of 96K bytes. The memory is organized into six rows, each of which includes eight 16K memory devices such as rows 111 and 112. In the presently preferred embodiment, Part No. 4116 MOS dynamic RAMs are used. (The pin designations and signal designations refer to this memory device.) Obviously, other memory devices may be employed.

Input data to these memory devices 106 is provided from the bus 42. Each line in the bus 42 is connected to the data input terminal of one device 106 in each row. The interconnection of this bus with each of the memory devices is not shown in FIG. 6 in order to overcomplicate this drawing. By way of example, however, line 107 connects the data bit D7 to the data input terminal of one of the memory devices in each of the six rows.

Three rows of devices 106 have their output terminals coupled to the A bus, and three rows are similarly coupled to the B bus. By way of example, line 108 connects three output terminals of devices 106 to the DB7 line of the B bus while line 109 connects three output terminals of the devices 106 to the DA7 line of the A bus.

The described memory devices 106 are each organized as a 16K×1 memory. Thus, each device receives a 14-bit address which is time multiplexed into two, 7-bit addresses. This multiplexing occurs under the control of the $\overline{CAS}$ and $\overline{RAS}$ signals as is well-known. The lines coupling the address signals to each of the devices in FIG. 6 are not illustrated. However, in the lower right-hand corner of FIG. 6, the various signals applied to each device (including the address signals), along with the corresponding pin numbers are shown. Other circuitry not illustrated is the refresh control circuitry which operates in a well-known manner in conjunction with the $\overline{CAS}$, $\overline{RAS}$ and address signals to refresh the dynamic devices.

Each row of memory devices 106 receives a unique combination of $\overline{CAS}$ and $\overline{RAS}$ signals. For example, row 111 receives $\overline{CAS}$ 5, 7 and $\overline{RAS}$ 4, 5; similarly, row 112 receives $\overline{CAS}$ 0 and $\overline{RAS}$ 0, 3. The generation of these $\overline{CAS}$ and $\overline{RAS}$ signals is described in conjunction with FIG. 5. These signals (along with the 14-bit address signals) permit the selection of a single 8-bit location in the 96K byte memory (for writing) and also the selection (for reading) of 16-bit locations.

The memory of FIG. 6 may be expanded to a 128K byte memory by using 32K memory devices, such as Part No. 4132. In this case, four rows of eight, 32K memory devices are used with each row receiving two $\overline{CAS}$ and $\overline{RAS}$ signals.

Before reviewing FIG. 4, a general understanding of the organization of the display is helpful. The display, during certain modes, is organized into 80 horizontal segments and 24 vertical segments for a total of 1920 blocks. 11-bits of the counter 58 of FIG. 1 are used as part of the address signals for the memory to access data for displaying during these modes. These counter signals are shown in FIG. 4 as $H_0$–$H_5$ and $V_0$–$V_4$. During other display modes each horizontal segment is further divided into 8 segments (e.g. for displaying 80 alpha numeric characters per line). This requires 3 additional vertical timing signals shown as $V_A$, $V_B$ and $V_C$ in FIGS. 4 and 7.

Often in the prior art, two separate counters are used to supply the timing/address signals for accessing a memory when the data in the memory is displayed. The count in one counter represents the horizontal lines of the screen (vertical count) and the other the position along each line, (horizontal or dot count). In many prior art displays the most significant bit of the dot counter is used to increment the line counter. Data in memory intended for display is mapped with a one-to-one correlation to the counts in these counters. In another prior art system (implemented in the Apple-II computer sold by Apple Computer, Inc.) this one-to-one correlation is not used. Rather, to conserve on circuitry, a single counter is employed and a more dispersed mapping is used in the memory. (Note that where a maximum horizontal count of 80 is used, this number cannot be represented by all ones in a digital counter and thus the vertical counter cannot easily be incremented by the most significant bit in the horizontal counter.) Since this more dispersed mapping technique is part of the prior art and not critical to an understanding of the present invention, it shall not be described in detail. However, the manner in which it is implemented shall be discussed in conjunction with the adder 114 of FIG. 4. For purposes of discussion, the signals from the counter 58 of FIG. 1 are designated as either vertical (V) or horizontal (H).

Referring now to FIG. 4, the selection of either the counter signals on the address signals from the CPU is made by the multiplexers 116, 117, 118 and 119. Each of these commercially available multiplexers (Part No. 153) couples one of four input lines to an output line. There are eight inputs to multiplexers 116, 117 and 118 and the outputs of these multiplexers provide the address signals for the memories (AR0 through AR5). The multiplexer 119 has four inputs on its pins 3, 4, 5, 6 and provides a single output on pin 7, the AR6 address signal. (The signals supplied to pins 11, 12 and 13 of multiplexer 119 are for clamping purposes only.)

The $\overline{AX}$ signal is applied to the pin 14 of each of the multiplexers. The signal on this line and the signal applied to pin 2, determines which of the four inputs is coupled to each of the outputs of the multiplexers. The $\overline{AX}$ signal is a RAM timing signal for clocking the first 7 bits and second 7 bits of the multiplexed 14-bit address applied to each of the memory devices 106. The other control signal to the multiplexers is developed through the AND gate 123. The inputs to this gate are the display signal (DSPLY) which indicates that the computer is in a display mode and a clocking signal, specifically a 1MHz timing signal ($\overline{C1M}$). The output of the AND gate 123 determines whether the address signals from the CPU or the signals associated with the counter 58 of FIG. 1 are selected.

Assume for purposes of discussion that the display has not been selected, and thus, the output of gate 123 is low. The $\overline{AX}$ signal then selects for pin 7 of multiplexer 116 first the address signal $A_0$ and then $A_6$. Likewise, each of the multiplexers selects an address signal (except for those associated with exclusive OR gates 124 and 125 which shall be discussed). If the display signal is high and an output is present from the gate 123, then, by way of example, the $\overline{AX}$ signal first causes the $H_1$ signal and then the $V_1$ signal to be connected to the AR1 address line. Similarly, signals corresponding to the vertical and horizontal count are coupled to the other address lines during display modes.

The adder 114 is an ordinary digital adder for adding two 4-bit digital nibbles and for providing a digital sum signal. A commercially available adder (Part No. 283) is employed. The carry-in terminal (pin 7) is grounded and no carry-outs occur since one of the inputs (pin 12) is grounded. The adder sums the digital signal corresponding to $H_3$, $H_4$ and $H_5$ with the digital signal corresponding to $V_3$, $V_4$, $V_3$, $V_4$. The resultant sum signal is coupled to the multiplexers 116, 117 and 118 as illustrated. the summing of these horizontal and vertical counter signals is used to provide the more dispersed mapping as previously discussed.

The adder 121 is identical to adder 114 and is coupled to sum the three least significant vertical counter bits from the counter 58 (FIG. 2) with the signals VA1, VB1 and VC1. The sum is selected by the multiplexer 120 during the high resolution display modes and also during scrolling as will be described. These sum signals are coupled to the multiplexers 117, 118 and 119. During the low resolution display modes, the multiplexer 120 couples ground signals or the page 2 signal ($\overline{PG2}$) to the multiplexers 117, 118 and 119. (The $\overline{PG2}$ signal is used for special mapping purposes, not pertinent to the present invention.) During the high resolution modes when the display is not being scrolled, the VA1, VB2 and VB3 signals are at ground potential and thus no summing occurs within adder 121 and the VA, VB and VC signals are coupled directly to the multiplexers 117, 118 and 119.

The address signals $A_{10}$, $A_{11}$, and $A_{13}$ from the CPU are coupled to the multiplexers 117, 118 and 119, respectively, through exclusive OR gates 124, 125, and 126, respectively. The other input terminals to gates 124 and 125 receive the $C_3$ signal, while the other input terminal of the gate 126 receives the $C_1$ signal. (The development of the $C_1$ and $C_3$ signals is illustrated in FIG. 5.) The gates 124, 125 and 126 provide mapping compensation within the memory. As the computer and memory are presently implemented, the sequence in which the various portions of the display are generated is not the same as the sequence in which the data is removed from memory for display. These gates provide compensating addresses and, in effect, cause a remapping so that the proper sequence is maintained when data is read from the memory for the display. These gates are shown to provide a complete disclosure of the presently preferred embodiment, however, they are not critical to the present invention.

In operation, the circuitry of FIG. 4, as mentioned, selects the address signals which are applied to each of the memory devices, either from the CPU or counter if the display mode is selected. It should be noted that not all of the address bits from the CPU are coupled to the multiplexers 116 through 119. Some of these address bits, as will be described in conjunction with FIG. 5, are used to develop the various $\overline{CAS}$ and $\overline{RAS}$ signals and thus select different rows within the memory of FIG. 6.

The scrolling operation which is used is somewhat unusual in that each line of the display is separately moved up (line-by-line) with one line of data in memory being moved for each frame. This technique provides a uniform, esthetically pleasing, scroll. Scrolling the screen one line per frame can be achieved by moving all the data in the memory into a new position for each frame. This would be very time consuming and impractical. With the described technique, only one-eighth of the data in the memory is moved for each new frame.

Referring to the adder 121, as mentioned, the signals $V_A$, $V_B$ $V_C$ are the three least significant vertical counter bits from the counter 58. These bits or counts, by way of example, represent the 8 horizontal lines of each character. In adder 12, a 3-bit digital signal, VA1, VB1 and VC1, is added to the count from counter 58. This 3-bit signal is constant during each frame, however, it is incremented for each new frame.

During a first frame, 000 is added to the vertical count. During a second frame, 001 is added; and during a third frame, 010 is added, and so on. By adding this digital signal to the count from counter 58, the addresses to the memory are changed in the vertical sense. During the first frame when 000 is added, the display remains unaffected. During the next frame, when 001 is added to the vertical count, instead of first displaying the first line of a character, the second line of each character is displayed at the top of each character space and each subsequent line of the character is likewise moved up one line. If data in memory is not moved, the first line of the character would appear at the bottom of each character. Note when 001 is added to 111 from the counter, 000 results. Thus, the first line of characters would be addressed when the beam is scanning the eighth line of characters. To prevent this, the data corresponding to the first line of each character is moved in memory for this frame. The first line of one character is moved up and becomes the bottom line of the character directly above it. When 010 is added, the process is again repeated. For example, the third line of each character is first displayed in each character space and the second line of each character is moved up to become the bottom line of the character directly above it. This process is repeated to scroll the data. The movement of data in memory is controlled by the CPU in a well-known manner.

Thus, through use of adder 121, an even, continuous scroll is obtained without moving all the data in memory for each frame. Rather, only ⅛th of the data is moved for each frame.

Referring now to FIG. 5, the circuitry used to extend the addressing from the CPU is illustrated. In general, the $\overline{\text{CAS}}$ signals are generated by the ROMs 127 and 128. The $\overline{\text{RAS}}$ signals are generated by the ROM 132. The multiplexer 130 allows the selection of either the bank switching signals, or the unique indirect addressing mode when "bank switching" occurs without direct commands from the CPU.

The CAS ROM 127 receives as an address the following signals: PRAS,$\phi$3, PRAS 1,2 $\overline{\text{AY}}$, DHIRES, R/$\overline{\text{W}}$, $A_{11}$, $A_{13}$, $A_{14}$, and $A_{15}$. As the PRAS$\phi$, 3 and PRAS 1, 2 represent the RAS signals being used. These signals are high when the respective RAS signal is active.

As previously mentioned, the AY signal is high for display modes and the DHIRES signal is high for high resolution display modes. The CAS ROM 128 receives as address signals the ABK1, ABK2, and ABK3 signals and also DHIRES, $\overline{\text{AY}}$, IND, $A_{11}$, $A_{13}$, $A_{14}$, and $A_{15}$.

The ROMS 127 and 128 are programmed to implement the following equations.

$$\overline{\text{PCAS0}} = (\text{PRAS0,3} \cdot (\overline{\text{DHIRES}} \cdot \overline{\text{AY}} + \text{AY} \cdot (\overline{\text{A15} \cdot \text{A1}} - 4 \cdot \text{A13} \cdot \overline{\text{A11}} \cdot \text{R/WN} + \overline{\text{A15} \cdot \text{A14} \cdot \text{A13}} \cdot \text{R/WN} + \text{A1} - 5 \cdot \overline{\text{A14}} \cdot \text{A13} + \text{A15} \cdot \text{A14} \cdot \text{A13} \cdot \overline{\text{A11}}))) \quad (1)$$

$$\overline{\text{PCAS2}} = (\text{DHIRES} \cdot \overline{\text{AY}} + \text{AY} \cdot (\overline{\text{ABK1} \cdot \text{ABK2} \cdot \text{ABK}} - 3 \cdot \overline{\text{IND}} + \text{ABK1} \cdot \text{ABK2} \cdot \text{ABK3}) \cdot (\overline{\text{A15} \cdot \text{A14}} - ) + \text{AY} \cdot \text{IND} \cdot \overline{\text{ABK1} \cdot \text{ABK2} \cdot \text{ABK3} \cdot \text{A15}} \cdot (\text{A14} \cdot \text{A13} + \text{A14} \cdot \overline{\text{A13}})) \quad (2)$$

$$\text{PCAS3} = \text{PRAS0}, 3 \cdot (\overline{\text{DHIRES}} \cdot \overline{\text{AY}} + \text{AY} \cdot (\overline{\text{A15} \cdot \text{A14} \cdot \text{A13}} \cdot \text{A11} + \text{A1} - 5 \cdot \text{A14} \cdot \overline{\text{A13} \cdot \text{A11}} + \text{A15} \cdot \text{A14} \cdot \overline{\text{A13}}))) \quad (3)$$

$$\overline{\text{PCAS4,6}} = (\text{AY} \cdot \overline{\text{IND} \cdot \text{ABK3} \cdot \text{A15}} \cdot (\text{ABK1} \cdot \overline{\text{ABK}} - 2 + \overline{\text{ABK1}} \cdot \text{ABK2})$$
$$\cdot (\overline{\text{A14} \cdot \text{A13}} + \text{A14} \cdot \overline{\text{A13}}) + \text{AY} \cdot \text{IND} \cdot \overline{\text{ABK3}} \cdot (\overline{\text{ABK}} - 2 \cdot \text{ABK1} \cdot \text{A15} + \overline{\text{ABK2}} \cdot \text{ABK1} + \text{ABK2} \cdot \overline{\text{ABK}} - 1 \cdot \overline{\text{A15}}) \cdot \text{A14} + \text{AY} \cdot \overline{\text{IND}} \cdot \text{ABK1} \cdot \text{ABK2} \cdot \overline{\text{ABK3}} \cdot (\overline{\text{A1}} - 5 \cdot \overline{\text{A14}} \cdot \text{A13} + \text{A15}$$
$$\cdot \overline{\text{A14} \cdot \text{A13}}) + \text{AY} \cdot \text{IND} \cdot \overline{\text{ABK3}} \cdot \text{ABK2} \cdot (\overline{\text{A15}} \cdot \text{ABK} - 1 + \text{A15} \cdot \overline{\text{ABK1}}) \cdot (\overline{\text{A14} \cdot \text{A13}} + \text{A14} \cdot \overline{\text{A13}})) \quad (4)$$

$$\text{PCAS5}, 7, = (\text{AY} \cdot \overline{\text{IND} \cdot \text{ABK3}} \cdot (\text{ABK1} \cdot \overline{\text{ABK2}} + \overline{\text{ABK1}} \cdot \text{ABK2}) \cdot (\overline{\text{A15}} \cdot \text{A14} \cdot \text{A13} + \text{A15} \cdot \overline{\text{A14} \cdot \text{A13}}) + \text{AY} \cdot \text{I} - \text{ND} \cdot \overline{\text{ABK3}} \cdot (\overline{\text{ABK2} \cdot \text{ABK1}} \cdot \text{A15} + \overline{\text{ABK2}} \cdot \text{ABK} - 1 + \text{ABK2} \cdot \overline{\text{ABK1} \cdot \text{A15}}) \cdot \text{A14} + \text{AY} \cdot \overline{\text{IND}} \cdot \text{ABK} - 1 \cdot \text{ABK2} \cdot \overline{\text{ABK3}} \cdot (\overline{\text{A15}} \cdot \text{A14}) + \text{AY} \cdot \text{IND} \cdot \overline{\text{ABK}} - 3 \cdot \text{ABK2} \cdot (\overline{\text{A15}} \cdot \text{ABK1} + \text{A15} \cdot \overline{\text{ABK1}}) \cdot (\overline{\text{A14}} \cdot \text{A13} + \text{A14} \cdot \overline{\text{A13}})) \quad (5)$$

In effect, these ROMs are programmed to allow selection of predetermined rows in the memory, based on the address signals $A_{10}$, $A_{13}$, $A_{14}$ and $A_{15}$, (ignoring for a moment the contribution of the $\overline{\text{RAS}}$ signals and the other signals appearing in the equations).

The outputs of the $\overline{\text{CAS}}$ ROMs 127 and 128 are coupled to the register 131. Register 131 is a commercially available register which permits the enabling of output signals (Part No. 374). During accessing of the memory the various $\overline{\text{CAS}}$ signals ($\overline{\text{CAS 0}}$ through $\overline{\text{CAS 7}}$) are coupled to the memory of FIG. 6 to permit selection of the appropriate memory devices. The signal USELB from $\overline{\text{CAS}}$ ROM 127 through register 131 selects either the A bus or B bus. This signal is coupled to the multiplexers 43a and 43b of FIG. 3.

During normal operation, the multiplexer 130 selects the bank switching signals BCKSW 1 through BCKSW 4. These four signals (or alternatively four signals from the A bus) provide four of the inputs (address signals) to the ROM 132. The other inputs to this ROM are the DHIRES, Z PAGE, PA8, PA15, RFSH (refresh), and $\overline{\text{AY}}$ signals. These address signals select the RAS 0, 3; RAS 1, 2; RAS 4, 5 and RAS 6, 7 signals. The ROM 132 is programmed to implement the following four equations.

$$\text{PRAS0,3} = \overline{\text{AY}} \cdot (\text{DHIRES} + \text{RFSH}) + (\text{ABK4} \cdot (\text{Z Page} \cdot \overline{\text{PA8}})) + \text{ABK1} \cdot \text{ABK2} \cdot \text{ABK3}) \cdot \text{AY} \quad (6)$$

$$\text{PRAS1,2} = \overline{\text{AY}} \cdot (\text{DHIRES} + \text{RFSH}) + \text{AY} \cdot (\overline{\text{ABK}} - 1 \cdot \text{ABK2} \cdot \text{ABK3} \cdot (\text{ABK4} \cdot (\text{ZPAGE} \cdot \overline{\text{PA8}}) \cdot \overline{\text{PA15}} - ) + \text{ABK1} \cdot \text{ABK2} \cdot \text{ABK3}) + \text{AY} \cdot \overline{\text{ABK3}} \cdot (\overline{\text{ABK}} - 1 \cdot \text{ABK2} \cdot \text{ABK4} \cdot (\text{ZPAGE} \cdot \overline{\text{PA8}}) \cdot \text{PA15} + \text{ABK} - 1 \cdot \text{ABK2} \cdot (\text{ABK4} \cdot (\text{ZPAGE} \cdot \overline{\text{PA8}}) \cdot \overline{\text{PA15}}) \quad (7)$$

$$\text{PRAS4,5} = \text{RFSH} \cdot \overline{\text{AY}} + \text{AY} \cdot \overline{\text{ABK2} \cdot \text{ABK3}} \cdot (\overline{\text{ABK}} - 1 \cdot \text{ABK4} \cdot (\text{ZPAGE} \cdot \overline{\text{PA8}}) \cdot \text{PA15} + \text{ABK1} \cdot (\text{ABK} - 4 \cdot (\text{ZPAGE} \cdot \overline{\text{PA8}}) \cdot \overline{\text{PA15}}) \quad (8)$$

$$\text{PRAS6,7} = \text{RFSH} \cdot \overline{\text{AY}} + \text{AY} \cdot \overline{\text{ABK3}} \cdot (\text{ABK1} \cdot \overline{\text{ABK}} - 2 \cdot \text{ABK4} \cdot (\text{ZPAGE} \cdot \overline{\text{PA8}}) \cdot \text{PA15} + \overline{\text{ABK1}} \cdot \text{ABK} - 2 \cdot (\text{ABK4} \cdot (\text{ZPAGE} \cdot \overline{\text{PA8}}) \cdot \overline{\text{PA15}})$$

Thus, the bank switching signals (along with the other input signals to ROM 132) select predetermined rows in memory in conjunction with the $\overline{\text{CAS}}$ signals.

The output signals of the ROM 132 are coupled through the NAND gates 142, 143, 144 and 145 to the memory. The other input terminals of these gates receive the RAS timing signal. In this manner, the output signals of the ROM 132 are clocked through the gates 142 through 145 to provide the $\overline{\text{RAS}}$ signals shown in FIGS. 5 and 6.

An important feature to the presently described computer is provided by the circuitry shown within the dotted line 146. The AND gate 148 receives, at its input terminals, the DA7, $A_{12}$, and $C_3$ signals. The NOR gate 149 receives the zero page and $A_{15}$ signal. The output of gate 149 provides one input to the gate 148 and also one input to the AND gate 150. The output of gate 148 provides another input signal to gate 150 and this signal (line 153) is one of the two control signals coupled to the multiplexer 130. The AND gates 150 and 151 also receive a SYNC signal and the $\phi_0$ signal. The output of the gates 150 and 151 are coupled to a NOR gate 152 with the output of the gate 152 (line 154) coupled to the other control terminal of the multiplexer 130.

The gates 150, 151 and 152 effectively form a clock for multiplexer/register 130 (multiplexer 130 is a commercial part, Part No. 399, which effectively is a register/multiplexer). This selects the lower four input lines to the multiplexer 130. However, because of the synchronization signal applied to gate 151, the multiplexer 130 selects the bank switching signals each time an OP code is fetched by the CPU.

To understand the operation of the circuit shown within the dotted line 146 it should be recalled that the memory of FIG. 6 provides a 16-bit output. As mentioned, during certain display modes, 16-bits/msec. are needed for display purposes. In nondisplay modes, only 8-bits are required, particularly for interaction with the CPU. When the memory is addressed by the CPU during the indirect addressing modes the data on the A bus is not ordinarily used. However, with the circuitry shown within the dotted line 146, this otherwise "unused" data is put to use to provide the equivalent of the bank switching signals through multiplexer 130.

Whenever the CPU selects a predetermined range of addresses, the multiplexer 130 selects the equivalent of the bank switching signals from the A bus provided DA7 is high. (This occurs when addressing as zero page the address space -1800 through 1FFF.) Once the signal on line 153 is high it is latched through gates 150, 151 and 152 causing the multiplexer 130 to select the four bits from the A bus (assuming the timing signals are high). Even if the next reference from the CPU is not to this special address range, the multiplexer 130 nonetheless remains latched with the four bits from the data bus. Once the SYN pulse drops, however, which is an indication that an OP code is being fetched, the signal on line 154 rises in potential, causing the multiplexer to switch back to the bank switching signals.

Effectively, what occurs is that when the CPU selects this special address range, (and provided DA7 is high) the bits DA0 through DA3 which are stored in memory, cause a remapping, that is, the address from the CPU accesses a different part of the memory. With the fetching of each OP code, the mapping automatically returns to the bank switching signals. Importantly, the remapping, which occurs is controlled by the bits stored in the RAM (DA$\phi$ through DA3). Thus, with the remapping information stored in RAM, toggling can occur between different portions of the memory without requiring bank switching signals, or the like from the CPU. This enhances the CPU's performance since CPU time is not used for remapping. Additionally, it provides an easy tool for programming.

For some program languages it is desirable to separate data and the program into separate portions of the memory. For example, the 128K memory can be divided into two 64K memories, one for program and one for data. Switching can occur between these memory portions without the generation of bank switching signals by the CPU with the above described circuit. This arrangement is particularly useful when using the Pascal program language.

DISPLAY SUBSYSTEM

Figure 8:
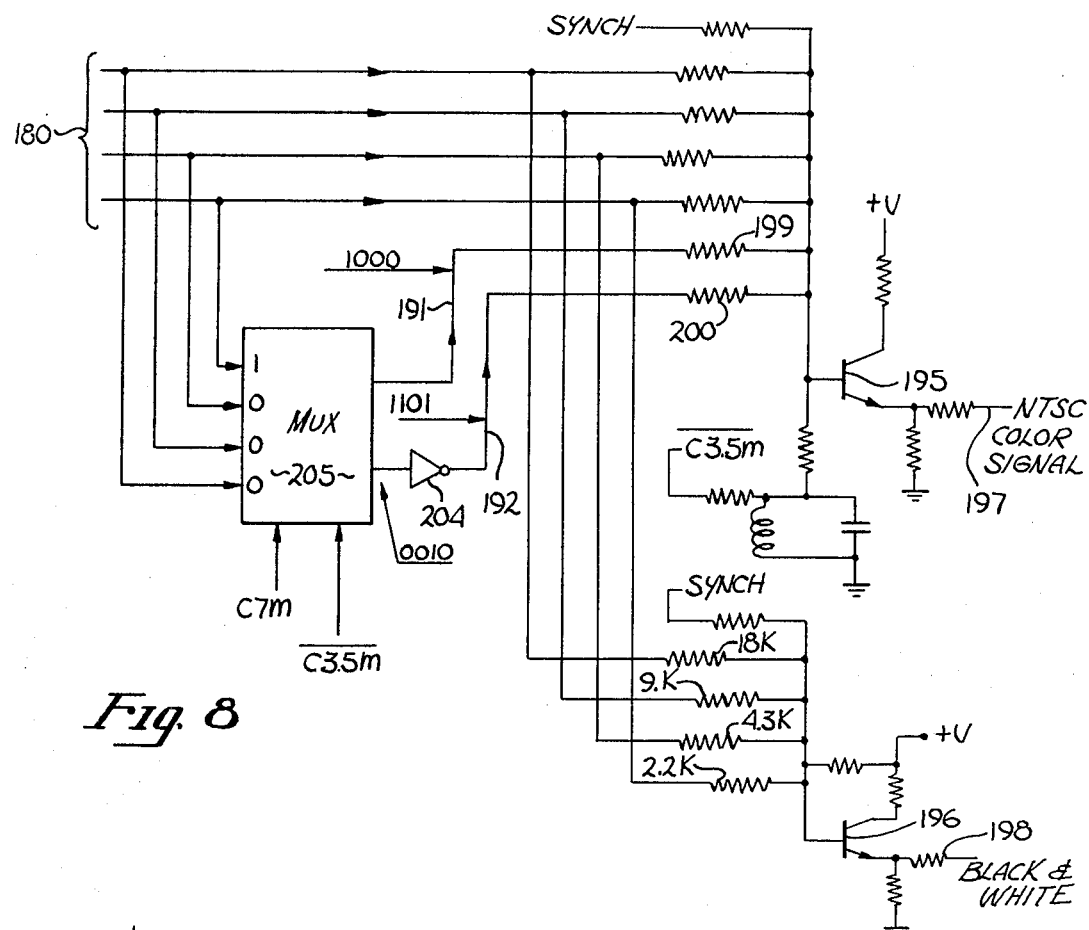

The display subsystem 48 of FIG. 1 receives data from the A bus and B bus and converts the data into video signals which may be used for displaying alphanumeric characters or other images on a standard raster scanned cathode ray tube display. The display subsystem 48 specifically generates on line 197, a standard NTSC color video signal and a video black and white video signal on line 198 (FIG. 8). This display subsystem, in addition to other inputs, receives a synchronization signal, and several clocking signals. For sake of simplicity, the standard color reference signal of 3.579545 MHz is shown as C3.5M. Twice this frequency and four times this frequency are shown as C7M and C14M, respectively.

Figure 9:
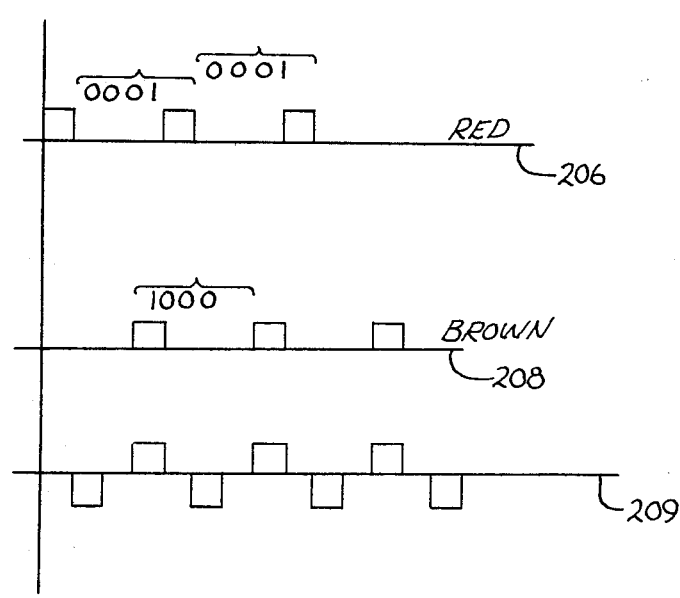
FIG. 9 is a graph of several waveforms used to describe a prior art circuit and the circuit of FIG. 8.

Before describing the details of the display subsystem 48, a discussion of a prior art display system will be helpful in understanding the present display subsystem. In U.S. Pat. No. 4,136,359, a video display system is described which is implemented in a commercially available computer, Apple-II, sold by Apple Computer, Inc., of Cupertino, Calif. In this system, 4-bit digital words are shifted in parallel into a shift register. These words are then circulated in the shift register at 14 MHz to define a waveform having components at 3.5 MHz. Referring to FIG. 9, line 206, assume that the digital word 0001 is placed in the shift register and circulated at a rate of 14 MHz. The resultant signal which has a component of 3.5 MHz is shown on line 206. The phase relationship of this component to the 3.5 MHz reference signal determines the color of the resultant video signal. This relationship is changed by changing the 4-bit word placed in the shift register. As explained in the above-referenced patent, if the signal 1000 is placed in the register and circulated, the resultant phase relationship of the 3.5 MHz component results in the color brown, this signal is shown on line 208. With this prior art technique, the luminance was determined by the DC component of the signals such as shown on lines 206 and 208.

The display subsystem 48 of FIG. 1 also uses 4-bit words to generate the various color signals in a manner somewhat similar to the above-described system. Referring to FIG. 8, 4-bit words representative of colors (16 possible colors) are coupled to the bus 180. (The generation of these words shall be described in detail in conjunction with FIG. 7.) Instead of using a shift register which circulates the 4-bit work, the same result is achieved by using a multiplexer 205 which sequentially selects each of the lines of the bus 180. The signals on bus 180 also provide a luminance signal and a black and white video signal with a gray scale.

The 4 lines of the bus 180 are coupled to multiplexer 205; this multiplexer also receives the C7M and the $\overline{\text{C3.5M}}$ timing signals. These two timing signals cause each of the four lines to be sequentially selected and coupled to line 191. (Note that the order in which each of the lines of the bus 180 is selected does not change.)

In effect, the multiplexer operates to serialize the parallel signal from bus 180. Assume for sake of explanation that the digital signals on bus 180 are 1000 as indicated in FIG. 8. The signal on line 191 will then be 10001000 . . . . The output of the multiplexer 205 coupled to the input of the inverter 204 also receives in a sequential order, the signals from bus 180, however, in a different order. For the example shown, the input to inverter 204 is 00100010 . . . . After inversion, this results in the signal 11011101 . . . on line 192. Effectively, the signals on lines 191 and 192 are added by resistors 199 and 200. The resultant waveform is an AC signal (no DC component) shown in FIG. 9 on line 209. Thus, with the described circuit, a chroma signal is generated, having a predetermined phase relationship to the 3.5 MHz color reference signal. This phase relationship which is varied by changing the signals on bus 180 determines the color of the video signal on line 197.

In the prior art display discussed above, the DC component of the color signal determines the luminance. In the present invention, the signals on bus 180 are coupled to the base of transistor 195, consists of an AC signal from resistors 199 and 200, and the luminance level also determined by the signals on bus 180. These inputs to transistor 195, along with the $\overline{\text{C3.5M}}$ signal, generate a NTSC color signal on line 197 of improved quality when compared to the discussed prior art system.

In some cases, the signals on bus 180 are all binary ones or all binary zeros. When this occurs, there is no AC component from resistors 199 and 200 (no color signal) and the resultant signal on line 197 is either "black" or "white."

The lines of bus 180 are also coupled through resistors to the base of a transistor 196. Each of these resistors have a different value to provide a "weighting" to the binary signal.

This weighting is used for non-color displays to provide "gray" shades as opposed to having a display with only black and white. The binary signals on bus 180 drive the transistor 196 to provide a video signal on line 198. RGB is generated with weighted sums of these same five signals.

Figure 7:
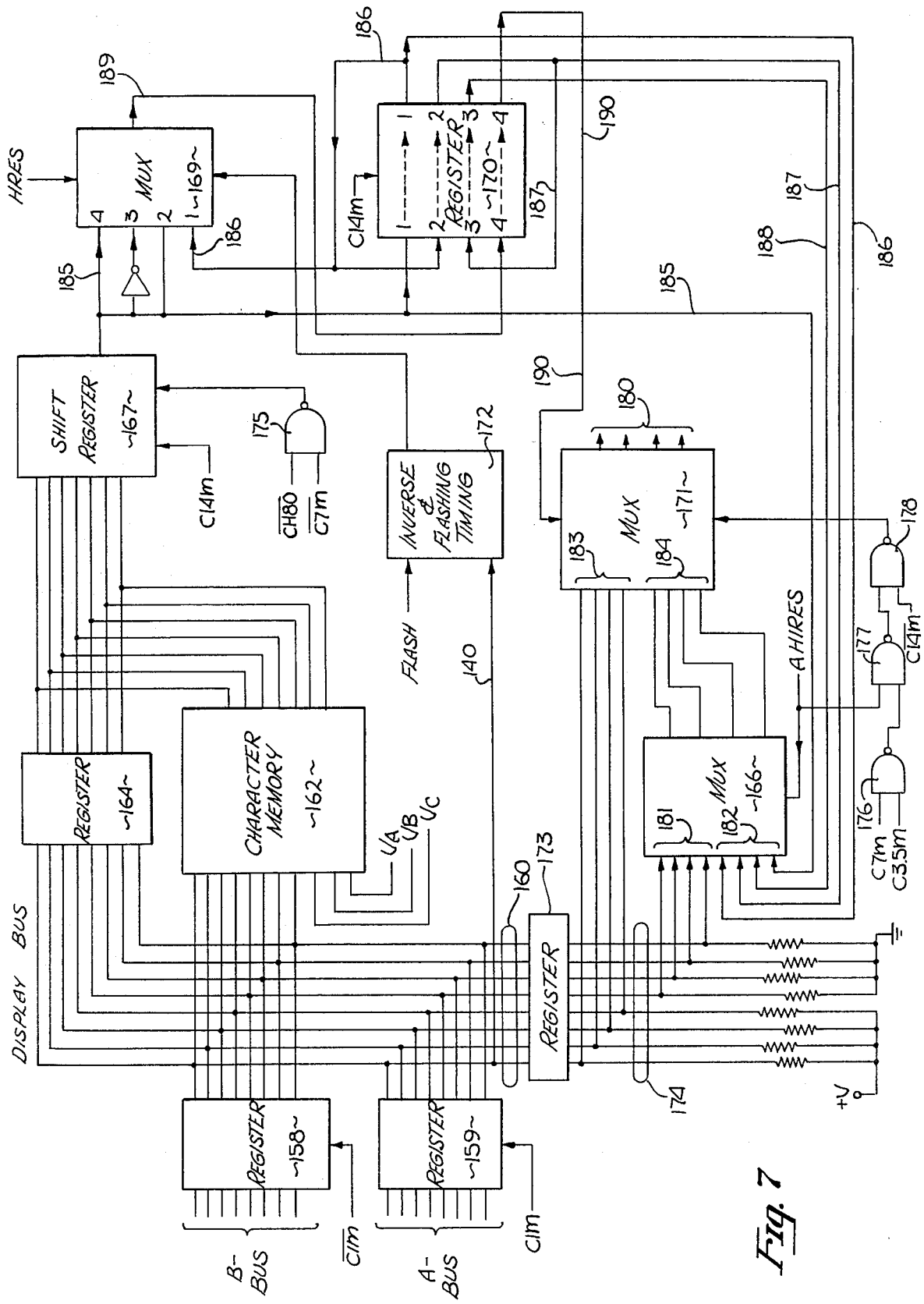
FIGS. 7 and 8 illustrate the display subsystem of the invented computer.

Referring now to FIG. 7, data from memory is coupled from the A bus and B bus to registers 159 and 158, respectively. These registers are clocked by the 1 MHz clocking signal and its complement, thus permitting the sequential transfer of 8-bit words every 0.5 msec. As will be described, in some display modes the data is transferred at the 2 MHz rate, and in other display modes, at a 1 MHz rate.

The registers 158 and 159 are coupled to an 8 line display bus 160. This display bus transfers data to registers 164 and 173, and also addresses to a memory 162. The registers 164 and 173 and memory 162 are enabled during specific display modes as will be apparent.

The character memory 162, in the presently preferred embodiment, is a random-access memory which stores patterns representative of alpha-numeric characters. Each time the computer is powered up, the character information is transferred from the ROM 50 into the character memory 162 during an initialization period. During character display modes, the signals from the display bus 160 are addresses, identifying particular alpha-numeric characters stored within the character memory 160. The vertical counter signals $V_A$, $V_B$, and $V_C$ (previously discussed in conjunction with adder 121 of FIG. 4) identify the particular line in each character which is to be displayed. Thus, the generation of the digital signals representative of each of the characters occurs in an ordinary manner. The 7-bit signal representative of each line of each character (memory output) is coupled to the shift register 167. Through timing signals not shown, either the register 164 or the character memory 162 is selected to allow the shift register 167 to receive either data directly from the A bus or B bus, or alpha-numeric character information from the memory 162.

The 7-bits of information from either memory 162 or register 164 are serialized by the shift register 167 either at a 7 MHz rate or 14 MHz rate, depending upon the display mode. The serialized data is coupled by line 185 to the multiplexer 169, pins 1 and 4. The inverse of this data is also coupled to multiplexer 169, pin 3. Line 185 is also coupled as one input to the multiplexer 166 and to the register 170 (input 1).

The output 1 of register 170 (line 186) is coupled to the multiplexer 169, pin 1; to register 170 (input 2); and to multiplexer 166. Output 2 of register 170 (line 187) is coupled to input 3 of register 170 and also to multiplexer 166. Output 3 of register 170 (line 187) provides a third input to the multiplexer 166. Input 4 of the register 170 receives the output of the multiplexer 169 (line 189). Output 4 of register 120 (line 190) provides one control signal for the multiplexer 171.

The multiplexer 171 selects either the four lines of bus 183 or the four lines of bus 184. The output of multiplexer 171, bus 180, provides the 4-bit signal discussed in conjunction with FIG. 8. During one of the high resolution display modes (AHIRES), the multiplexer 171 is controlled by a timing signal from the output of the gate 178.

The multiplexer 166 selects either the lines of bus 181 or bus 182. The output of this multiplexer provides the signals for the bus 184. In all but the AHIRES display mode, multiplexer 166 selects bus 181. Thus, typically, the multiplexer 171 receives the signals from bus 174.

For purposes of description above, and also for purposes of explaining for some of the display modes below a simplifying assumption has been made. The signals coupled to the bus 180 by multiplexer 171, for most modes, are controlled by the serialized signal on line 190. This serialized signal is in sychronization with the C7M or C14M clocking signals. The multiplexer 205 of FIG. 8, which as described above, does the "spinning" for the parallel digital signal on bus 180, operates in sychronization with the multiplexer 171. In the description above, and except when otherwise noted below, it is assumed that, by way of example, if the multiplexer 171 is coupling all binary ones and zeros onto bus 180, the signal on line 191 will be either ones or zeros. Also for this condition the signal on line 192 will be all binary zeros or ones, and thus, no AC signal is generated at the base of transistor 195. However, as actually implemented, there is a "phase" difference between the clocking of the multiplexer 171 when compared to the sampling of the signals from bus 180 by the multiplexer 205. This results in a first constant AC signal on the gate of transistor 195 even when it appears that all binary ones are on bus 180, and a second constant AC signal when all binary zeros are on the bus 180. Thus, in this specification, when it states that "black" or "white" signals are being generated, instead, as currently implemented, two constant colors are generated on a color display. Where a true black and white is desired, color suppression is introduced such as through the color burst signal.

The circuit of FIG. 7, along with the circuit of FIG. 8, provides the capability for several distinct display modes. The first of these modes provides a display consisting of 40 characters (or spaces) per horizontal line. This requires a data rate of 8-bits/MHz or half the data rate the memory is capable of delivering. In this mode, data is loaded from the A bus during every other 0.5 μsec period. (B bus is not used during this mode.) This data addresses the character memory 162, and along with the signals $V_A$, $V_B$ and $V_C$, provides the appropriate character line (7-bits) to the shift register 167. During this mode, registers 164 and 173 are disabled. The shift register 167 for this mode shifts the data at a data rate of 7 MHz (note $\overline{CH80}$ is high, allowing the 7 MHz signal from gate 175 to control the shift register 167). Each 7-bit signal is shifted serially onto line 185 and then to line 189 since multiplexer 169 selects pin 4. The data is shifted through the register 170 onto line 190. The serial binary signal on line 190 causes the selection of buses 183 or 184.

The four lines of bus 183 during this mode are coupled to +V (register 173 is disabled); therefore the selection of bus 184 provides four binary ones. The selection of bus 184 provides four binary zeros through bus 181. Thus, the serial binary signal on line 190 provides either all binary ones or all binary zeros to bus 180. As discussed, the circuit of FIG. 8 will provide a black and white display with 40 characters per line.

If the inverse and flashing timing means 172 is selected, each time the shift register 167 is loaded, multiplexer 169 shifts between pins 3 and 4. This causes the characters to change from white characters on a black background to black characters on a white background, and so on.

During the 80 character per line display mode, the registers 158 and 159 are each loaded during sequential 0.5 μsec periods (this utilizes the 2 MHz cycle rate previously discussed). The shift register 167 shifts the character data from memory 162 at a 14 MHz rate. The serialized data at the 14 MHz rate is shifted through the register 170 and again controls the multiplexer 171 as previously described. (Note that register 170 is always clocked at the 14 MHz rate.) Flashing again can be obtained as previously discussed.

In another alpha-numeric character display mode, the background of each character may be in one color and the character itself (foreground) in another color. This mode provides 40 characters per line. The character identification (address for RAM 162), is furnished on the A bus to register 159 at a frequency of 1 MHz. The color information (background color and foreground color) is furnished on the B bus as two 4-bit words to register 158. In the manner previously described, the address from register 159 selects the appropriate character from memory 162 and provides this information to shift register 167. The color information from the B bus is transferred to register 173. For purposes of explanation, assume that the 4-bits identifying the color red for the background are on bus 184 (from register 173 and multiplexer 166) and that 4-bits representing the color blue for the foreground are on bus 183. (Note that when register 173 is enabled, the signals from the register override the binary ones and zeros which otherwise appear on the lines of bus 174.) The serial binary signal representative of the character itself on line 190, selects either the color blue from bus 183 for the character itself or the color red from bus 184 for the background. The digital signals representative of these colors are transferred to bus 180 and provide the color data to the circuit of FIG. 8. For black and white displays, a "gray" scale is provided through the weighting circuit associated with transistor 196 of FIG. 8. Again, the multiplexer 169 may, through the timing means 172, alternate between the signal of line 185 and its inverse, which will have the effect of interchanging the foreground and background colors.

During the high resolution graphics modes, the character memory 162 is not used, but rather, data from the memory directly provides pattern information for display. This requires more mapping of data from within the main memory since new data is required for each line of the display. (Note that when characters are displayed, the character memory 162 provides the different signals required for the 8 lines of each character row.) During these high resolution modes, the register 164 is enabled and the character memory 162 is disabled. Thus, the data from the A bus and B bus is shifted into the shift register 167. In these modes, the "HRES" signal to multiplexer 169 causes this multiplexer to select between pins 1 and 2. Pin 2 provides the signal directly from the shift register 167 while the signal on pin 1 is effectively the signal on line 185 delayed by one period of the C14M signal. This delay occurs through the register 170 from input 2 to output 2 since register 170 is clocked at C14M.

During a first graphics mode, data from the display bus 160 is loaded into shift register 167 at the rate of 7-bits/MHz. The data is serialized on line 185 and in the manner previously described for displaying characters, controls the selection of all binary ones and all binary zeros through the multiplexer 171. Note, as mentioned before, in the presently preferred embodiment, unless color suppression is used, this will not result in a black and white display, but rather a two-color display. If a high bit is present on line 140 of the display bus, the inverse and flashing timing means 172 causes the multiplexer 169 to alternate between pins 1 and 2. This switching occurs at a 1 MHz rate and provides a phase shift for every other 7-bits of data coupled to the multiplexer 171 on line 190. This results in an additional color being generated on the display for every other 7-bits of data.

For the above-described graphics modes when shift register 161 is shifting at a 7 MHz rate, 8-bits may be coupled to the bus 160 during each period. Specifically, as in the case of the differing background and foreground colors for the 40 character per line display mode, two 4-bit color words are shifted into register 173 at a rate of 1 MHz. Then, the multiplexer 171 selects between two predetermined colors on buses 183 and 184. Note these colors can be changed at a 1 MHz rate.

In an additional color mode identified as "AHIRES," multiplexer 171 operates under the control of gates 176, 177 and 178. In effect, multiplexer 171 selects bus 184 and latches the signals on this bus every four cycles of the C14M clock. Data is shifted into the shift register 167 from the A bus and B bus every 0.5 μ sec the register 167 operates under the control of the C14M signal. Each data bit on line 185 is shifted first to line 186, then to line 187 and finally to line 188. These lines are coupled to the multiplexer 171 through multiplexer 166 which selects bus 182 since AHIRES is high. In effect, what occurs is that 4-bit color words are serialized onto line 185 and then brought back into parallel on bus 182. Since multiplexer 171 latches the signals on bus 184 every four cycles of the C14M signal, a new color word is generated at a 3.5 MHz rate on the bus 180. The resultant display is 140 by 192 colored blocks wherein each block can be any one of 16 colors.

In the last display mode, typically used with color suppression, data is shifted into the shift register 167 from the display bus at the rate of 14-bits/MHz. The data is serialized onto line 185 and controls the selection of either all binary ones or all zeros through multiplexer 171. This provides the highest resolution graphics display for the system.

Thus, a microcomputer with video display capability has been described. The computer is fabricated from commercially available parts and provides high utilization of these parts. Numerous existing programs including many of those which operate on the Apple-II computer, may be employed in the above-described computer.

TABLE I

```
F000:        13   ****************************
F000:        14   *    CRITICAL TIMING        *
F000:        15   *   REQUIRES PAGE BOUND     *
F000:        16   *    CONSIDERATIONS FOR     *
F000:        17   *      CODE AND DATA        *
F000:        18   *  -----CODE-----           *
F000:        19   *   VIRTUALLY THE ENTIRE    *
F000:        20   *     'WRITE' ROUTINE       *
F000:        21   *      MUST NOT CROSS       *
F000:        22   *      PAGE BOUNDARIES.     *
F000:        23   *   CRITICAL BRANCHES IN    *
F000:        24   *    THE 'WRITE', 'READ',   *
F000:        25   *    AND 'READ ADR' SUBRS   *
F000:        26   *    WHICH MUST NOT CROSS   *
F000:        27   *    PAGE BOUNDARIES ARE    *
F000:        28   *    NOTED IN COMMENTS.     *
F000:        29   *                           *
F000:        30   ****************************
F000:        31   *                           *
F000:        32   *         EQUATES           *
F000:        33   *                           *
0200:        34   NBUF1    EQU    $200
0302:        35   NBUF2    EQU    $302        ;(ZERO PAGE AT $300)
F000:        36   *
0080:        37   HRDERRS  EQU    $80
00E0:        38   DVMOT    EQU    $E0
F000:        39   *
0081:        40   IBSLOT   EQU    $81
0082:        41   IBDRVN   EQU    IBSLOT+1
0083:        42   IBTRK    EQU    IBSLOT+2
0084:        43   IBSECT   EQU    IBSLOT+3
0085:        44   IDBUFP   EQU    IBSLOT+4    ;&5
0087:        45   IBCMD    EQU    IBSLOT+6
0088:        46   IBSTAT   EQU    IBSLOT+7
0089:        47   IBSMOD   EQU    IBSLOT+8
0089:        48   CSUM     EQU    IBSMOD      ;USED ALSO FOR ADDRESS HEADER CKSUM
008A:        49   IOBPDN   EQU    IBSLOT+9
008B:        50   IMASK    EQU    IBSLOT+$A
008C:        51   CURTRK   EQU    IBSLOT+$B
0085:        52   DRVOTRK  EQU    CURTRK-7
F000         53   ;SLOT 4, DRIVE 1
F000:        54   ;SLOT 4, DRIVE 2
F000:        55   ;SLOT 5, DRIVE 1
F000:        56   ;SLOT 5, DRIVE 2
F000:        57   ;SLOT 6, DRIVE 1
F000         58   ;SLOT 6, DRIVE 2
0093:        59   RETRYCNT EQU    IBSLOT+$12
0094:        60   SEEKCNT  EQU    IBSLOT+$13
009B:        61   BUF      EQU    IBSLOT+$1A
009F:        62   ENVTEMP  EQU    IBSLOT+$1E
F000:        63   *IBSLOT+$1F NOT USED.
F000:        64   *
F000:        66   ****************************
F000:        67   *                           *
F000:        68   *      ----READADR----      *
F000:        69   *                           *
F000:        70   ****************************
0095:        71   COUNT    EQU    IBSLOT+$14  ;'MUST FIND' COUNT.
0095:        72   LAST     EQU    IBSLOT+$14  ;'ODD BIT' NIBLS.
0096:        73   CKSUM    EQU    IBSLOT+$15  ;CHECKSUM BYTE.
0097:        74   CSSTV    EQU    IBSLOT+$16  ;FOUR BYTES,
F000:        75   *           CHECKSUM, SECTOR, TRACK, AND VOLUME.
F000:        76   *
F000:        77   ****************************
F000:        78   *                           *
```

```
F000:          79 *       ----WRITE----          *
F000:          80 *                              *
F000:          81 *       USES ALL NBUFS         *
F000:          82 *         AND 32-BYTE          *
F000:          83 *       DATA TABLE 'NIBL'      *
F000:          84 *                              *
F000:          85 ******************************
F000:          86 *
F000:          87 ******************************
F000:          88 *                              *
F000:          89 *       -----READ----          *
F000:          90 *                              *
F000:          91 *       USES ALL NBUFS         *
F000:          92 *       USES LAST 54 BYTES     *
F000:          93 *       OF A CODE PAGE FOR     *
F000:          94 *       SIGNIFICANT BYTES      *
F000:          95 *       OF DNIBL TABLE.        *
F000:          96 *                              *
F000:          97 ******************************
F000:          98 *
F000:          99 ******************************
F000:         100 *                              *
F000:         101 *       ---- SEEK ----         *
F000:         102 *                              *
F000:         103 ******************************
0095:         104 TRKCNT    EQU    COUNT         ;HALFTRKS MOVED COUNT.
009D:         105 PRIOR     EQU    IBSLOT+$1C
009E:         106 TRKN      EQU    IBSLOT+$1D
F000:         107 *
F000:         108 ******************************
F000:         109 *                              *
F000:         110 *       ---- MSWAIT ----       *
F000:         111 *                              *
F000:         112 ******************************
0099:         113 MONTIMEL  EQU    CSSTV+2       ;MOTOR-ON TIME
009A:         114 MONTIMEH  EQU    MONTIMEL+1    ;COUNTERS.
F000:         115 *
F000:         117 ******************************
F000:         118 *                              *
F000:         119 *       DEVICE ADDRESS         *
F000:         120 *        ASSIGNMENTS           *
F000:         121 *                              *
F000:         122 ******************************
C080:         123 PHASEOFF EQU    $C080          ;STEPPER PHASE OFF.
C081:         124 PHASEON  EQU    $C081          ;STEPPER PHASE ON.
C08C:         125 Q6L      EQU    $C08C          ;Q7L,Q6L=READ
C08D:         126 Q6H      EQU    $C08D          ;Q7L,Q6H=SENSE WPROT
C08E:         127 Q7L      EQU    $C08E          ;Q7H,Q6L=WRITE
C08F:         128 Q7H      EQU    $C08F          ;Q7H,Q6H=WRITE STORE
FFEF:         129 INTERUPT EQU    $FFEF
FFDF:         130 ENVIRON  EQU    $FFDF
0080:         131 ONEMEG   EQU    $80
007F:         132 TWOMEG   EQU    $7F
F000:         133 ******************************
F000:         134 *
F000:         135 * EQUATES FOR RWTS AND BLOCK
F000:         136 *
F000:         137 ******************************
C088:         138 MOTOROFF EQU    $C088
```

```
C089:            139 MOTORON  EQU   $C089
C08A:            140 DRV0EN   EQU   $C08A
C08B:            141 DRV1EN   EQU   $C08B
C081:            142 PHASON   EQU   $C081
C080:            143 PHSOFF   EQU   $C080
0097:            144 TEMP     EQU   CSSTV       ;PUT ADDRESS INFO HERE
0097:            145 CSUM1    EQU   TEMP
0098:            146 SECT     EQU   CSUM1+1
0099:            147 TRACK    EQU   SECT+1
0099:            148 TRKN1    EQU   TRACK
009A:            149 VOLUME   EQU   TRACK+1
0083:            150 IBRERR   EQU   HRDERRS+3
0082:            151 IBDERR   EQU   HRDERRS+2
0081:            152 IBWPER   EQU   HRDERRS+1
0080:            153 IBNODRV  EQU   HRDERRS
F000:            155 ****************************
F000:            156 *                          *
F000:            157 *       READ/WRITE A       *
F000:            158 *      TRACK AND SECTOR    *
F000:            159 *                          *
F000:            160 ****************************
F000:            161 *
F000: A0 01      162 REGRWTS  LDY   #1          ;RETRY COUNT
F002: A6 81      163          LDX   IBSLOT      ;GET SLOT # FOR THIS OPERATION
F004: 84 94      164          STY   SEEKCNT     ;ONLY ONE RECALIBRATE PER CALL
F006: 08         165          PHP               ;DETERMINE INTERUPT STATUS
F007: 68         166          PLA
F008: 6A         167          ROR   A
F009: 6A         168          ROR   A           ;GET INTERUPT FLAG INTO BIT 7
F00A: 6A         169          ROR   A
F00B: 6A         170          ROR   A
F00C: 85 8B      171          STA   IMASK
F00E: AD DF FF   172          LDA   ENVIRON     ;PRESERVE ENVIRONMENT
F011: 85 9F      173          STA   ENVTEMP
F013:            174 *
F013             175 * NOW CHECK IF THE MOTOR IS ON, THEN START IT
F013             176 *
F013: 20 2B F1   177          JSR   CHKDRV      ;SET ZERO FLAG IF MOTOR STOPPED
F016: 08         178          PHP               ;SAVE TEST RESULTS
F017: A5 85      179          LDA   IBBUFP      ;MOVE OUT POINTER TO BUFFER INTO ZPAGE
F019: 85 9B      180          STA   BUF
F01B: A5 86      181          LDA   IBBUFP+1
F01D: 85 9C      182          STA   BUF+1
F01F: A9 E0      183          LDA   #DVMOT
F021: 85 9A      184          STA   MONTIMEH
F023: A5 82      185          LDA   IBDRVN      ;DETERMINE DRIVE ONE OR TWO
F025: C5 8A      186          CMP   IOBPDN      ;SAME DRIVE USED BEFORE?
F027: 85 8A      187          STA   IOBPDN      ;SAVE IT FOR NEXT TIME
F029: 08         188          PHP               ;KEEP RESULTS OF COMPARE
F02A: 6A         189          ROR   A           ;GET DRIVE NUMBER INTO CARRY
F02B: BD 89 C0   190          LDA   MOTORON,X   ;TURN ON THE DRIVE
F02E: 90 01      191          BCC   DRIVSEL     ;BRANCH IF DRIVE 1 SELECTED
F030: E8         192          INX               ;SELECT DRIVE 2
F031: BD 8A C0   193 DRIVSEL  LDA   DRV0EN,X
F034: 20 4C F1   194          JSR   SET1MEG     ;INSURE ONE MEGAHERTZ OPERATION
F037: 28         195          PLP               ;WAS IT SAME DRIVE?
F038: F0 0A      196          BEQ   OK
F03A: 28         197          PLP               ;MUST INDICATE DRIVE OFF BY SETTING ZERO
F03B: A0 07      198          LDY   #7          ;DELAY 150 MS BEFORE STEPPING       FLAG)
F03D: 20 56 F4   199 DRVWAIT  JSR   MSWAIT      ;(ON RETURN A=0)
F040: 88         200          DEY
F041: D0 FA      201          BNE   DRVWAIT
F043: 08         202          PHP               ;NOW ZERO FLAG SET
F044: A5 83      203 OK       LDA   IBTRK       ;GET DESTINATION TRACK
F046: A6 81      204          LDX   IBSLOT      ;RESTORE PROPER X (SLOT*16)
F048: 20 05 F1   205          JSR   MYSEEK      ;AND GO TO IT
F04B             206 *NOW AT THE DESIRED TRACK  WAS THE MOTOR
F04B             207 * ON TO START WITH?
F04B: 28         208          PLP               ;WAS MOTOR ON?
F04C: D0 17      209          BNE   TRYTRK      ;IF SO, DON'T DELAY, GET IT TODAY!
F04E             210 *
```

```
F04E                211 * MOTOR WAS OFF, WAIT FOR IT TO SPEED UP
F04E                212 *
F04E: A0 12         213 MOTOF    LDY  #$12        ;WAIT EXACTLY 100 US FOR EACH COUNT
F050: 88            214 CONWAIT  DEY                                          ;IN MONTIME
F051: D0 FD         215          BNE  CONWAIT
F053: E6 99         216          INC  MONTIMEL    ;COUNT UP TO 0000
F055: D0 F7         217          BNE  MOTOF
F057: E6 9A         218          INC  MONTIMEH
F059: D0 F3         219          BNE  MOTOF
F05B                221 **********************************
F05B                222 *
F05B                223 * MOTOR SHOULD BE UP TO SPEED.
F05B                224 * IF IT STILL LOOKS STOPPED THEN
F05B                225 * THE DRIVE IS NOT PRESENT.
F05B                226 *
F05B                227 **********************************
F05B: 20 2B F1      228          JSR  CHKDRV      ;IS DRIVE PRESENT?
F05E: D0 05         229          BNE  TRYTRK      ;YES, CONTINUE
F060: A9 80         230 NODRIVERR LDA #IBNODRV    ;NO, GET TELL EM NO DRIVE!
F062: 4C E8 F0      231          JMP  HNDLERR
F065                232 *
F065                233 * NOW CHECK. IF IT IS NOT THE FORMAT DISK COMMAND,
F065                234 *   LOCATE THE CORRECT SECTOR FOR THIS OPERATION
F065                235 *
F065: A5 87         236 TRYTRK   LDA  IBCMD       ;GET COMMAND CODE #
F067: F0 77         237          BEQ  ALLDONE     ;IF NULL COMMAND, GO HOME TO BED
F069: C9 03         238          CMP  #3          ;COMMAND IN RANGE?
F06B: B0 73         239          BCS  ALLDONE     ;NO, DO NOTHING!
F06D: 6A            240          ROR  A           ;SET CARRY=1 FOR READ, 0 FOR WRITE
F06E: B0 0B         241          BCS  TRYTRK2     ;MUST PRENIBBLIZE FOR WRITE
F070: AD DF FF      242          LDA  ENVIRON
F073: 29 7F         243          AND  #TWOMEG     ;SHIFT TO HIGH SPEED!
F075: 8D DF FF      244          STA  ENVIRON
F078: 20 C6 F2      245          JSR  PRENIB16
F07B: A0 7F         246 TRYTRK2  LDY  #$7F        ;ONLY 127 RETRIES OF ANY KIND
F07D: 84 93         247          STY  RETRYCNT
F07F: A6 81         248 TRYADR   LDX  IBSLOT      ;GET SLOT NUM INTO X-REG
F081: 20 BD F1      249          JSR  RDADR16     ;READ NEXT ADDRESS FIELD
F084: 90 21         250          BCC  RDRIGHT     ;IF READ IT RIGHT, HURRAH!
F086: 24 8B         251 TRYADR2  BIT  IMASK       ;SHOULD INTERUPTS BE ALLOWED?
F088: 30 01         252          BMI  NOINTR1     ;NO, DON'T ALLOW THEM.
                                                  ;RE-ENABLED AFTER READ/READADR/WRIT' FAILURE
F08A: 58            253          CLI
F08B: C6 93         254          DEC  RETRYCNT    ;ANOTHER MISTAEK!!
F08D: 10 F0         255          BPL  TRYADR      ;WELL, LET IT GO THIS TIME
F08F: A5 8C         256          LDA  CURTRK
F091: 48            257          PHA              ;SAVE TRACK WE REALLY WANT
F092: C6 94         258          DEC  SEEKCNT     ;ONLY RECALIBRATE ONCE!
F094: D0 4F         259          BNE  DRVERR      ;TRIED TO RECALIBRATE A SECOND TIME, ERROR!
F096: A9 60         260          LDA  #$60        ;RECALIBRATE ALL OVER AGAIN'
F098: 20 25 F1      261          JSR  SETTRK      ;PRETEND TO BE ON TRACK 80
F09B: A9 00         262          LDA  #$00
F09D: 20 05 F1      263          JSR  MYSEEK      ;MOVE TO TRACK 00
F0A0: 68            264 GOCAL1   PLA
F0A1: 20 05 F1      265 GOCAL    JSR  MYSEEK      ;GO TO CORRECT TRACK THIS TIME!
F0A4: 4C 7B F0      266          JMP  TRYTRK2     ;LOOP BACK, TRY AGAIN ON THIS TRACK
F0A7                267 *
F0A7                268 * HAVE NOW READ AN ADDRESS FIELD CORRECTLY.
F0A7                269 * MAKE SURE THIS IS THE TRACK, SECTOR, AND VOLUME DESIRED.
F0A7: A4 99         270 RDRIGHT  LDY  TRACK       ;ON THE RIGHT TRACK?
F0A9: C4 8C         271          CPY  CURTRK
F0AB: F0 0E         272          BEQ  RTTRK       ;IF SO, GOOD
F0AD                273 * RECALIBRATING FROM THIS TRACK
F0AD: A5 8C         274          LDA  CURTRK      ;PRESERVE DESTINATION TRACK
F0AF: 48            275          PHA
F0B0: 98            276          TYA
F0B1: 20 25 F1      277          JSR  SETTRK
F0B4: 68            278          PLA
F0B5: 20 05 F1      279          JSR  MYSEEK
F0B8: 4C 86 F0      280          JMP  TRYADR2     ;GO AHEAD AND RECALIBRATE
F0BB                282 *
F0BB                283 * DRIVE IS ON RIGHT TRACK, CHECK VOLUME MISMATCH
F0BB                284 *
F0BB: A5 9A         285 RTTRK    LDA  VOLUME      ;GET ACTUAL VOLUME HERE
F0BD: 85 89         286          STA  IBSMOD      ;TELL OPSYS WHAT VOLUME WAS THERE
```

```
FOBF:A5 98      287 CORRECTVOL LDA  SECT      ;CHECK IF THIS IS THE RIGHT SECTOR
FOC1:C5 84      288            CMP  IBSECT
FOC3:FO 02      289            BEQ  CORRECTSECT ;IF SO, DO WHATEVER WANTED
FOC5:DO BF      290            BNE  TRYADR2   ;NO, TRY ANOTHER SECTOR
FOC7:A5 87      291 CORRECTSECT LDA IBCMD     ;READ OR WRITE?
FOC9:4A         292            LSR  A         ;THE CARRY WILL TELL
FOCA:90 2D      293            BCC  WRIT      ;CARRY WAS SET FOR READ OPERATION,
FOCC:20 48 F1   294            JSR  READ16    ;CLEARED FOR WRITE
FOCF:BO B5      295            BCS  TRYADR2   ;CARRY SET UPON RETURN IF BAD READ
FOD1:AD DF FF   296            LDA  ENVIRON
FOD4:29 7F      297            AND  #TWOMEG
FOD6:8D DF FF   298            STA  ENVIRON   ;SET TWO MEGAHERTZ MODE
FOD9:20 11 F3   299            JSR  POSTNIB16 ;DO PARTIAL POSTNIBBLE CONVERSION
FODC:BO A8      300            BCS  TRYADR2   ;CHEKSUM ERROR
FODE:A6 81      301            LDX  IBSLOT    ;RESTORE SLOTNUM INTO X
FOE0:18         302 ALLDONE    CLC
FOE1:A9 00      303            LDA  #$0       ;NO ERROR
FOE3:90 04      304            BCC  ALDONE1   ;SKIP OVER NEXT BYTE WITH BIT OPCODE
FOE5:68         305 DRVERR     PLA            ;REMOVE CURTRK
FOE6:A9 82      306            LDA  #IBDERR   ;BAD DRIVE
FOE8:38         307 HNDLERR    SEC            ;INDICATE AN ERROR
FOE9:85 86      308 ALDONE1    STA  IBSTAT    ;GIVE HIM ERROR#
FOEB:BD 88 C0   309            LDA  MOTOROFF,X ;TURN IT OFF
FOEE:24 8B      310            BIT  IMASK     ;SHOULD INTERUPTS BE ENABLED?
FOF0:30 01      311            BMI  NOINTR2   ;BRANCH IF NOT
FOF2:58         312            CLI
FOF3:A5 9F      313 NOINTR2    LDA  ENVTEMP   ;RESTORE ORIGINAL ENVIRONMENT
FOF5:8D DF FF   314            STA  ENVIRON
FOF8:60         315            RTS
FOF9:20 19 F9   316 WRIT       JSR  WRITE16   ;WRITE NYBBLES NOW
FOFC:90 E2      317            BCC  ALLDONE   ;IF NO ERRORS
FOFE:A9 81      318            LDA  #IBWPER   ;DISK IS WRITE PROTECTED!!
F100:50 E6      319            BVC  HNDLERR   ;TAKEN IF TRULY WRITE PROTECT ERROR
F102:4C 86 F0   320            JMP  TRYADR2   ;OTHERWISE ASSUME AN INTERUPT MESSED
F105:           321 *                                                     THINGS UP
F105            322 * THIS IS THE 'SEEK' ROUTINE
F105            323 *   SEEKS TRACK 'N' IN SLOT #X/$10
F105            324 *   IF DRIVNO IS NEGATIVE, ON DRIVE 0
F105            325 *   IF DRIVNO IS POSITIVE, ON DRIVE 1
F105            326 *
F105:0A         327 MYSEEK     ASL  A         ;ASSUME TWO PHASE STEPPER
F106:85 99      328 SEEK1      STA  TRKN1     ;SAVE DESTINATION TRACK(*2)
F108:20 19 F1   329            JSR  ALLOFF    ;TURN ALL PHASES OFF TO BE SURE
F10B:20 3E F1   330            JSR  DRVINDX   ;GET INDEX TO PREVIOUS TRACK FOR CURRENT
F10E:B5 85      331            LDA  DRVOTRK,X                                    DRIVE
F110:85 8C      332            STA  CURTRK    ;THIS IS WHERE I AM
F112:A5 99      333            LDA  TRKN1     ;AND WHERE I'M GOING TO
F114:95 85      334            STA  DRVOTRK,X
F116:20 00 F4   335 GOSEEK     JSR  SEEK      ;GO THERE!
F119:A0 03      336 ALLOFF     LDY  #3        ;TURN OFF ALL PHASES BEFORE RETURNING
F11B:98         337 NXOFF      TYA            ;(SEND PHASE IN ACC.)
F11C:20 4A F4   338            JSR  CLRPHASE  ;CARRY IS CLEAR, PHASES SHOLD BE TURNED
F11F:88         339            DEY                                                  OFF
F120:10 F9      340            BPL  NXOFF
F122:46 8C      341            LSR  CURTRK    ;DIVIDE BACK DOWN
F124:60         342            RTS            ;ALL OFF... NOW IT'S DARK
F125:           344 *
F125:           345 * THIS SUBROUTINE SETS THE SLOT DEPENDENT TRACK
F125            346 * LOCATION
F125            347 *
F125:20 3E F1   348 SETTRK     JSR  DRVINDX   ;GET INDEX TO DRIVE NUMBER
F128:95 85      349            STA  DRVOTRK,X
F12A:60         350            RTS
F12B:           351 *****************************
F12B:           352 *
F12B:           353 * SUBR TO TELL IF MOTOR IS STOPPED
F12B            354 *
F12B:           355 * IF MOTOR IS STOPPED, CONTROLLER'S
F12B            356 * SHIFT REG WILL NOT BE CHANGING.
F12B:           357 *
F12B            358 * RETURN Y=0 AND ZERO FLAG SET IF IT IS STOPPED
```

```
F12B:              359  *
F12B:              360  ********************************
F12B: A0 00        361  CHKDRV  LDY  #0           ;INIT LOOP COUNTER
F12D: BD 8C C0     362  CHKDRV1 LDA  Q6L,X        ;READ THE SHIFT REG
F130: 20 3D F1     363          JSR  CKDRTS       ;DELAY
F133: 48           364          PHA
F134: 68           365          PLA               ;MORE DELAY
F135: DD 8C C0     366          CMP  Q6L,X        ;HAS SHIFT REG CHANGED?
F138: D0 03        367          BNE  CKDRTS       ;YES, MOTOR IS MOVING
F13A: 88           368          DEY               ;NO, DEC RETRY COUNTER
F13B: D0 F0        369          BNE  CHKDRV1      ;AND TRY 256 TIMES
F13D: 60           370  CKDRTS  RTS               ;THEN RETURN
F13E:              371  *
F13E: 48           372  DRVINDX PHA               ;PRESERVE ACC.
F13F: 8A           373          TXA               ;GET SLOT(*$10)/8
F140: 4A           374          LSR  A
F141: 4A           375          LSR  A
F142: 4A           376          LSR  A
F143: 05 82        377          ORA  IBDRVN       ;FOR DRIVE 0 OR 1
F145: AA           378          TAX               ;INTO X FOR INDEX TO TABLE
F146: 68           379          PLA               ;RESTORE ACC.
F147: 60           380          RTS
F148:              381  ********************************
F148:              382  *
F148:              383  * NOTE: FORMATTING ROUTINES
F148:              384  *       NOT INCLUDED FOR SOS
F148:              385  *
F148:              386  ********************************
F148:              387  ********************************
F148:              389  *                                *
F148:              390  *      READ SUBROUTINE           *
F148:              391  *      (16-SECTOR FORMAT)        *
F148:              392  *                                *
F148:              393  ********************************
F148:              394  *                                *
F148:              395  *   READS ENCODED BYTES          *
F148:              396  *   INTO NBUF1 AND NBUF2         *
F148:              397  *                                *
F148:              398  *   FIRST READS NBUF2            *
F148:              399  *         HIGH TO LOW,           *
F148:              400  *   THEN READS NBUF1             *
F148:              401  *         LOW TO HIGH.           *
F148:              402  *                                *
F148:              403  *   ---- ON ENTRY ----           *
F148:              404  *                                *
F148:              405  *   X-REG: SLOTNUM               *
F148:              406  *          TIMES $10.            *
F148:              407  *                                *
F148:              408  *   READ MODE (Q6L, Q7L)         *
F148:              409  *                                *
F148:              410  *   ---- ON EXIT ----            *
F148:              411  *                                *
F148:              412  *   CARRY SET IF ERROR.          *
F148:              413  *                                *
F148:              414  *   IF NO ERROR:                 *
F148:              415  *      A-REG HOLDS $AA.          *
F148:              416  *      X-REG UNCHANGED.          *
F148:              417  *      Y-REG HOLDS $00.          *
F148:              418  *      CARRY CLEAR.              *
F148:              419  *   ---- CAUTION ----            *
F148:              420  *                                *
```

```
F148:              421 *         OBSERVE              *
F148:              422 *       'NO PAGE CROSS'        *
F148:              423 *        WARNINGS ON           *
F148:              424 *       SOME BRANCHES!!        *
F148:              425 *                              *
F148:              426 *       ---- ASSUMES ----      *
F148:              427 *                              *
F148:              428 *    1 USEC CYCLE TIME         *
F148:              429 *                              *
F148:              430 ******************************
F148: A0 20        431 READ16   LDY  #$20       ;'MUST FIND' COUNT.
F14A: 88           432 RSYNC    DEY             ;IF CAN'T FIND MARKS
F14B: F0 6B        433          BEQ  RDERR      ;THEN EXIT WITH CARRY SET
F14D: BD 8C C0     434 RD1      LDA  Q6L,X      ;READ NIBL.
F150: 10 FB        435          BPL  RD1        ;*** NO PAGE CROSS! ***
F152: 49 D5        436 RSYNC1   EOR  #$D5       ;DATA MARK 1?
F154: D0 F4        437          BNE  RSYNC      ;LOOP IF NOT.
F156: EA           438          NOP             ;DELAY BETWEEN NIBLS.
F157: BD 8C C0     439 RD2      LDA  Q6L,X
F15A: 10 FB        440          BPL  RD2        ;*** NO PAGE CROSS! ***
F15C: C9 AA        441          CMP  #$AA       ;DATA MARK 2?
F15E: D0 F2        442          BNE  RSYNC1     ;(IF NOT, IS IT DM1?)
F160: A0 55        443          LDY  #$55       ;INIT NBUF2 INDEX.
F162:              444 *                        (ADDED NIBL DELAY)
F162: BD 8C C0     445 RD3      LDA  Q6L,X
F165: 10 FB        446          BPL  RD3        ;*** NO PAGE CROSS! ***
F167: C9 AD        447          CMP  #$AD       ;DATA MARK 3?
F169: D0 E7        448          BNE  RSYNC1     ;(IF NOT, IS IT DM1?)
F16B:              449 *             (CARRY SET IF DM3!)
F16B: BD 8C C0     450 RD4      LDA  Q6L,X
F16E: 10 FB        451          BPL  RD4        ;*** NO PAGE CROSS! ***
F170: 99 02 03     452          STA  NBUF2,Y    ;STORE BYTES DIRECTLY
F173: AD EF FF     453          LDA  INTERUPT   ;POLL INTERUPT LINE
F176: 05 8B        454          ORA  IMASK      ;(THIS MAY BE USED TO INVALIDATE POLL)
F178: 10 40        455          BPL  GOSERV
F17A: 88           456          DEY             ;INDEX TO NEXT
F17B: 10 EE        457          BPL  RD4
F17D: C8           458 RD5      INY             ;(FIRST TIME Y=0)
F17E: BD 8C C0     459 RD5A     LDA  Q6L,X      ;GET ENCODED BYTES OF NBUF1
F181: 10 FB        460          BPL  RD5A
F183: 99 00 03     461          STA  NBUF1,Y
F186: AD EF FF     462          LDA  INTERUPT   ;POLL INTERUPT LINE
F189: 05 8B        463          ORA  IMASK      ;(THIS MAY BE USED TO INVALIDATE POLL)
F18B: 10 2D        464          BPL  GOSERV
F18D: C0 E4        465          CPY  #$E4       ;WITHIN 1 MS OF COMPLETION?
F18F: D0 EC        466          BNE  RD5
F191: C8           467          INY
F192: BD 8C C0     468 RD6      LDA  Q6L,X      ;NO POLL FROM NOW ON
F195: 10 FB        469          BPL  RD6
F197: 99 00 03     470          STA  NBUF1,Y
F19A: C8           471          INY             ;FINISH OUT NBUF1 PAGE
F19B: D0 F5        472          BNE  RD6
F19D: BD 8C C0     473 RDCKSUM  LDA  Q6L,X      ;GET CHECKSUM BYTE.
F1A0: 10 FB        474          BPL  RDCKSUM
F1A2: 85 96        475          STA  CKSUM
F1A4: EA           476          NOP             ;EXTRA DELAY BETWEEN BYTES
F1A5: BD 8C C0     477 RD7      LDA  Q6L,X
F1A8: 10 FB        478          BPL  RD7        ;*** NO PAGE CROSS! ***
F1AA: C9 DE        479          CMP  #$DE       ;FIRST BIT SLIP MARK?
F1AC: D0 0A        480          BNE  RDERR      ;(ERR IF NOT)
F1AE: EA           481          NOP             ;DELAY BETWEEN NIBLS
F1AF: BD 8C C0     482 RD8      LDA  Q6L,X
F1B2: 10 FB        483          BPL  RD8        ;*** NO PAGE CROSS! ***
F1B4: C9 AA        484          CMP  #$AA       ;SECOND BIT SLIP MARK?
F1B6: F0 5F        485          BEQ  RDEXIT     ;(DONE IF IT IS)
F1B8: 38           486 RDERR    SEC             ;INDICATE 'ERROR EXIT'.
F1B9: 60           487          RTS             ;RETURN FROM READ16 OR RDADR16.
F1BA:              488 *
F1BA: 4C B3 F2     489 GOSERV   JMP  SERVICE    ;GO SERVICE INTERUPT.
```

```
F1BD:          491 ************************
F1BD:          492 *                        *
F1BD:          493 *   READ ADDRESS FIELD   *
F1BD:          494 *       SUBROUTINE       *
F1BD:          495 *    (16-SECTOR FORMAT)  *
F1BD:          496 *                        *
F1BD:          497 ************************
F1BD:          498 *                        *
F1BD:          499 *   READS VOLUME, TRACK  *
F1BD:          500 *       AND SECTOR       *
F1BD:          501 *                        *
F1BD:          502 *   ----- ON ENTRY ----- *
F1BD:          503 *                        *
F1BD:          504 *   XREG: SLOTNUM TIMES $10 *
F1BD:          505 *                        *
F1BD:          506 *   READ MODE (Q6L, Q7L) *
F1BD:          507 *                        *
F1BD:          508 *   ----- ON EXIT -----  *
F1BD:          509 *                        *
F1BD:          510 *   CARRY SET IF ERROR   *
F1BD:          511 *                        *
F1BD:          512 *   IF NO ERROR:         *
F1BD:          513 *     A-REG HOLDS $AA    *
F1BD:          514 *     Y-REG HOLDS $00.   *
F1BD:          515 *     X-REG UNCHANGED.   *
F1BD:          516 *     CARRY CLEAR.       *
F1BD:          517 *                        *
F1BD:          518 *   CSSTV HOLDS CHKSUM,  *
F1BD:          519 *     SECTOR, TRACK, AND *
F1BD:          520 *     VOLUME READ.       *
F1BD:          521 *                        *
F1BD:          522 *   USES TEMPS COUNT,    *
F1BD:          523 *     LAST, CSUM, AND    *
F1BD:          524 *     4 BYTES AT CSSTV.  *
F1BD:          525 *                        *
F1BD:          526 *   ----- EXPECTS -----  *
F1BD:          527 *                        *
F1BD:          528 *   ORIGINAL 10-SECTOR   *
F1BD:          529 *   NORMAL DENSITY NIBLS *
F1BD:          530 *   (4-BIT), ODD BITS,   *
F1BD:          531 *   THEN EVEN            *
F1BD:          532 *                        *
F1BD:          533 *   ----- CAUTION -----  *
F1BD:          534 *                        *
F1BD:          535 *       OBSERVE          *
F1BD:          536 *     'NO PAGE CROSS'    *
F1BD:          537 *      WARNINGS ON       *
F1BD:          538 *     SOME BRANCHES!!    *
F1BD:          539 *                        *
F1BD:          540 *   ----- ASSUMES -----  *
F1BD:          541 *                        *
F1BD:          542 *   1 USEC CYCLE TIME    *
F1BD:          543 *                        *
F1BD:          544 ************************
F1BD:A0 FC     545 RDADR16 LDY  #$FC
F1BF:84 95     546         STY  COUNT       ;'MUST FIND' COUNT.
```

```
F1C1: C8         547 RDASYN  INY
F1C2: D0 04      548         BNE   RDA1         ;LOW ORDER OF COUNT
F1C4: E6 95      549         INC   COUNT        ;(2K NIBLS TO FIND
F1C6: F0 F0      550         BEQ   RDERR        ; ADR MARK, ELSE ERR)
F1C8: BD 8C C0   551 RDA1    LDA   Q6L,X        ;READ NIBL
F1CB: 10 FB      552         BPL   RDA1         ;*** NO PAGE CROSS! ***
F1CD: C9 D5      553 RDASN1  CMP   #$D5         ;ADR MARK 1?
F1CF: D0 F0      554         BNE   RDASYN       ;(LOOP IF NOT)
F1D1: EA         555         NOP                ;ADDED NIBL DELAY
F1D2: BD 8C C0   556 RDA2    LDA   Q6L,X
F1D5: 10 FB      557         BPL   RDA2         ;*** NO PAGE CROSS! ***
F1D7: C9 AA      558         CMP   #$AA         ;ADR MARK 2?
F1D9: D0 F2      559         BNE   RDASN1       ;(IF NOT, IS IT AM1?)
F1DB: A0 03      560         LDY   #$3          ;INDEX FOR 4-BYTE READ
F1DD:            561 *             (ADDED NIBL DELAY)
F1DD: BD 8C C0   562 RDA3    LDA   Q6L,X
F1E0: 10 FB      563         BPL   RDA3         ;*** NO PAGE CROSS! ***
F1E2: C9 96      564         CMP   #$96         ;ADR MARK 3?
F1E4: D0 E7      565         BNE   RDASN1       ;(IF NOT, IS IT AM1?)
F1E6:            566 *             (LEAVES CARRY SET!)
F1E6: A9 00      567         LDA   #$0          ;INIT CHECKSUM
F1E8: 85 89      568 RDAFLD  STA   CSUM
F1EA: BD 8C C0   569 RDA4    LDA   Q6L,X        ;READ 'ODD BIT' NIBL
F1ED: 10 FB      570         BPL   RDA4         ;*** NO PAGE CROSS! ***
F1EF: 2A         571         ROL   A            ;ALIGN ODD BITS, 1' INTO LSB
F1F0: 85 95      572         STA   LAST         ;(SAVE THEM)
F1F2: BD 8C C0   573 RDA5    LDA   Q6L,X        ;READ 'EVEN BIT' NIBL
F1F5: 10 FB      574         BPL   RDA5         ;*** NO PAGE CROSS! ***
F1F7: 25 95      575         AND   LAST         ;MERGE ODD AND EVEN BITS
F1F9: 99 97 00   576         STA   CSSTV,Y      ;STORE DATA BYTE
F1FC: 45 89      577         EOR   CSUM
F1FE: 88         578         DEY
F1FF: 10 E7      579         BPL   RDAFLD       ;LOOP ON 4 DATA BYTES
F201: A8         580         TAY                ;IF FINAL CHECKSUM
F202: D0 B4      581         BNE   RDERR        ;NONZERO, THEN ERROR
F204: BD 8C C0   582 RDA6    LDA   Q6L,X        ;FIRST BIT-SLIP NIBL
F207: 10 FB      583         BPL   RDA6         ;*** NO PAGE CROSS! ***
F209: C9 DE      584         CMP   #$DE
F20B: D0 AB      585         BNE   RDERR        ;ERROR IF NONMATCH
F20D: 78         586         SEI                ;DELAY (NO INTERUPTS FROM NOW ON)
F20E: BD 8C C0   587 RDA7    LDA   Q6L,X        ;SECOND BIT-SLIP NIBL
F211: 10 FB      588         BPL   RDA7         ;*** NO PAGE CROSS! ***
F213: C9 AA      589         CMP   #$AA
F215: D0 A1      590         BNE   RDERR        ;ERROR IF NONMATCH
F217: 18         591 RDEXIT  CLC                ;CLEAR CARRY ON
F218: 60         592 WEXIT   RTS                ; NORMAL READ EXITS
F219:            593         CHN   RWTS2
F219:              2 **************************
F219:              3 *                        *
F219:              4 *     WRITE SUBR         *
F219:              5 *   (16-SECTOR FORMAT)   *
F219:              6 *                        *
F219:              7 **************************
F219:              8 *                        *
F219:              9 *    WRITES DATA FROM    *
F219:             10 *    NBUF1 AND NBUF2     *
F219:             11 *                        *
F219:             12 *   FIRST NBUF2,         *
F219:             13 *     HIGH TO LOW,       *
F219:             14 *   THEN NBUF1,          *
F219:             15 *     LOW TO HIGH        *
F219:             16 *                        *
F219:             17 *   ---- ON ENTRY ----   *
F219:             18 *                        *
F219:             19 *   X-REG  SLOTNUM       *
F219:             20 *          TIMES $10     *
F219:             21 *                        *
F219:             22 *                        *
F219:             23 *   ---- ON EXIT -----   *
F219:             24 *                        *
F219:             25 *  CARRY SET IF ERROR.   *
```

```
F219           26 *    (W PROT VIOLATION)   *
F219           27 *                         *
F219           28 *    IF NO ERROR:         *
F219           29 *                         *
F219           30 *      A-REG UNCERTAIN.   *
F219           31 *      X-REG UNCHANGED    *
F219           32 *      Y-REG HOLDS $00.   *
F219           33 *      CARRY CLEAR.       *
F219           34 *                         *
F219           35 *    ---- ASSUMES ----    *
F219           36 *                         *
F219           37 *    1 USEC CYCLE TIME    *
F219           38 *                         *
F219           39 *************************
F219:38        40 WRITE16  SEC                   ;ANTICIPATE WPROT ERR.
F21A:B8        41          CLV                   ;TO INDICATE WRITE PROTECT ERROR INSTEAD OF
F21B:BD 8D C0  42          LDA    Q6H,X                                             INTERUPT
F21E:BD 8E C0  43          LDA    Q7L,X          ;SENSE WPROT FLAG.
F221:30 F5     44          BMI    WEXIT          ;BRANCH IF NOT WRITE PROTECTED
F223:A9 FF     45 WRT1     LDA    #$FF           ;SYNC DATA.
F225:9D 8F C0  46          STA    Q7H,X          ;(5) GOTO WRITE MODE
F228:1D 8C C0  47          ORA    Q6L,X          ;(4)
F22B:A0 04     48          LDY    #$4            ;(2) FOR FIVE NIBLS.
F22D:EA        49          NOP                   ;(2)
F22E:48        50          PHA                   ;(4)
F22F:68        51          PLA                   ;(3)
F230:48        52 WSYNC    PHA                   ;(4) EXACT TIMING
F231:68        53          PLA                   ;(3) EXACT TIMING
F232:20 BD F2  54          JSR    WNIBL7         ;(13,9,6)  WRITE SYNC
F235:88        55          DEY                   ;(2)
F236:D0 F8     56          BNE    WSYNC          ;(2*) MUST NOT CROSS PAGE!
F238:A9 D5     57          LDA    #$D5           ;(2) 1ST DATA MARK
F23A:20 BC F2  58          JSR    WNIBL9         ;(15,9,6)
F23D:A9 AA     59          LDA    #$AA           ;(2) 2ND DATA MARK
F23F:20 BC F2  60          JSR    WNIBL9         ;(15,9,6)
F242:A9 AD     61          LDA    #$AD           ;(2) 3RD DATA MARK.
F244:20 BC F2  62          JSR    WNIBL9         ;(15,9,6)
F247:A0 55     63          LDY    #$55           ;(2) NBUF2 INDEX
F249:EA        64          NOP                   ;(2) FOR TIMING
F24A:EA        65          NOP                   ;(2)
F24B:EA        66          NOP                   ;(2)
F24C:D0 08     67          BNE    VRYFRST        ;(3) BRANCH ALWAYS
F24E:AD EF FF  68 WINTRPT  LDA    INTERUPT       ;(4) POLL INTERUPT LINE
F251:05 8B     69          ORA    IMASK          ;(3)
F253:EA        70          NOP                   ;(2)
F254:10 5D     71          BPL    SERVICE        ;(2) BRANCH IF INTERUPT HAS OCCURED
F256:30 00     72 VRYFRST  BMI    WRTFRST        ;(3) FOR TIMING.
F258:B9 02 03  73 WRTFRST  LDA    NBUF2,Y        ;(4)
F25B:9D 8D C0  74          STA    Q6H,X          ;(5) STORE ENCODED BYTE
F25E:BD 8C C0  75          LDA    Q6L,X          ;(4) TIME MUST = 32 US PER BYTE!
F261:88        76          DEY                   ;(2)
F262:10 EA     77          BPL    WINTRPT        ;(3) (2 IF BRANCH NOT TAKEN)
F264:98        78          TYA                   ;(2) INSURE NO INTERUPT THIS BYTE.
F265:30 03     79          BMI    WMIDLE         ;(3) BRANCH ALWAYS.
F267:AD EF FF  80 WNTRPT1  LDA    INTERUPT       ;(4) POLL INTERUPT LINE
F26A:05 8B     81 WMIDLE   ORA    IMASK          ;(3)
F26C:EA        82          NOP                   ;(2)
F26D:30 02     83          BMI    WDATA2         ;(3) BRANCH IF NO INTERUPT
F26F:10 42     84          BPL    SERVICE        ;GO SERVICE INTERUPT.
F271:C8        85 WDATA2   INY                   ;(2)
F272:B9 00 02  86          LDA    NBUF1,Y        ;(4)
F275:9D 8D C0  87          STA    Q6H,X          ;(5) STORE ENCODED BYTE
F278:BD 8C C0  88          LDA    Q6L,X          ;(4)
F27B:C0 E4     89          CPY    #$E4           ;(2) WITHIN 1 MS OF COMPLETION?
F27D:D0 E8     90          BNE    WNTRPT1        ;(3) (2) NO KEEP WRITTING AND POLLING.
F27F:EA        91          NOP                   ;(2)
F280:C8        92          INY                   ;(2)
F281:EA        93 WDATA3   NOP                   ;(2)
F282:EA        94          NOP                   ;(2)
F283:48        95          PHA                   ;(4)
F284:68        96          PLA                   ;(3)
F285:B9 00 02  97          LDA    NBUF1,Y        ;(4) WRITE LAST OF ENCODED BYTES
```

```
F288: 9D 8D C0   98           STA   Q6H,X        ;(5)  WITHOUT POLLING INTERUPTS.
F28B: BD 8C C0   99           LDA   Q6L,X        ;(4)
F28E: A5 96     100           LDA   CKSUM        ;(3) NORMALLY FOR TIMING
F290: C8        101           INY                ;(2)
F291: D0 EE     102           BNE   WDATA3       ;(3) (2)
F293: F0 00     103           BEQ   WRCKSUM      ;(3) BRANCH ALWAYS
F295: 20 BD F2  104 WRCKSUM   JSR   WNIBL7       ;(13,9,6) GO WRITE CHECK SUM!
F298: A9 DE     105           LDA   #$DE         ;(2)  DM4, BIT SLIP MARK.
F29A: 20 BC F2  106           JSR   WNIBL9       ;(15,9,6)    WRITE IT.
F29D: A9 AA     107           LDA   #$AA         ;(2)  DM5, BIT SLIP MARK
F29F: 20 BC F2  108           JSR   WNIBL9       ;(15,9,6)    WRITE IT.
F2A2: A9 EB     109           LDA   #$EB         ;(2)  DM6, BIT SLIP MARK.
F2A4: 20 BC F2  110           JSR   WNIBL9       ;(15,9,6)    WRITE IT.
F2A7: A9 FF     111           LDA   #$FF         ;(2)  TURN-OFF BYTE.
F2A9: 20 BC F2  112           JSR   WNIBL9       ;(15,9,9)    WRITE IT.
F2AC: BD 8E C0  113 NOWRITE   LDA   Q7L,X        ;OUT OF WRITE MODE.
F2AF: BD 8C C0  114           LDA   Q6L,X        ;TO READ MODE.
F2B2: 60        115           RTS                ;RETURN FROM WRITE.
F2B3:           116 *
F2B3: 38        117 SERVICE   SEC                ;TREAT INTERUPTION AS ERROR
F2B4: 2C 54 F3  118           BIT   SEV          ;SET VFLAG TO INDICATE INTERUPT
F2B7: 20 AC F2  119           JSR   NOWRITE      ;TAKE IT OUT OF WRITE MODE!
F2BA: 58        120           CLI                ;COULD NOT HAVE GOT HERE WITHOUT CLI OK
F2BB: 60        121           RTS
F2BC:           122 ******************************
F2BC:           123 *
F2BC:           124 *    7-BIT NIBL WRITE SUBRS   *
F2BC:           125 *
F2BC:           126 *    A-REG OR'D PRIOR EXIT    *
F2BC:           127 *       CARRY CLEARED         *
F2BC:           128 *
F2BC:           129 ******************************
F2BC: 18        130 WNIBL9    CLC                ;(2)  9 CYCLES, THEN WRITE
F2BD: 48        131 WNIBL7    PHA                ;(3)  7 CYCLES, THEN WRITE
F2BE: 68        132           PLA                ;(4)
F2BF: 9D 8D C0  133 WNIBL     STA   Q6H,X        ;(5)  NIBL WRITE SUB
F2C2: 1D 8C C0  134           ORA   Q6L,X        ;(4)  CLOBBERS ACC, NOT CARRY
F2C5: 60        135           RTS
F2C6:           136 *
F2C6:           138 ******************************
F2C6:           139 *                            *
F2C6:           140 *     PRENIBLIZE SUBR        *
F2C6:           141 *     (16-SECTOR FORMAT)     *
F2C6:           142 *                            *
F2C6:           143 ******************************
F2C6:           144 *                            *
F2C6:           145 *  CONVERTS 256 BYTES OF     *
F2C6:           146 *  USER DATA IN (BUF) INTO   *
F2C6:           147 *  ENCODED BYTES TO BE       *
F2C6:           148 *  WRITEN DIRECTLY TO DISK   *
F2C6:           149 *  ENCODED CHECK SUM IN      *
F2C6:           150 *  ZERO PAGE 'CKSUM'         *
F2C6:           151 *                            *
F2C6:           152 *    ---- ON ENTRY ----      *
F2C6:           153 *                            *
F2C6:           154 *  BUF IS 2-BYTE POINTER     *
F2C6:           155 *   TO 256 BYTES OF USER     *
F2C6:           156 *   DATA.                    *
F2C6:           157 *                            *
F2C6:           158 *    ---- ON EXIT ----       *
F2C6:           159 *                            *
F2C6:           160 *  A-REG CHECK SUM.          *
F2C6:           161 *  X-REG UNCERTAIN           *
F2C6:           162 *  Y-REG HOLDS 0.            *
F2C6:           163 *  CARRY SET.                *
F2C6:           164 *                            *
F2C6:           165 ******************************
F2C6: A2 02     166 PRENIB16  LDX   #$2          ;START NBUF2 INDEX.
F2C8: A0 00     167           LDY   #0           ;START USER BUF INDEX.
F2CA: 88        168 PRENIB1   DEY                ;NEXT USER BYTE.
F2CB: B1 9B     169           LDA   (BUF),Y
F2CD: 4A        170           LSR   A            ;SHIFT TWO BITS OF
F2CE: 3E 01 03  171           ROL   NBUF2-1,X    ;CURRENT USER BYTE
```

```
F2D1: 4A            172            LSR   A                 ;INTO CURRENT NBUF2
F2D2: 3E 01 03      173            ROL   NBUF2-1,X         ;BYTE.
F2D5: 99 01 02      174            STA   NBUF1+1,Y         ;(6 BITS LEFT).
F2D8: E8            175            INX                     ;FROM 0 TO $55.
F2D9: E0 56         176            CPX   #$56
F2DB: 90 ED         177            BCC   PRENIB1           ;BR IF NO WRAPAROUND.
F2DD: A2 00         178            LDX   #0                ;RESET NBUF2 INDEX.
F2DF: 98            179            TYA                     ;USER BUF INDEX.
F2E0: D0 E8         180            BNE   PRENIB1           ;(DONE IF ZERO)
F2E2: A0 56         181            LDY   #$56              ;(ACC=0 FOR CHECK SUM)
F2E4: 59 00 03      182 PRENIB3    EOR   NBUF2-2,Y         ;COMBINE WITH PREVIOUS
F2E7: 29 3F         183 PRENIB2    AND   #$3F              ;STRIP GARBAGE BITS
F2E9: AA            184            TAX                     ; TO FORM RUNNING CHECK SUM
F2EA: BD 55 F3      185            LDA   NIBL,X            ;GET ENCODED EQUIV.
F2ED: 99 01 03      186            STA   NBUF2-1,Y         ;REPLACE PREVIOUS
F2F0: B9 00 03      187            LDA   NBUF2-2,Y         ;RESTORE ACTUAL PREVIOUS
F2F3: 88            188            DEY
F2F4: D0 EE         189            BNE   PRENIB3           ;LOOP UNTIL ALL OF NBUF2 IS CONVERTED.
F2F6: 29 3F         190            AND   #$3F
F2F8: 59 01 02      191 PRENIB4    EOR   NBUF1+1,Y         ;NOW DO THE SAME FOR
F2FB: AA            192            TAX                     ;NIBBLE BUFFER 1
F2FC: BD 55 F3      193            LDA   NIBL,X            ;TO DO ANY BACK TRACKING (NBUF1-1).
F2FF: 99 00 02      194            STA   NBUF1,Y
F302: B9 01 02      195            LDA   NBUF1+1,Y         ;RECOVER THAT WHICH IS NOW 'PREVIOUS'.
F305: C8            196            INY
F306: D0 F0         197            BNE   PRENIB4
F308: AA            198            TAX                     ;USE LAST AS CHECK SUM
F309: BD 55 F3      199            LDA   NIBL,X
F30C: 85 96         200            STA   CKSUM
F30E: 4C 4C F3      201            JMP   SET1MEG           ;ALL DONE.
F311:               203 ****************************
F311:               204 *                            *
F311                205 *     POSTNIBLIZE SUBR       *
F311.               206 *     16-SECTOR FORMAT       *
F311:               207 *                            *
F311:               208 ****************************
F311:               209 *
F311: A0 55         210 POSTNIB16  LDY   #$55              ;FIRST CONVERT TO 6 BIT NIBBLES
F313: A9 00         211            LDA   #$0               ;INIT CHECK SUM
F315: BE 02 03      212 PNIBL1     LDX   NBUF2,Y           ;GET ENCODED BYTE
F318: 5D 00 F3      213            EOR   DNIBL,X
F31B: 99 02 03      214            STA   NBUF2,Y           ;REPLACE WITH 6 BIT EQUIV.
F31E: 88            215            DEY
F31F: 10 F4         216            BPL   PNIBL1            ;LOOP UNTIL DONE WITH NIBBLE BUFFER 2
F321: C8            217            INY                     ;NOW Y=0
F322: BE 00 02      218 PNIBL2     LDX   NBUF1,Y           ;DO THE SAME WITH
F325: 5D 00 F3      219            EOR   DNIBL,X
F328: 99 00 02      220            STA   NBUF1,Y           ; NIBBLE BUFFER 1
F32B: C8            221            INY                     ;DO ALL 256 BYTES
F32C: D0 F4         222            BNE   PNIBL2
F32E: A6 96         223            LDX   CKSUM             ;MAKE SURE CHECK SUM MATCHES
F330: 5D 00 F3      224            EOR   DNIBL,X           ;BETTER BE ZERO!
F333: 38            225            SEC                     ;ANTICIPATE ERROR
F334: D0 16         226            BNE   POSTERR           ;BRANCH IF IT IS
F336: A2 56         227 POST1      LDX   #$56              ;INIT NBUF2 INDEX
F338: CA            228 POST2      DEX                     ;NBUF IDX $55 TO $0.
F339: 30 FB         229            BMI   POST1             ;WRAPAROUND IF NEG
F33B: B9 00 02      230            LDA   NBUF1,Y
F33E: 5E 02 03      231            LSR   NBUF2,X           ;SHIFT 2 BITS FROM
F341: 2A            232            ROL   A                 ;CURRENT NBUF2 NIBL
F342: 5E 02 03      233            LSR   NBUF2,X           ;INTO CURRENT NBUF1
F345: 2A            234            ROL   A                 ;NIBL
F346: 91 9B         235            STA   (BUF),Y           ;BYTE OF USER DATA
F348: C8            236            INY                     ;NEXT USER BYTE
F349: D0 ED         237            BNE   POST2
F34B: 18            238            CLC                     ;GOOD DATA
F34C:               239 POSTERR    EQU   *
F34C: AD DF FF      240 SET1MEG    LDA   ENVIRON
F34F: 09 80         241            ORA   #ONEMEG           ;SET TO ONE MEGAHERTZ CLOCK RATE
F351: 8D DF FF      242            STA   ENVIRON
F354: 60            243 SEV        RTS                     ;(SEV USED TO SET VFLAG)
```

```
F355:                245  ************************
F355:                246  *                        *
F355:                247  *      6-BIT TO 7-BIT    *
F355:                248  *    NIBL CONVERSION TABLE *
F355:                249  *                        *
F355:                250  ************************
F355:                251  *                        *
F355:                252  *   CODES WITH MORE THAN *
F355:                253  *   ONE PAIR OF ADJACENT *
F355:                254  *     ZEROES OR WITH NO  *
F355:                255  *   ADJACENT ONES (EXCEPT*
F355:                256  *     B7) ARE EXCLUDED.  *
F355:                257  *                        *
F355:                258  ************************
F355: 96 97 9A       259  NIBL     DFB    $96,$97,$9A
F358: 9B 9D 9E       260           DFB    $9B,$9D,$9E
F35B: 9F A6 A7       261           DFB    $9F,$A6,$A7
F35E: AB AC AD       262           DFB    $AB,$AC,$AD
F361: AE AF B2       263           DFB    $AE,$AF,$B2
F364: B3 B4 B5       264           DFB    $B3,$B4,$B5
F367: B6 B7 B9       265           DFB    $B6,$B7,$B9
F36A: BA BB BC       266           DFB    $BA,$BB,$BC
F36D: BD BE BF       267           DFB    $BD,$BE,$BF
F370: CB CD CE       268           DFB    $CB,$CD,$CE
F373: CF D3 D6       269           DFB    $CF,$D3,$D6
F376: D7 D9 DA       270           DFB    $D7,$D9,$DA
F379: DB DC DD       271           DFB    $DB,$DC,$DD
F37C: DE DF E5       272           DFB    $DE,$DF,$E5
F37F: E6 E7 E9       273           DFB    $E6,$E7,$E9
F382: EA EB EC       274           DFB    $EA,$EB,$EC
F385: ED EE EF       275           DFB    $ED,$EE,$EF
F388: F2 F3 F4       276           DFB    $F2,$F3,$F4
F38B: F5 F6 F7       277           DFB    $F5,$F6,$F7
F38E: F9 FA FB       278           DFB    $F9,$FA,$FB
F391: FC FD FE       279           DFB    $FC,$FD,$FE
F394: FF             280           DFB    $FF
F395:                282  ************************
F395:                283  *                        *
F395:                284  *      7-BIT TO 6-BIT    *
F395:                285  *     'DENIBLIZE' TABL   *
F395:                286  *     (16-SECTOR FORMAT) *
F395:                287  *                        *
F395:                288  *       VALID CODES      *
F395:                289  *      $96 TO $FF ONLY.  *
F395:                290  *                        *
F395:                291  *                        *
F395:                292  *   CODES WITH MORE THAN *
F395:                293  *   ONE PAIR OF ADJACENT *
F395:                294  *     ZEROES OR WITH NO  *
F395:                295  *   ADJACENT ONES (EXCEPT*
F395:                296  *     BIT 7) ARE EXCLUDED*
F395:                297  ************************
F395: 00             298           BRK              ONE BYET LEFT OVER
F300:                299  DNIBL    EQU    REGRWTS+$300
F396: 00 01 98       300           DFB    $00,$01,$98
F399: 99 02 03       301           DFB    $99,$02,$03
```

```
F39C: 9C 04 05      302           DFB   $9C,$04,$05
F39F: 06 A0 A1      303           DFB   $06,$A0,$A1
F3A2: A2 A3 A4      304           DFB   $A2,$A3,$A4
F3A5: A5 07 08      305           DFB   $A5,$07,$08
F3A8: A8 A9 AA      306           DFB   $A8,$A9,$AA
F3AB: 09 0A 0B      307           DFB   $09,$0A,$0B
F3AE: 0C 0D B0      308           DFB   $0C,$0D,$B0
F3B1: B1 0E 0F      309           DFB   $B1,$0E,$0F
F3B4: 10 11 12      310           DFB   $10,$11,$12
F3B7: 13 B8 14      311           DFB   $13,$B8,$14
F3BA: 15 16 17      312           DFB   $15,$16,$17
F3BD: 18 19 1A      313           DFB   $18,$19,$1A
F3C0: C0 C1 C2      314           DFB   $C0,$C1,$C2
F3C3: C3 C4 C5      315           DFB   $C3,$C4,$C5
F3C6: C6 C7 C8      316           DFB   $C6,$C7,$C8
F3C9: C9 CA 1B      317           DFB   $C9,$CA,$1B
F3CC: CC 1C 1D      318           DFB   $CC,$1C,$1D
F3CF: 1E D0 D1      319           DFB   $1E,$D0,$D1
F3D2: D2 1F D4      320           DFB   $D2,$1F,$D4
F3D5: D5 20 21      321           DFB   $D5,$20,$21
F3D8: D8 22 23      322           DFB   $D8,$22,$23
F3DB: 24 25 26      323           DFB   $24,$25,$26
F3DE: 27 28 E0      324           DFB   $27,$28,$E0
F3E1: E1 E2 E3      325           DFB   $E1,$E2,$E3
F3E4: E4 29 2A      326           DFB   $E4,$29,$2A
F3E7: 2B E8 2C      327           DFB   $2B,$E8,$2C
F3EA: 2D 2E 2F      328           DFB   $2D,$2E,$2F
F3ED: 30 31 32      329           DFB   $30,$31,$32
F3F0: F0 F1 33      330           DFB   $F0,$F1,$33
F3F3: 34 35 36      331           DFB   $34,$35,$36
F3F6: 37 38 F8      332           DFB   $37,$38,$F8
F3F9: 39 3A 3B      333           DFB   $39,$3A,$3B
F3FC: 3C 3D 3E      334           DFB   $3C,$3D,$3E
F3FF: 3F            335           DFB   $3F
F400:               337  ****************************
F400:               338  *                          *
F400:               339  *  FAST SEEK SUBROUTINE    *
F400:               340  *                          *
F400:               341  ****************************
F400:               342  *                          *
F400:               343  *   ---- ON ENTRY -----    *
F400:               344  *                          *
F400:               345  *  X-REG HOLDS SLOTNUM     *
F400:               346  *        TIMES $10.        *
F400:               347  *                          *
F400:               348  *  A-REG HOLDS DESIRED     *
F400:               349  *        HALFTRACK.        *
F400:               350  *        (SINGLE PHASE)    *
F400:               351  *                          *
F400:               352  *  CURTRK HOLDS CURRENT    *
F400:               353  *        HALFTRACK.        *
F400:               354  *                          *
F400:               355  *   ---- ON EXIT -----     *
F400:               356  *                          *
F400:               357  *  A-REG UNCERTAIN.        *
F400:               358  *  Y-REG UNCERTAIN.        *
F400:               359  *  X-REG UNDISTURBED.      *
F400:               360  *                          *
F400:               361  *  CURTRK AND TRKN HOLD    *
F400:               362  *        FINAL HALFTRACK.  *
```

```
F400:              363 *                              *
F400:              364 *   PRIOR HOLDS PRIOR          *
F400:              365 *     HALFTRACK IF SEEK        *
F400:              366 *     WAS REQUIRED.            *
F400:              367 *                              *
F400:              368 *   MONTIMEL AND MONTIMEH      *
F400:              369 *     ARE INCREMENTED BY       *
F400:              370 *     THE NUMBER OF            *
F400:              371 *     100 USEC QUANTUMS        *
F400:              372 *     REQUIRED BY SEEK         *
F400:              373 *     FOR MOTOR ON TIME        *
F400:              374 *     OVERLAP.                 *
F400:              375 *                              *
F400:              376 * ---- VARIABLES USED ----     *
F400:              377 *                              *
F400:              378 *   CURTRK, TRKN, COUNT,       *
F400:              379 *     PRIOR, SLOTTEMP          *
F400:              380 *     MONTIMEL, MONTIMEH       *
F400:              381 *                              *
F400:              382 ********************************
F400: 85 9E        383 SEEK    STA  TRKN         ;SAVE TARGET TRACK
F402: C5 8C        384         CMP  CURTRK       ;ON DESIRED TRACK?
F404: F0 42        385         BEQ  SETPHASE     ;YES, ENERGIZE PHASE AND RETURN
F406: A9 00        386         LDA  #$0
F408: 85 95        387         STA  TRKCNT       ;HALFTRACK COUNT.
F40A: A5 8C        388 SEEK2   LDA  CURTRK       ;SAVE CURTRK FOR
F40C: 85 9D        389         STA  PRIOR        ;DELAYED TURNOFF.
F40E: 38           390         SEC
F40F: E5 9E        391         SBC  TRKN         ;DELTA-TRACKS.
F411: F0 31        392         BEQ  SEEKEND      ;BR IF CURTRK=DESTINATION
F413: B0 06        393         BCS  OUT          (MOVE OUT, NOT IN)
F415: 49 FF        394         EOR  #$FF         CALC TRKS TO GO.
F417: E6 8C        395         INC  CURTRK       INCR CURRENT TRACK (IN)
F419: 90 04        396         BCC  MINTST       (ALWAYS TAKEN).
F41B: 69 FE        397 OUT     ADC  #$FE         ;CALC TRKS TO GO.
F41D: C6 8C        398         DEC  CURTRK       ;DECR CURRENT TRACK (OUT).
F41F: C5 95        399 MINTST  CMP  TRKCNT
F421: 90 02        400         BCC  MAXTST         AND 'TRKS MOVED'
F423: A5 95        401         LDA  TRKCNT
F425: C9 09        402 MAXTST  CMP  #$9
F427: B0 02        403         BCS  STEP2        ;IF TRKCNT>$8 LEAVE Y ALONE (Y=$8)
F429: A8           404 STEP    TAY               ;ELSE SET ACCELERATION INDEX IN Y
F42A: 38           405         SEC
F42B: 20 48 F4     406 STEP2   JSR  SETPHASE
F42E: B9 67 F4     407         LDA  ONTABLE,Y    ;FOR 'ONTIME'.
F431: 20 56 F4     408         JSR  MSWAIT       ;(100 USEC INTERVALS)
F434: A5 9D        409         LDA  PRIOR
F436: 18           410         CLC               ;FOR PHASEOFF
F437: 20 4A F4     411         JSR  CLRPHASE     ;TURN OFF PRIOR PHASE
F43A: B9 70 F4     412         LDA  OFFTABLE,Y   THEN WAIT 'OFFTIME'.
F43D: 20 56 F4     413         JSR  MSWAIT       (100 USEC INTERVALS)
F440: E6 95        414         INC  TRKCNT       'TRACKS MOVED' COUNT.
F442: D0 C6        415         BNE  SEEK2        (ALWAYS TAKEN)
F444: 20 56 F4     416 SEEKEND JSR  MSWAIT       ;SETTLE 25 MSEC
F447: 18           417         CLC               ;SET FOR PHASE OFF
F448: A5 8C        418 SETPHASE LDA CURTRK       ;GET CURRENT TRACK
F44A: 29 03        419 CLRPHASE AND #3           ;MASK FOR 1 OF 4 PHASES
F44C: 2A           420         ROL  A            ;DOUBLE FOR PHASEON/OFF INDEX
F44D: 05 81        421         ORA  IBSLOT
F44F: AA           422         TAX
F450: BD 80 C0     423         LDA  PHASEOFF,X   ;TURN ON/OFF ONE PHASE
F453: A6 81        424         LDX  IBSLOT       ;RESTORE X-REG
F455: 60           425 SEEKRTS RTS               ;AND RETURN
F456:              427 ********************************
F456:              428 *                              *
F456:              429 *    MSWAIT SUBROUTINE         *
F456:              430 *                              *
```

```
F456          431  *******************************
F456          432  *                             *
F456          433  *   DELAYS A SPECIFIED        *
F456          434  *   NUMBER OF 100 USEC        *
F456          435  *   INTERVALS FOR MOTOR       *
F456          436  *   ON TIMING                 *
F456          437  *                             *
F456          438  *   ------- ON ENTRY ------   *
F456          439  *                             *
F456          440  *   A-REG HOLDS NUMBER        *
F456          441  *         OF 100 USEC         *
F456          442  *         INTERVALS TO        *
F456          443  *         DELAY               *
F456          444  *                             *
F456          445  *   ------ ON EXIT ------     *
F456          446  *                             *
F456          447  *   A-REG HOLDS #00           *
F456          448  *   X-REG HOLDS #00           *
F456          449  *   Y-REG UNCHANGED           *
F456          450  *   CARRY SET                 *
F456          451  *                             *
F456          452  *   MONTIMEL, MONTIMEH        *
F456          453  *     ARE INCREMENTED ONCE    *
F456          454  *     PER 100 USEC INTERVAL   *
F456          455  *     FOR MOTOR-ON TIMING     *
F456          456  *                             *
F456          457  *   ---- ASSUMES ----         *
F456          458  *                             *
F456          459  *   1 USEC CYCLE TIME         *
F456          460  *                             *
F456          461  *******************************
F456: A2 11   462  MSWAIT  LDX   #$11
F458: CA      463  MSW1    DEX                 DELAY 96 USEC
F459: D0 FD   464          BNE   MSW1
F45B: E6 79   465          INC   MONTIMEL
F45D: D0 02   466          BNE   MSW2          DOUBLE BYTE
F45F: E6 7A   467          INC   MONTIMEH      INCREMENT
F461: 38      468  MSW2    SEC
F462: E9 01   469          SBC   #$1           DONE IN INTERVALS
F464: D0 F0   470          BNE   MSWAIT        (A-REG COUNTS)
F466: 60      471          RTS
F467          472  *
F467:         474  *******************************
F467:         475  *                             *
F467:         476  *   PHASE ON-, OFF-TIME       *
F467:         477  *   TABLES IN 100-USEC        *
F467:         478  *   INTERVALS (SEEK)          *
F467:         479  *                             *
F467:         480  *******************************
F467: 01 30 28 481 ONTABLE  DFB  1,$30,$28
F46A: 24 20 1E 482          DFB  $24,$20,$1E
F46D: 1D 1C 1C 483          DFB  $1D,$1C,$1C
F470: 70 2C 26 484 OFFTABLE DFB  $70,$2C,$26
F473: 22 1F 1E 485          DFB  $22,$1F,$1E
F476: 1D 1C 1C 486          DFB  $1D,$1C,$1C
```

```
F479: 86 83      488 BLOCKIO STX   IBTRK
F47B: A0 05      489         LDY   #$5
F47D: 48         490         PHA
F47E: 0A         491 TRKSEC  ASL   A
F47F: 26 83      492         ROL   IBTRK
F481: 88         493         DEY
F482: D0 FA      494         BNE   TRKSEC
F484: 68         495         PLA
F485: 29 07      496         AND   #$7
F487: A8         497         TAY
F488: B9 A0 F4   498         LDA   SECTABL,Y
F48B: 85 84      499         STA   IBSECT
F48D: 20 00 F0   500         JSR   REGRWTS
F490: B0 0B      501         BCS   QUIT
F492: E6 86      502         INC   IBBUFP+1
F494: E6 84      503         INC   IBSECT
F496: E6 84      504         INC   IBSECT
F498: 20 00 F0   505         JSR   REGRWTS
F49B: C6 86      506         DEC   IBBUFP+1
F49D: A5 88      507 QUIT    LDA   IBSTAT
F49F: 60         508         RTS
F4A0:            509 *
F4A0:            510 SECTABL EQU   *
F4A0: 00 04 08   511         DFB   $0,$4,$8
F4A3: 0C 01 05   512         DFB   $C,$1,$5
F4A6: 09 0D      513         DFB   $9,$D
F4A8:            514 *
F4A8:            516 * * * * * * * * * * * * * * *
F4A8:            517 *                             *
F4A8:            518 *   JOYSTICK READ ROUTINE     *
F4A8:            519 *                             *
F4A8:            520 * * * * * * * * * * * * * * *
F4A8:            521 * ENTRY   ACC= COUNT DOWN HIGH *
F4A8:            522 *         X&Y= DON'T CARE      *
F4A8:            523 *                              *
F4A8:            524 *  EXIT   ACC= TIMER HIGH BYTE *
F4A8:            525 *         Y=   TIMER LOW BYTE  *
F4A8:            526 *         CARRY CLEAR          *
F4A8:            527 *                              *
F4A8:            528 *     IF CARRY SET, ROUTINE    *
F4A8:            529 *        WAS INTERUPTED &      *
F4A8:            530 *        ACC & Y ARE INVALID   *
F4A8:            531 * * * * * * * * * * * * * * *
F4A8:            532 *
FFD9             533 TIMLATCH EQU  $FFD9
FFD8             534 TIMER1L  EQU  $FFD8
FFD9             535 TIMER1H  EQU  $FFD9
C066             536 JOYRDY   EQU  $C066
F4A8             537 *
F4A8             538 ANALOG  EQU   *        ;CARRY SHOULD BE SET!
F4A8: 8D D9 FF   539         STA   TIMLATCH ;START THE TIMER!
F4AB: AD EF FF   540 ANLOG1  LDA   INTERUPT
F4AE: 2D 66 C0   541         AND   JOYRDY   ;WAIT FOR ONE OR THE OTHER TO GO LOW
F4B1: 20 FB      542         BMI   ANLOG1
F4B3: AD 66 C0   543         LDA   JOYRDY   ;WAY IT REALLY THE JOYSTICK?
F4B6: 30 0C      544         BMI   GOODTIME ;NOPE, FORGET IT
F4B8: 18         545         CLC            ;TIME'S A SLIP SLIDIN AWAY
F4B9: AD D9 FF   546         LDA   TIMER1H  ;NOW, WHAT TIME IS IT?
F4BC: AC D8 FF   547         LDY   TIMER1L
F4BF: 10 03      548         BPL   GOODTIME ;TIME WAS VALID!
F4C1: AD D9 FF   549         LDA   TIMER1H  ;HI BYTE CHANGED
F4C4: 60         550 GOODTIME RTS
*** SUCCESSFUL ASSEMBLY: NO ERRORS
```

| | | | |
|---|---|---|---|
| F0E9 ALDONE1 | F0E0 ALLDONE | F119 ALLOFF | ?F4A8 ANALOG |
| F4AB ANLOG1 | ?F479 BLOCKIO | 9D BUF | F12D CHKDRV1 |
| F12B CHKDRV | F13D CKDRTS | 96 CKSUM | F44A CLRPHASE |
| F050 CONWAIT | F0C7 CORRECTSECT | ?F0BF CORRECTVOL | 95 COUNT |
| 97 CSSTV | 97 CSUM1 | 89 CSUM | 8C CURTRK |
| F300 DNIBL | F031 DRIVSEL | C08A DRV0EN | 85 DRV0TRK |
| ?C08B DRV1EN | F0E5 DRVERR | F13E DRVINDX | F03D DRVWAIT |
| E0 DVMOT | FFDF ENVIRON | 9F ENVTEMP | ?F0A0 GOCAL1 |
| ?F0A1 GOCAL | F4C4 GOODTIME | ?F116 GOSEEK | F1BA GOSERV |
| F0E8 HNDLERR | 80 HRDERRS | 85 IBBUFP | 87 IBCMD |
| 82 IBDERR | 82 IBDRVN | 80 IBNODRV | ? 83 IBRERR |
| 84 IBSECT | 81 IBSLOT | 89 IBSMOD | 88 IBSTAT |
| 83 IBTRK | 81 IBWPER | 8B IMASK | FFEF INTERUPT |
| 8A IOBPDN | C066 JOYRDY | 95 LAST | F425 MAXTST |
| F41F MINTST | 9A MONTIMEH | 99 MONTIMEL | F04E MOTOF |
| C088 MOTOROFF | C089 MOTORON | F458 MSW1 | F461 MSW2 |
| F456 MSWAIT | F105 MYSEEK | 0200 NBUF1 | 0302 NBUF2 |
| F355 NIBL | ?F060 NODRIVERR | F08D NOINTR1 | F0F3 NOINTR2 |
| F2AC NOWRITE | F11B NXOFF | F470 OFFTABLE | F044 OK |
| 80 ONEMEG | F467 ONTABLE | F41D OUT | C080 PHASEOFF |
| ?C081 PHASEON | ?C081 PHASON | ?C080 PHSOFF | F315 PNIBL1 |
| F322 PNIBL2 | F336 POST1 | F338 POST2 | F34C POSTERR |
| F311 POSTNIB16 | F2CA PRENIB1 | F2C6 PRENIB16 | ?F2E7 PRENIB2 |
| F2E4 PRENIB3 | F2F8 PRENIB4 | 9D PRIOR | C08D Q6H |
| C08C Q6L | C08F Q7H | C08E Q7L | F49D QUIT |
| F14D RD1 | F157 RD2 | F162 RD3 | F16B RD4 |
| F17E RD5A | F17D RD5 | F192 RD6 | F1A5 RD7 |
| F1AF RD8 | F1C8 RDA1 | F1D2 RDA2 | F1DD RDA3 |
| F1EA RDA4 | F1F2 RDA5 | F204 RDA6 | F20E RDA7 |
| F1BD RDADR16 | F1E8 RDAFLD | F1CD RDASN1 | F1C1 RDASYN |
| F19D RDCKSUM | F1B8 RDERR | F217 RDEXIT | F0A7 RDRIGHT |
| F148 READ16 | F000 REGRWTS | 93 RETRYCNT | F152 RSYNC1 |
| F14A RSYNC | F0BB RTTRK | F4A0 SECTABL | 98 SECT |
| ?F106 SEEK1 | F40A SEEK2 | 94 SEEKCNT | F400 SEEK |
| F444 SEEKEND | ?F455 SEEKRTS | F2B3 SERVICE | F34C SET1MEG |
| F448 SETPHASE | F125 SETTRK | F354 SEV | F42B STEP2 |
| ?F429 STEP | 97 TEMP | FFD9 TIMER1H | FFD8 TIMER1L |
| FFD9 TIMLATCH | 99 TRACK | 95 TRKCNT | 9E TRKN |
| 99 TRKN1 | F47E TRKSEC | F086 TRYADR2 | F07F TRYADR |
| F07B TRYTRK2 | F065 TRYTRK | 7F TWOMEG | 9A VOLUME |
| F256 VRYFRST | F271 WDATA2 | F281 WDATA3 | F218 WEXIT |
| F24E WINTRPT | F26A WMIDLE | ?F2BF WNIBL | F2BD WNIBL7 |
| F2BC WNIBL9 | F267 WNTRPT1 | F295 WRCKSUM | F219 WRITE16 |
| F0F9 WRIT | ?F223 WRT1 | F258 WRTFRST | F230 WSYNC |
| 7F TWOMEG | 80 IBNODRV | 80 HRDERRS | 80 ONEMEG |
| 81 IBSLOT | 81 IBWPER | 82 IDDERR | 82 IBDRVN |
| ? 83 IBRERR | 83 IBTRK | 84 IBSECT | 85 DRV0TRK |
| 85 IBBUFP | 87 IBCMD | 88 IBSTAT | 89 CSUM |
| 89 IBSMOD | 8A IOBPDN | 8B IMASK | 8C CURTRK |
| 93 RETRYCNT | 94 SEEKCNT | 95 LAST | 95 TRKCNT |
| 95 COUNT | 96 CKSUM | 97 CSSTV | 97 CSUM1 |
| 97 TEMP | 98 SECT | 99 MONTIMEL | 99 TRKN1 |
| 99 TRACK | 9A MONTIMEH | 9A VOLUME | 9B BUF |
| 9D PRIOR | 9E TRKN | 9F ENVTEMP | E0 DVMOT |
| 0200 NBUF1 | 0302 NBUF2 | C066 JOYRDY | ?C080 PHSOFF |
| C080 PHASEOFF | ?C081 PHASON | ?C081 PHASEON | C088 MOTOROFF |
| C089 MOTORON | C08A DRV0EN | ?C08B DRV1EN | C08C Q6L |
| C08D Q6H | C08E Q7L | C08F Q7H | F000 REGRWTS |
| F031 DRIVSEL | F03D DRVWAIT | F044 OK | F04E MOTOF |
| F050 CONWAIT | ?F060 NODRIVERR | F065 TRYTRK | F07B TRYTRK2 |
| F07F TRYADR | F086 TRYADR2 | F08B NOINTR1 | ?F0A0 GOCAL1 |
| ?F0A1 GOCAL | F0A7 RDRIGHT | F0BB RTTRK | ?F0BF CORRECTVOL |
| F0C7 CORRECTSECT | F0E0 ALLDONE | F0E5 DRVERR | F0E8 HNDLERR |
| F0E9 ALDONE1 | F0F3 NOINTR2 | F0F9 WRIT | F105 MYSEEK |
| ?F106 SEEK1 | ?F116 GOSEEK | F119 ALLOFF | F11B NXOFF |
| F125 SETTRK | F12B CHKDRV | F12D CHKDRV1 | F13D CKDRTS |

| | | | |
|---|---|---|---|
| F13E DRVINDX | F148 READ16 | F14A RSYNC | F14D RD1 |
| F152 RSYNC1 | F157 RD2 | F162 RD3 | F16B RD4 |
| F17D RD5 | F17E RD5A | F192 RD6 | F19D RDCKSUM |
| F1A5 RD7 | F1AF RD8 | F1B8 RDERR | F1BA GOSERV |
| F1BD RDADR16 | F1C1 RDASYN | F1C8 RDA1 | F1CD RDASN1 |
| F1D2 RDA2 | F1DD RDA3 | F1E8 RDAFLD | F1EA RDA4 |
| F1F2 RDA5 | F204 RDA6 | F20E RDA7 | F217 RDEXIT |
| F218 WEXIT | F219 WRITE16 | ?F223 WRT1 | F230 WSYNC |
| F24E WINTRPT | F256 VRYFRST | F258 WRTFRST | F267 WNTRPT1 |
| F26A WMIDLE | F271 WDATA2 | F281 WDATA3 | F295 WRCKSUM |
| F2AC NOWRITE | F2B3 SERVICE | F2BC WNIBL9 | F2BD WNIBL7 |
| ?F2BF WNIBL | F2C6 PRENIB16 | F2CA PRENIB1 | F2E4 PRENIB3 |
| ?F2E7 PRENIB2 | F2F8 PRENIB4 | F300 DNIBL | F311 POSTNIB16 |
| F315 PNIBL1 | F322 PNIBL2 | F336 POST1 | F338 POST2 |
| F34C POSTERR | F34C SET1MEG | F354 SEV | F355 NIBL |
| F400 SEEK | F40A SEEK2 | F41B OUT | F41F MINTST |
| F425 MAXTST | ?F429 STEP | F42D STEP2 | F444 SEEKEND |
| F448 SETPHASE | F44A CLRPHASE | ?F455 SEEKRTS | F456 MSWAIT |
| F458 MSW1 | F461 MSW2 | F467 ONTABLE | F470 OFFTABLE |
| ?F479 BLOCKIO | F47E TRKSEC | F49D QUIT | F4A0 SECTABL |
| ?F4A8 ANALOG | F4AB ANLOG1 | F4C4 GOODTIME | FFD8 TIMER1L |
| FFD9 TIMLATCH | FFD9 TIMER1H | FFDF ENVIRON | FFEF INTERUPT |

```
0000:          2  ******************************
0000:          3  *
0000:          4  *SARA DIAGNOSTIC TEST ROUTINES
0000:          5  *
0000:          6  *DECEMBER 19, 1979
0000:          7  * BY
0000:          8  *W. BROEDNER & R. LASHLEY
0000:          9  *
0000:         10  *COPYRIGHT 1979 BY APPLE COMPUTER, INC
0000:         11  *
0000:         12  ******************************
0001:         13  ROM      EQU   $1         FOR RAM VERSION, 1 IF TRUELY ROM
0000:         14  ZRPG     EQU   $0
0010:         15  ZRPG1    EQU   $10
0018:         16  PTRLO    EQU   ZRPG1+8
0019:         17  PTRHI    EQU   ZRPG1+9
001A:         18  SNK      EQU   ZRPG1+$A
0087:         19  IBCMD    EQU   $87
0085:         20  IBBUFP   EQU   $85
0091:         21  PREVTRK  EQU   $91
F479:         22  BLOCKIO  EQU   $F479
005D:         23  CV       EQU   $5D
00FF:         24  STKG     EQU   $FF
1419:         25  IDNK     EQU   $1400+PTRHI
1810:         26  PHP      EQU   $1800+ZRPG1
C000:         27  KYBD     EQU   $C000
C008:         28  KEYBD    EQU   $C008
C010:         29  KBDSTRB  EQU   $C010
C058:         30  PDLEN    EQU   $C058
C047:         31  ADRS     EQU   $C047
C050:         32  GRMD     EQU   $C050
C051:         33  TXTMD    EQU   $C051
C066:         34  ADTO     EQU   $C066
C0D0:         35  DISKOFF  EQU   $C0D0
C0F1:         36  ACIAST   EQU   $C0F1
C0F2:         37  ACIACM   EQU   $C0F2
C0F3:         38  ACIACN   EQU   $C0F3
C100:         39  SLT1     EQU   $C100
C200:         40  SLT2     EQU   $C200
C300:         41  SLT3     EQU   $C300
C400:         42  SLT4     EQU   $C400
CFFF:         43  EXPROM   EQU   $CFFF
FFD0:         44  ZPREG    EQU   $FFD0
FFDF:         45  SYSD1    EQU   $FFDF
```

```
FFD2:              46 SYSD2    EQU    $FFD2
FFD3:              47 SYSD3    EQU    $FFD3
FFE0:              48 SYSE0    EQU    $FFE0
FFEF:              49 BNKSW    EQU    $FFEF
FFE2:              50 SYSE2    EQU    $FFE2
FFE3:              51 SYSE3    EQU    $FFE3
FC25:              52 COUT     EQU    $FC25
FD07:              53 CROUT1   EQU    $FD07
FD0F:              54 KEYIN    EQU    $FD0F
FBC7:              55 SETCVH   EQU    $FBC7
FD98:              56 CLDSTRT  EQU    $FD98
FD9D:              57 SETUP    EQU    $FD9D
F901:              58 MONITOR  EQU    $F901
0000:              59 *
----- NEXT OBJECT FILE NAME IS DIAG.OBJ
F4C5:              60          ORG    $F4C5
F4C5: 00 B1 B2    61 RAMTBL   DFB    $0,$B1,$B2,$BA,$B9,$10,$0,$13
F4C8: BA B9 10
F4CB: 00 13
F4CD:              62 CHPG     EQU    *
F4CD: 52 41 CD    63          DCI    'RAM'
F4D0: 52 4F CD    64          DCI    'ROM'
F4D3: 56 49 C1    65          DCI    'VIA'
F4D6: 41 43 49    66          DCI    'ACIA'
F4D9: C1
F4DA: 41 2F C4    67          DCI    'A/D'
F4DD: 44 49 41    68          DCI    'DIAGNOSTIC'
F4E0: 47 4E 4F
F4E3: 53 54 49
F4E6: C3
F4E7: 5A D0       69          DCI    'ZP'
F4E9: 52 45 54    70          DCI    'RETRY'
F4EC: 52 D9
F4EE:              71 *
F4EE:              72 * SETUP SYSTEM
F4EE:              73 *
F4EE:              74 *
F4EE: A9 53       75          LDA    #$52+ROM   TURN OFF SCREEN, SET 2MHZ SPEED
F4F0: 8D DF FF    76          STA    SYSD1      AND RUN OFF ROM
F4F3: A2 00       77          LDX    #$00       SET BANK SWITCH TO ZERO
F4F5: 8E E0 FF    78          STX    SYSE0
F4F8: 8E EF FF    79          STX    BNKSW
F4FB: 8E D0 FF    80          STX    ZPREG      AND SET ZERO PAGE SAME
F4FE: CA          81          DEX
F4FF: 8E D2 FF    82          STX    SYSD2      PROGRAM DDR'S
F502: 8E D3 FF    83          STX    SYSD3
F505: 9A          84          TXS
F506: E8          85          INX
F507: A9 0F       86          LDA    #$0F
F509: 8D E3 FF    87          STA    SYSE3
F50C: A9 3F       88          LDA    #$3F
F50E: 8D E2 FF    89          STA    SYSE2
F511: A0 06       90          LDY    #$06
F513: B9 D0 C0    91 DISK1    LDA    DISKOFF,Y
F516: 88          92          DEY
F517: 88          93          DEY
F518: 10 F9       94          BPL    DISK1
F51A: AD 08 C0    95          LDA    KEYBD
F51D: 29 04       96          AND    #$04
F51F: D0 03       97          BNE    NXBYT
F521: 4C 89 F6    98          JMP    RECON
F524:              99 *
F524:             100 * VERIFY ZERO PAGE
F524:             101 *
```

```
F524:A9 01      102 NXBYT   LDA     #$01        ROTATE A 1 THROUGH
F526:95 00      103 NXBIT   STA     ZRPG,X      EACH BIT IN THE 0 PG
F528:D5 00      104         CMP     ZRPG,X      TO COMPLETELY TEST
F52A:D0 FE      105 NOGOOD  BNE     NOGOOD      THE PAGE.HANG IF NOGOOD.
F52C:0A         106         ASL     A           TRY NEXT BIT OF BYTE
F52D:D0 F7      107         BNE     NXBIT       UNTIL BYTE IS ZERO.
F52F:E8         108         INX                 CONTINUE UNTIL PAGE
F530:D0 F2      109         BNE     NXBYT       IS DONE.
F532:           110 *
F532:8A         111 CNTWR   TXA                 PUSH A DIFFERENT
F533:48         112         PHA                 BYTE ONTO THE
F534:E8         113         INX                 STACK UNTIL ALL
F535:D0 FB      114         BNE     CNTWR       STCK BYTES ARE FULL.
F537:CA         115         DEX                 THEN PULL THEM
F538:86 18      116         STX     PTRLO       OFF AND COMPARE TO
F53A:68         117 PULBT   PLA                 THE COUNTER GOING
F53B:C5 18      118         CMP     PTRLO       BACKWARDS. HANG IF
F53D:D0 EB      119         BNE     NOGOOD      THEY DON'T AGREE.
F53F:C6 18      120         DEC     PTRLO       GET NEXT COUNTER BYTE
F541:D0 F7      121         BNE     PULBT       CONTINUE UNTIL STACK
F543:68         122         PLA                 IS DONE.TEST LAST BYTE
F544:D0 E4      123         BNE     NOGOOD      AGAINST ZERO.
F546:           124 *
F546:           125 * SIZE THE MEMORY
F546:           126 *
F546:A2 08      127         LDX     #$08        ZERO THE BYTES USED TO DISPLAY
F548:95 10      128 NOMEM   STA     ZRPG1,X     THE BAD RAM LOCATIONS
F54A:CA         129         DEX                 EACH BYTE= A CAS LINE
F54B:10 FB      130         BPL     NOMEM       ON THE SARA BOARD.
F54D:           131 *
F54D:A2 02      132         LDX     #$02        STARTING AT PAGE 2
F54F:86 19      133 NMEM1   STX     PTRHI       TEST THE LAST BYTE
F551:A9 00      134         LDA     #$00        IN EACH MEM PAGE TO
F553:A0 FF      135         LDY     #$FF        SEE IF THE CHIPS ARE
F555:91 18      136         STA     (PTRLO),Y   THERE.(AVOID 0 & STK PAGES)
F557:D1 18      137         CMP     (PTRLO),Y   CAN THE BYTE BE 0'D?
F559:F0 07      138         BEQ     NMEM2
F55B:20 48 F7   139         JSR     RAM         NO, FIND WHICH CAS IT IS.
F55E:94 10      140         STY     ZRPG1,X     SET CORRES. BYTE TO FF
F560:A6 19      141         LDX     PTRHI       RESTORE X REGISTER
F562:E8         142 NMEM2   INX                 AND INCREMENT TO NEXT
F563:E0 C0      143         CPX     #$C0        PAGE UNTIL I/O IS REACHED.
F565:D0 E8      144         BNE     NMEM1
F567:A2 20      145         LDX     #$20        THEN RESET TO PAGE 20
F569:EE EF FF   146         INC     BNKSW       AND GOTO NEXT BANK TO
F56C:AD EF FF   147         LDA     BNKSW       CONTINUE. (MASK INPUTS
F56F:29 0F      148         AND     #$0F        FROM BANKSWITCH TO SEE
F571:C9 03      149         CMP     #$03        WHAT SWITCH IS SET TO)
F573:D0 DA      150         BNE     NMEM1       CONTINUE UNTIL BANK '3'
F575:           151 *
F575:           152 * SETUP SCREEN
F575:20 9D FD   153 ERRLP   JSR     SETUP       CALL SCRN SETUP ROUTINE
F578:A2 00      154         LDX     #$00        SETUP I/O AGAIN
F57A:8E E0 FF   155         STX     SYSE0       FOR VIA TEST
F57D:CA         156         DEX                 PROGRAM DATA DIR
F57E:8E D2 FF   157         STX     SYSD2       REGISTERS
F581:8E D3 FF   158         STX     SYSD3
F584:A9 3F      159         LDA     #$3F
F586:8D E2 FF   160         STA     SYSE2
F589:A9 0F      161         LDA     #$0F
F58B:8D E3 FF   162         STA     SYSE3
F58E:A2 10      163         LDX     #$10        HEADING OF 'DIAGNSTICS' WITH
F590:20 38 F7   164         JSR     STRWT       THIS SUBROUTINE
F593:A2 00      165 ERRLP1  LDX     #$00        PRINT 'RAM'
F595:86 5D      166         STX     CV          SET CURSOR TO 2ND LINE
F597:A9 04      167         LDA     #$04        SPACE CURSOR OUT 3
```

```
F599: 20 C7 FB      168           JSR     SETCVH    (X STILL=0 ON RETURN)
F59C: 20 38 F7      169           JSR     STRWT     THE SAME SUBROUTINE
F59F: A2 07         170           LDX     #$07      FOR BYTES 7 - 0 IN
F5A1:               171 RAMWT1    EQU     *
F5A1: B5 10         172           LDA     ZRPG1,X   OUT EACH BIT AS A
F5A3: A0 08         173           LDY     #$08      '.' OR '1' FOR INDICATE BAD OR MISSING
F5A5: 0A            174 RAMWT2    ASL     A         CHIPS. SUBROUTINE 'RAM'      RAM
F5A6: 48            175           PHA               SETS UP THESE BYTES
F5A7: A9 AE         176           LDA     #$AE      LOAD A '.' TO ACC.
F5A9: 90 02         177           BCC     RAMWT4
F5AB: A9 31         178           LDA     #$31      LOAD A '1' TO ACC
F5AD: 20 25 FC      179 RAMWT4    JSR     COUT      AND PRINT IT
F5B0: 68            180           PLA               RESTORE BYTE
F5B1: 88            181           DEY               AND ROTATE ALL 8
F5B2: D0 F1         182           BNE     RAMWT2    TIMES
F5B4: 20 07 FD      183           JSR     CROUT1    CLEAR TO END OF LINE.
F5B7: CA            184           DEX
F5B8: 10 E7         185           BPL     RAMWT1
F5BA:               186 *
F5BA:               187 * ZPG&STK TEST
F5BA:               188 *
F5BA: 9A            189           TXS
F5BB: 8C EF FF      190           STY     BNKSW
F5BE: 98            191 ZP1       TYA
F5BF: 8D D0 FF      192           STA     ZPREG
F5C2: 85 FF         193           STA     STK0
F5C4: C8            194           INY
F5C5: 98            195           TYA
F5C6: 48            196           PHA
F5C7: 68            197           PLA
F5C8: C8            198           INY
F5C9: C0 20         199           CPY     #$20
F5CB: D0 F1         200           BNE     ZP1
F5CD: A0 00         201           LDY     #$00
F5CF: 8C D0 FF      202           STY     ZPREG
F5D2: 86 18         203           STX     PTRLO
F5D4: E8            204 ZP2       INX
F5D5: 86 19         205           STX     PTRHI
F5D7: 8A            206           TXA
F5D8: D1 18         207           CMP     (PTRLO),Y
F5DA: D0 06         208           BNE     ZP3
F5DC: E0 1F         209           CPX     #$1F
F5DE: D0 F4         210           BNE     ZP2
F5E0: F0 05         211           BEQ     ROMTST
F5E2:               212 ZP3       EQU     *         CHIP IS THERE, BAD ZERO AND STACK
F5E2: A2 1A         213           LDX     #$1A      SO PRINT 'ZP' MESSAGE
F5E4: 20 7B F7      214           JSR     MESSERR   & SET FLAG (2MHZ MODE)
F5E7:               215 *
F5E7:               216 * ROM TEST ROUTINE
F5E7:               217 *
F5E7: A9 00         218 ROMTST    LDA     #$00      SET POINTERS TO
F5E9: A8            219           TAY               $F000
F5EA: A2 F0         220           LDX     #$F0
F5EC: 85 18         221           STA     PTRLO
F5EE: 86 19         222           STX     PTRHI     SET X TO $FF
F5F0: A2 FF         223           LDX     #$FF      FOR WINDOWING I/O
F5F2: 51 18         224 ROMTST1   EOR     (PTRLO),Y COMPUTE CHKSUM ON
F5F4: E4 19         225           CPX     PTRHI     EACH ROM BYTE,
F5F6: D0 06         226           BNE     ROMTST2   WINDOW OUT
F5F8: C0 BF         227           CPY     #$BF      RANGES FFC0-FFEF
F5FA: D0 02         228           BNE     ROMTST2
F5FC: A0 EF         229           LDY     #$EF
F5FE: C8            230 ROMTST2   INY
F5FF: D0 F1         231           BNE     ROMTST1
F601: E6 19         232           INC     PTRHI
F603: D0 ED         233           BNE     ROMTST1
F605: A8            234           TAY               TEST ACC. FOR 0
F606: F0 05         235           BEQ     VIATST    YES, NEXT TEST
F608: A2 03         236           LDX     #$03      PRINT 'ROM' AND
F60A: 20 7B F7      237           JSR     MESSERR   SET ERROR
F60D:               238 *
```

```
F60D:              239 * VIA TEST ROUTINE
F60D:              240 *
F60D: 18           241 VIATST  CLC                    SET UP FOR ADDING BYTES
F60E: D8           242         CLD
F60F: AD E0 FF     243         LDA     SYSE0          MASK OFF INPUT BITS
F612: 29 3F        244         AND     #$3F           AND STORE BYTE IN
F614: 85 18        245         STA     PTRLO          TEMPOR. LOCATION
F616: AD EF FF     246         LDA     BNKSW          MASK OFF INPUT BITS
F619: 29 4F        247         AND     #$4F           AND ADD TO STORED
F61B: 65 18        248         ADC     PTRLO          BYTE IN TEMP. LOC.
F61D: 6D D0 FF     249         ADC     ZPREG          ADD REMAINING
F620: 85 18        250         STA     PTRLO          REGISTERS OF THE
F622: AD DF FF     251         LDA     SYSD1          VIA'S
F625: 29 5F        252         AND     #$5F           (MASK THIS ONE)
F627: 65 18        253         ADC     PTRLO          AND TEST
F629: 6D D2 FF     254         ADC     SYSD2          TO SEE
F62C: 6D D3 FF     255         ADC     SYSD3          IF THEY AGREE
F62F: 6D E2 FF     256         ADC     SYSE2          WITH THE RESET
F632: 6D E3 FF     257         ADC     SYSE3          CONDITION.
F635: C9 E1        258         CMP     #$E0+ROM       =E1?
F637: F0 05        259         BEQ     ACIA           YES, NEXT TEST
F639: A2 06        260         LDX     #$06           NO, PRINT 'VIA' MESS.
F63B: 20 7B F7     261         JSR     MESSERR        AND SET ERROR FLAG
F63E:              262 *
F63E:              263 * ACIA TEST ROUTINE
F63E:              264 *
F63E: 18           265 ACIA    CLC                    SETUP FOR ADDITION
F63F: A9 9F        266         LDA     #$9F           MASK INPUT BITS
F641: 2D F1 C0     267         AND     ACIAST         FROM STATUS REG
F644: 6D F2 C0     268         ADC     ACIACM         AND ADD DEFAULT STATES
F647: 6D F3 C0     269         ADC     ACIACN         OF CONTROL AND COMMND
F64A: C9 10        270         CMP     #$10           REGS. =10?
F64C: F0 05        271         BEQ     ATD            YES, NEXT TEST
F64E: A2 09        272         LDX     #$09           NO, 'ACIA' MESSAGE AND
F650: 20 7B F7     273         JSR     MESSERR        THEN SET ERROR FLAG
F653:              274 *
F653:              275 * A/D TEST ROUTINE
F653:              276 *
F653: A9 C0        277 ATD     LDA     #$C0
F655: 8D DC FF     278         STA     $FFDC
F658: AD 5A C0     279         LDA     PDLEN+2
F65B: AD 5E C0     280         LDA     PDLEN+6
F65E: AD 5C C0     281         LDA     PDLEN+4
F661: A0 20        282         LDY     #$20
F663: 88           283 ADCTST1 DEY                    WAIT FOR 40 USEC
F664: D0 FD        284         BNE     ADCTST1
F666: AD 5D C0     285         LDA     PDLEN+5        SET A/D RAMP
F669: C8           286 ADCTST3 INY                    COUNT FOR CONVERSION
F66A: F0 0A        287         BEQ     ADCERR         (=255=ERROR)
F66C: AD 66 C0     288         LDA     ADT0           IF BIT 7 =1?
F66F: 30 F8        289         BMI     ADCTST3        YES, CONTINUE
F671: 98           290         TYA                    NO, MOVE COUNT TO ACC
F672: 29 E0        291         AND     #$E0           ACC<32?
F674: F0 05        292         BEQ     KEYPLUG
F676:              293 ADCERR  EQU     *              NO,
F676: A2 0D        294         LDX     #$0D           PRINT 'A/D' MESS
F678: 20 7B F7     295         JSR     MESSERR        AND SET ERROR FLAG
F67B:              296 *
F67B:              297 * KEYBOAD PLUGIN TEST
F67B:              298 *
F67B: AD 08 C0     299 KEYPLUG LDA     KEYBD          IS KYBD PLUGGED IN?
F67E: 0A           300         ASL     A              (IS LIGHT CURRENT
```

```
F67F:10 41      301            BPL    SEX       PRESENT?) NO, BRANCH
F681:AD DF FF   302            LDA    SYSD1     IS ERROR FLAG SET?
F684:10 03      303            BPL    RECON     (2MHZ MODE) NO, BRANCH
F686:4C 93 F3   304            JMP    ERRLP1    ERROR, HANG
F689:           305  *
F689:           306  * RECONFIGURE SYSTEM
F689:           307  *
F689:           308  RECON  EQU    *
F689:A9 77      309            LDA    #$77      TURN ON SCREEN
F68B:8D DF FF   310            STA    SYSD1
F68E:20 98 F0   311            JSR    CLDSTRT   INITIALIZE MONITOR AND DEFAULT CHARACTER
F691:A9 10      312            LDA    #$10      TEST FOR "APPLE 1"                    SET
F693:2D 08 C0   313            AND    KEYBD
F696:D0 09      314            BNE    BOOT      NO, DO REGULAR BOOT
F698:2C 10 C0   315            BIT    KBDSTRB   CLEAR KEYBOARD
F69B:AD 50 C0   316            LDA    GRMD
F69E:20 01 F9   317            JSR    MONITOR   AND NEVER COME BACK...
F6A1:A2 01      318  BOOT      LDX    #1        READ BLOCK 0
F6A3:86 87      319            STX    IBCMD
F6A5:CA         320            DEX
F6A6:86 85      321            STX    IBBUFP    INTO RAM AT $A000
F6A8:A9 A0      322            LDA    #$A0
F6AA:85 86      323            STA    IBBUFP+1
F6AC:4A         324            LSR    A         ,FOR TRACK 80
F6AD:85 91      325            STA    PREVTRK   MAKE IT RECALIBRATE TOO!
F6AF:8A         326            TXA
F6B0:20 79 F4   327            JSR    BLOCKIO
F6B3:90 0A      328            BCC    GOBOOT    IF WE'VE SUCCEEDED, DO IT UP
F6B5:A2 1C      329            LDX    #$1C
F6B7:20 38 F7   330            JSR    STRWT     'RETRY?'
F6BA:20 0F FD   331            JSR    KEYIN
F6BD:B0 E2      332            BCS    BOOT
F6BF:4C 00 A0   333  GOBOOT    JMP    $A000     ,GO TO IT FOOL...
F6C2:           334  *
F6C2:           335  * SYSTEM EXERCISER
F6C2:           336  *
F6C2:A0 7F      337  SEX       LDY    #$7F      TRYFROM
F6C4:98         338  SEX1      TYA              7F TO 0
F6C5:29 FE      339            AND    #$FE      ADD. =
F6C7:49 4E      340            EOR    #$4E      4EOR4F?
F6C9:F0 03      341            BEQ    SEX2      YES, SKP
F6CB:B9 00 C0   342            LDA    KYBD,Y    NO, CONT
F6CE:88         343  SEX2      DEY              NXT ADD
F6CF:D0 F3      344            BNE    SEX1
F6D1:AD 51 C0   345            LDA    TXTMD     SET TXT
F6D4:B9 00 C1   346  SEX3      LDA    SLT1,Y    EXERCSE
F6D7:B9 00 C2   347            LDA    SLT2,Y    ALL
F6DA:B9 00 C3   348            LDA    SLT3,Y    SLOTS
F6DD:B9 00 C4   349            LDA    SLT4,Y
F6E0:AD FF CF   350            LDA    EXPROM    DISABLE EXPANSION ROM AREA
F6E3:C8         351            INY
F6E4:D0 EE      352            BNE    SEX3
F6E6:           353  *
F6E6:           354  * RAM TEST ROUTINE
F6E6:           355  *
F6E6:A9 73      356  USRENTRY LDA    #$72+ROM
F6E8:8D DF FF   357            STA    SYSD1
F6EB:A9 18      358            LDA    #$18
F6ED:8D D0 FF   359            STA    ZPREG
F6F0:A9 00      360            LDA    #$00
F6F2:A2 07      361            LDX    #$07
F6F4:95 10      362  RAMTST0   STA    ZRPG1,X
F6F6:CA         363            DEX
F6F7:10 FB      364            BPL    RAMTST0
F6F9:20 84 F7   365            JSR    RAMSET
F6FC:08         366            PHP
F6FD:20 F7 F7   367  RAMTST1   JSR    RAMWT
F700:20 F7 F7   369            JSR    RAMWT
```

```
F703: 28            369             PLP
F704: 6A            370             ROR   A
F705: 08            371             PHP
F706: 20 A1 F7      372             JSR   PTRINC
F709: D0 F2         373             BNE   RAMTST1
F70B: 20 84 F7      374             JSR   RAMSET
F70E: 08            375             PHP
F70F: 20 FB F7      376 RAMTST4     JSR   RAMRD
F712: 48            377             PHA
F713: A9 00         378             LDA   #$00
F715: 91 18         379             STA   (PTRLO),Y
F717: 68            380             PLA
F718: 28            381             PLP
F719: 6A            382             ROR   A
F71A: 08            383             PHP
F71B: 20 A1 F7      384             JSR   PTRINC
F71E: D0 EF         385             BNE   RAMTST4
F720:               386 *
F720                387 * RETURN TO START
F720                388 *
F720: A9 00         389             LDA   #$00
F722: 8D EF FF      390             STA   BNKSW
F725: 8D D0 FF      391             STA   ZPREG
F728: A2 07         392             LDX   #$07
F72A: BD 10 18      393 RAMTST6     LDA   PHP,X
F72D: 95 10         394             STA   ZRPG1,X
F72F: CA            395             DEX
F730: 10 F8         396             BPL   RAMTST6
F732: 20 7E F7      397             JSR   ERROR
F735: 4C 75 F5      398             JMP   ERRLP
F738:               399 ******************************
F738:               400 * SARA TEST SUBROUTINES
F738:               401 ******************************
F738                402 *
F738                403 * SUBROUTINE STRING WRITE
F738                404 *
F738: BD CD F4      405 STRWT       LDA   CHPG,X
F73B: 48            406             PHA
F73C: 09 80         407             ORA   #$80        NORMAL VIDEO
F73E: 20 25 FC      408             JSR   COUT        & PRNT
F741: E8            409             INX               NXT
F742: 68            410             PLA               CHR
F743: 10 F3         411             BPL   STRWT
F745: 4C 07 FD      412             JMP   CROUT1      CLR TO END OF LINE
F748:               413 *
F748                414 * SUBROUTINE RAM
F748                415 *
F748: 48            416 RAM         PHA               SV ACC
F749: 8A            417             TXA               CONVRT
F74A: 4A            418             LSR   A           ADD TO
F74B: 4A            419             LSR   A           USE FOR
F74C: 4A            420             LSR   A           B ENTRY
F74D: 4A            421             LSR   A
F74E: 08            422             PHP
F74F: 4A            423             LSR   A
F750: 28            424             PLP
F751: AA            425             TAX               LOOKUP
F752: BD C5 F4      426             LDA   RAMTBL,X    IF VAL
```

```
F755 10 14      427         BPL     RAM0        GO GET
F757 48         428         PHA                 WHICH
F758 AD EF FF   429         LDA     BNKSW
F75B 29 0F      430         AND     #$0F
F75D AA         431         TAX
F75E 68         432         PLA
F75F E0 00      433         CPX     #$00
F761 F0 13      434         BEQ     RAM1        BANK?
F763 4A         435         LSR     A           SET
F764 4A         436         LSR     A           PROPER
F765 4A         437         LSR     A           RAM
F766 CA         438         DEX                 VALUE
F767 D0 00      439         BNE     RAM1
F769 29 05      440         AND     #$05        CONVERT
F76B D0 09      441 RAM0    BNE     RAM1        TO VAL
F76D 8A         442         TXA
F76E F0 02      443         BEQ     RAM00
F770 A9 03      444         LDA     #3
F772 90 02      445 RAM00   BCC     RAM1
F774 49 03      446         EOR     #3
F776 29 07      447 RAM1    AND     #$07        BANKSW
F778 AA         448         TAX
F779 68         449         PLA
F77A 60         450         RTS
F77B           451         *
F77B           452         * SUBROUTINE ERROR
F77B           453         *
F77B 20 38 F7  454 MESSERR  JSR     STRWT       PRINT MESSAGE FIRST
F77E A9 F3     455 ERROR    LDA     #$F2+ROM    SET 1
F780 8D DF FF  456         STA     SYSD1       MHZ M0
F783 60        457         RTS
F784           458         *
F784           459         * SUBROUTINE RAMSET
F784           460         *
F784 A2 01     461 RAMSET   LDX     #$01
F786 86 1A     462         STX     BNK
F788 A0 00     463         LDY     #$00
F78A A9 AA     464         LDA     #$AA
F78C 38        465         SEC
F78D 48        466 RAMSET1  PHA
F78E 08        467         PHP
F78F A5 1A     468         LDA     BNK
F791 09 80     469         ORA     #$80
F793 8D 19 14  470         STA     IBNK
F796 A9 02     471         LDA     #$02
F798 85 19     472         STA     PTRHI
F79A A2 00     473         LDX     #$00
F79C 86 18     474         STX     PTRLO
F79E 28        475         PLP
F79F 68        476         PLA
F7A0 60        477         RTS
F7A1           478         *
F7A1           479         * SUBROUTINE PTRINC
F7A1           480         *
F7A1 48        481 PTRINC   PHA
```

```
F7A2 E6 18        482          INC    PTRLO
F7A4 D0 1D        483          BNE    RETS
F7A6 A5 1A        484          LDA    BNK
F7A8 10 0E        485          BPL    PINC1
F7AA A5 19        486          LDA    PTRHI
F7AC C9 13        487          CMP    #$13
F7AE F0 06        488          BEQ    PINC2
F7B0 C9 17        489          CMP    #$17
F7B2 D0 04        490          BNE    PINC1
F7B4 E6 19        491          INC    PTRHI
F7B6 E6 19        492 PINC2    INC    PTRHI
F7B8 E6 19        493 PINC1    INC    PTRHI
F7BA D0 07        494          BNE    RETS
F7BC C6 1A        495          DEC    BNK
F7BE C6 1A        496          DEC    BNK
F7C0 20 8D F7     497          JSR    RAMSET1
F7C3 68           498 RETS     PLA
F7C4 A6 1A        499          LDX    BNK
F7C6 E0 FD        500          CPX    #$FD
F7C8 60           501          RTS
F7C9              502 *
F7C9              503 * SUBROUTINE RAMERR
F7C9              504 *
F7C9 48           505 RAMERR   PHA
F7CA A6 19        506          LDX    PTRHI
F7CC A4 1A        507          LDY    BNK
F7CE 98           508          TYA
F7CF 30 19        509          BMI    RAMERR4
F7D1 8A           510          TXA
F7D2 30 1D        511          BMI    RAMERR5
F7D4 18           512          CLC
F7D5 69 20        513          ADC    #$20
F7D7 8C EF FF     514 RAMERR2  STY    BNKSW
F7DA AA           515          TAX
F7DB 20 48 F7     516 RAMERR3  JSR    RAM
F7DE 68           517          PLA
F7DF 48           518          PHA
F7E0 A0 00        519          LDY    #$00
F7E2 51 18        520          EOR    (PTRLO),Y
F7E4 15 10        521          ORA    ZRPG1,X
F7E6 95 10        522          STA    ZRPG1,X
F7E8 68           523          PLA
F7E9 60           524          RTS
F7EA A9 00        525 RAMERR4  LDA    #$00
F7EC 8D EF FF     526          STA    BNKSW
F7EF F0 EA        527          BEQ    RAMERR3
F7F1 38           528 RAMERR5  SEC
F7F2 E9 60        529          SBC    #$60
F7F4 C8           530          INY
F7F5 D0 E0        531          BNE    RAMERR2
F7F7              532 *
F7F7              533 * SUBROUTINE RAMWT
F7F7              534 *
F7F7 49 FF        535 RAMWT    EOR    #$FF
F7F9 91 18        536          STA    (PTRLO),Y
```

| | | | |
|---|---|---|---|
| F7FB D1 18 | 537 RAMRD | CMP | (PTRLO),Y |
| F7FD D0 CA | 538 | BNE | RAMERR |
| F7FF 60 | 539 | RTS | |

*** SUCCESSFUL ASSEMBLY  NO ERRORS

| | | | | | | | |
|---|---|---|---|---|---|---|---|
| C0F3 | ACIACN | F63E | ACIA | C0F2 | ACIACM | C0F1 | ACIAST |
| F676 | ADCERR | F663 | ADCTST1 | F669 | ADCTST3 | ?C047 | ADRS |
| C066 | ADTO | F653 | ATD | F479 | BLOCKIO | 1A | BNK |
| FFEF | BNKSW | F6A1 | BOOT | F4CD | CHPG | FD98 | CLDSTRT |
| F532 | CNTWR | FC25 | COUT | FD07 | CROUT1 | 5D | CV |
| F513 | DISK1 | C0D0 | DISKOFF | F575 | ERRLP | F593 | ERRLP1 |
| F77E | ERROR | CFFF | EXPROM | F6BF | GOBOOT | C050 | GRMD |
| 85 | IBBUFP | 87 | IBCMD | 1419 | IBNK | C010 | KBDSTRB |
| C008 | KEYBD | FD0F | KEYIN | F67B | KEYPLUG | C000 | KYBD |
| F77B | MESSERR | F901 | MONITOR | F54F | NMEM1 | F562 | NMEM2 |
| F52A | NOGOOD | F548 | NOMEM | F526 | NXBIT | F524 | NXBYT |
| C058 | PDLEN | 1810 | PHP | F7B8 | PINC1 | F7B6 | PINC2 |
| 91 | PREVTRK | 19 | PTRHI | F7A1 | PTRINC | 18 | PTRLO |
| F53A | PULBT | F772 | RAM00 | F776 | RAM1 | F748 | RAM |
| F76B | RAM0 | F7DB | RAMERR3 | F7EA | RAMERR4 | F7C9 | RAMERR |
| F7D7 | RAMERR2 | F7F1 | RAMERR5 | F7FD | RAMRD | F784 | RAMSET |
| F78D | RAMSET1 | F4C5 | RAMTBL | F6F4 | RAMTST0 | F6FD | RAMTST1 |
| F70F | RAMTST4 | F72A | RAMTST6 | F5A1 | RAMWT1 | F5AD | RAMWT4 |
| F7F7 | RAMWT | F5A5 | RAMWT2 | F689 | RECON | F7C3 | RETS |
| F5F2 | ROMTST1 | F5FE | ROMTST2 | F5E7 | ROMTST | 01 | ROM |
| FBC7 | SETCVH | FD9D | SETUP | F6C4 | SEX1 | F6C2 | SEX |
| F6CE | SEX2 | F6D4 | SEX3 | C100 | SLT1 | C200 | SLT2 |
| C300 | SLT3 | C400 | SLT4 | FF | STK0 | F738 | STRWT |
| FFDF | SYSD1 | FFD2 | SYSD2 | FFD3 | SYSD3 | FFE0 | SYSE0 |
| FFE2 | SYSE2 | FFE3 | SYSE3 | C051 | TXTMD | ?F6E6 | USRENTRY |
| F60D | VIATST | F5BE | ZP1 | F5D4 | ZP2 | F5E2 | ZP3 |
| FFD0 | ZPREG | 10 | ZRPG1 | 00 | ZRPG | | |
| 00 | ZRPG | 01 | ROM | 10 | ZRPG1 | 18 | PTRLO |
| 19 | PTRHI | 1A | BNK | 5D | CV | 85 | IBBUFP |
| 87 | IBCMD | 91 | PREVTRK | FF | STK0 | 1419 | IBNK |
| 1810 | PHP | C000 | KYBD | C008 | KEYBD | C010 | KBDSTRB |
| ?C047 | ADRS | C050 | GRMD | C051 | TXTMD | C058 | PDLEN |
| C066 | ADTO | C0D0 | DISKOFF | C0F1 | ACIAST | C0F2 | ACIACM |
| C0F3 | ACIACN | C100 | SLT1 | C200 | SLT2 | C300 | SLT3 |
| C400 | SLT4 | CFFF | EXPROM | F479 | BLOCKIO | F4C5 | RAMTBL |
| F4CD | CHPG | F513 | DISK1 | F524 | NXBYT | F526 | NXBIT |
| F52A | NOGOOD | F532 | CNTWR | F53A | PULBT | F548 | NOMEM |
| F54F | NMEM1 | F562 | NMEM2 | F575 | ERRLP | F593 | ERRLP1 |
| F5A1 | RAMWT1 | F5A5 | RAMWT2 | F5AD | RAMWT4 | F5BE | ZP1 |
| F5D4 | ZP2 | F5E2 | ZP3 | F5E7 | ROMTST | F5F2 | ROMTST1 |
| F5FE | ROMTST2 | F60D | VIATST | F63E | ACIA | F653 | ATD |
| F663 | ADCTST1 | F669 | ADCTST3 | F676 | ADCERR | F67B | KEYPLUG |
| F689 | RECON | F6A1 | BOOT | F6BF | GOBOOT | F6C2 | SEX |
| F6C4 | SEX1 | F6CE | SEX2 | F6D4 | SEX3 | ?F6E6 | USRENTRY |
| F6F4 | RAMTST0 | F6FD | RAMTST1 | F70F | RAMTST4 | F72A | RAMTST6 |
| F738 | STRWT | F748 | RAM | F76B | RAM0 | F772 | RAM00 |
| F776 | RAM1 | F77B | MESSERR | F77E | ERROR | F784 | RAMSET |
| F78D | RAMSET1 | F7A1 | PTRINC | F7B6 | PINC2 | F7B8 | PINC1 |
| F7C3 | RETS | F7C9 | RAMERR | F7D6 | PINC2 | F7DB | RAMERR3 |
| F7EA | RAMERR4 | F7F1 | RAMERR5 | F7F7 | RAMWT | F7FB | RAMRD |
| F901 | MONITOR | FBC7 | SETCVH | FC25 | COUT | F784 | RAMSET |
| FD0F | KEYIN | FD98 | CLDSTRT | FD07 | CROUT1 | FFD0 | ZPREG |
| FFD2 | SYSD2 | FFD3 | SYSD3 | FFDF | SYSD1 | FFE0 | SYSE0 |
| FFE2 | SYSE2 | FFE3 | SYSE3 | FFEF | BNKSW | | |

------ NEXT OBJECT FILE NAME IS MON.OBJ

| | | | |
|---|---|---|---|
| F7FF: | | 2 | ORG  $F7FF |
| F7FF | | 3 * | |

```
F7FF                4  *
F7FF  60            5  RET1   RTS
F800  E9 01         6         SBC   #1
F802  F0 FB         7         BEQ   RET1
F804  E9 01         8         SBC   #1
F806  F0 F7         9         BEQ   RET1
F808  E9 01        10         SBC   #1
F80A  F0 F3        11         BEQ   RET1
F80C  E9 01        12         SBC   #1
F80E  F0 EF        13         BEQ   RET1
F810  E9 01        14         SBC   #1
F812  F0 EB        15         BEQ   RET1
F814  E9 01        16         SBC   #1
F816  F0 E7        17         BEQ   RET1
F818  E9 01        18         SBC   #1
F81A  F0 E3        19         BEQ   RET1
F81C  E9 01        20         SBC   #1
F81E  F0 DF        21         BEQ   RET1
F820  E9 01        22         SBC   #1
F822  F0 DB        23         BEQ   RET1
F824  E9 01        24         SBC   #1
F826  F0 D7        25         BEQ   RET1
F828  E9 01        26         SBC   #1
F82A  F0 D3        27         BEQ   RET1
F82C  E9 01        28         SBC   #1
F82E  F0 CF        29         BEQ   RET1
F830  E9 01        30         SBC   #1
F832  F0 CB        31         BEQ   RET1
F834  E9 01        32         SBC   #1
F836  F0 C7        33         BEQ   RET1
F838  E9 01        34         SBC   #1
F83A  F0 C3        35         BEQ   RET1
F83C  E9 01        36         SBC   #1
F83E  F0 BF        37         BEQ   RET1
F840  E9 01        38         SBC   #1
F842  F0 BB        39         BEQ   RET1
F844  E9 01        40         SBC   #1
F846  F0 B7        41         BEQ   RET1
F848  E9 01        42         SBC   #1
F84A  F0 B3        43         BEQ   RET1
F84C  E9 01        44         SBC   #1
F84E  F0 AF        45         BEQ   RET1
F850  E9 01        46         SBC   #1
F852  F0 AB        47         BEQ   RET1
F854  E9 01        48         SBC   #1
F856  F0 A7        49         BEQ   RET1
F858  E9 01        50         SBC   #1
F85A  F0 A3        51         BEQ   RET1
F85C  E9 01        52         SBC   #1
F85E  F0 9F        53         BEQ   RET1
F860  E9 01        54         SBC   #1
F862  F0 9B        55         BEQ   RET1
F864  E9 01        56         SBC   #1
F866  F0 97        57         BEQ   RET1
F868  E9 01        58         SBC   #1
```

| | | | | |
|---|---|---|---|---|
| F86A: F0 93 | 59 | | BEQ | RET1 |
| F86C: E9 01 | 60 | | SBC | #1 |
| F86E: F0 8F | 61 | | BEQ | RET1 |
| F870: E9 01 | 62 | | SBC | #1 |
| F872: F0 8B | 63 | | BEQ | RET1 |
| F874: E9 01 | 64 | | SBC | #1 |
| F876: F0 87 | 65 | | BEQ | RET1 |
| F878: E9 01 | 66 | | SBC | #1 |
| F87A: F0 83 | 67 | | BEQ | RET1 |
| F87C: E9 01 | 68 | | SBC | #1 |
| F87E: F0 02 | 69 | | BEQ | RET3 |
| F880: E9 01 | 70 | | SBC | #1 |
| F882: F0 7C | 71 | RET3 | BEQ | RET2 |
| F884: E9 01 | 72 | | SBC | #1 |
| F886: F0 78 | 73 | | BEQ | RET2 |
| F888: E9 01 | 74 | | SBC | #1 |
| F88A: F0 74 | 75 | | BEQ | RET2 |
| F88C: E9 01 | 76 | | SBC | #1 |
| F88E: F0 70 | 77 | | BEQ | RET2 |
| F890: E9 01 | 78 | | SBC | #1 |
| F892: F0 6C | 79 | | BEQ | RET2 |
| F894: E9 01 | 80 | | SBC | #1 |
| F896: F0 68 | 81 | | BEQ | RET2 |
| F898: E9 01 | 82 | | SBC | #1 |
| F89A: F0 64 | 83 | | BEQ | RET2 |
| F89C: E9 01 | 84 | | SBC | #1 |
| F89E: F0 60 | 85 | | BEQ | RET2 |
| F8A0: E9 01 | 86 | | SBC | #1 |
| F8A2: F0 5C | 87 | | BEQ | RET2 |
| F8A4: E9 01 | 88 | | SBC | #1 |
| F8A6: F0 58 | 89 | | BEQ | RET2 |
| F8A8: E9 01 | 90 | | SBC | #1 |
| F8AA: F0 54 | 91 | | BEQ | RET2 |
| F8AC: E9 01 | 92 | | SBC | #1 |
| F8AE: F0 50 | 93 | | BEQ | RET2 |
| F8B0: E9 01 | 94 | | SBC | #1 |
| F8B2: F0 4C | 95 | | BEQ | RET2 |
| F8B4: E9 01 | 96 | | SBC | #1 |
| F8B6: F0 48 | 97 | | BEQ | RET2 |
| F8B8: E9 01 | 98 | | SBC | #1 |
| F8BA: F0 44 | 99 | | BEQ | RET2 |
| F8BC: E9 01 | 100 | | SBC | #1 |
| F8BE: F0 40 | 101 | | BEQ | RET2 |
| F8C0: E9 01 | 102 | | SBC | #1 |
| F8C2: F0 3C | 103 | | BEQ | RET2 |
| F8C4: E9 01 | 104 | | SBC | #1 |
| F8C6: F0 38 | 105 | | BEQ | RET2 |
| F8C8: E9 01 | 106 | | SBC | #1 |
| F8CA: F0 34 | 107 | | BEQ | RET2 |
| F8CC: E9 01 | 108 | | SBC | #1 |
| F8CE: F0 30 | 109 | | BEQ | RET2 |
| F8D0: E9 01 | 110 | | SBC | #1 |
| F8D2: F0 2C | 111 | | BEQ | RET2 |
| F8D4: E9 01 | 112 | | SBC | #1 |

```
F8D6: F0 28      113         BEQ   RET2
F8D8: E9 01      114         SBC   #1
F8DA: F0 24      115         BEQ   RET2
F8DC: E9 01      116         SBC   #1
F8DE: F0 20      117         BEQ   RET2
F8E0: E9 01      118         SBC   #1
F8E2: F0 1C      119         BEQ   RET2
F8E4: E9 01      120         SBC   #1
F8E6: F0 18      121         BEQ   RET2
F8E8: E9 01      122         SBC   #1
F8EA: F0 14      123         BEQ   RET2
F8EC: E9 01      124         SBC   #1
F8EE: F0 10      125         BEQ   RET2
F8F0: E9 01      126         SBC   #1
F8F2: F0 0C      127         BEQ   RET2
F8F4: E9 01      128         SBC   #1
F8F6: F0 08      129         BEQ   RET2
F8F8: E9 01      130         SBC   #1
F8FA: F0 04      131         BEQ   RET2
F8FC: E9 01      132         SBC   #1
F8FE: F0 00      133         BEQ   RET2
F900: 60         134 RET2    RTS
F901:            135         CHN   MON2A
F901:          2 *
F901:          3 *
0058:          4 SCRNLOC EQU  $58
F901:          5 *
0058:          6 LMARGIN EQU  SCRNLOC
0059:          7 RMARGIN EQU  SCRNLOC+1
005A:          8 WINTOP  EQU  SCRNLOC+2
005B:          9 WINBTM  EQU  SCRNLOC+3
005C:         10 CH      EQU  SCRNLOC+4
005D:         11 CV      EQU  SCRNLOC+5
005E:         12 BAS4L   EQU  SCRNLOC+6
005F:         13 BAS4H   EQU  SCRNLOC+7
0060:         14 BAS8L   EQU  SCRNLOC+8
0061:         15 BAS8H   EQU  SCRNLOC+9
0062:         16 TBAS4L  EQU  SCRNLOC+$A
0063:         17 TBAS4H  EQU  SCRNLOC+$B
0064:         18 TBAS8L  EQU  SCRNLOC+$C
0065:         19 TBAS8H  EQU  SCRNLOC+$D
0066:         20 FORGND  EQU  SCRNLOC+$E
0067:         21 BKGND   EQU  SCRNLOC+$F
0068:         22 MODES   EQU  SCRNLOC+$10
0069:         23 CURSOR  EQU  SCRNLOC+$11
006A:         24 STACK   EQU  SCRNLOC+$12
006B:         25 PROMPT  EQU  SCRNLOC+$13
006C:         26 TEMPX   EQU  SCRNLOC+$14
006D:         27 TEMPY   EQU  SCRNLOC+$15
006E:         28 CSWL    EQU  SCRNLOC+$16
006F:         29 CSWH    EQU  SCRNLOC+$17
0070:         30 KSWL    EQU  SCRNLOC+$18
0071:         31 KSWH    EQU  SCRNLOC+$19
0072:         32 PCL     EQU  SCRNLOC+$1A
0073:         33 PCH     EQU  SCRNLOC+$1B
0074:         34 A1L     EQU  SCRNLOC+$1C
0075:         35 A1H     EQU  A1L+1
0076:         36 A2L     EQU  A1L+2
0077:         37 A2H     EQU  A1L+3
0078:         38 A3L     EQU  A1L+4
0079:         39 A3H     EQU  A1L+5
```

```
007A:           40  A4L     EQU   A1L+6
007B:           41  A4H     EQU   A1L+7
007C:           42  STATE   EQU   A1L+8
007D:           43  YSAV    EQU   A1L+9
007E:           44  INBUF   EQU   A1L+$A      ; AND $B
0080:           45  TEMP    EQU   A1L+$C
0069:           46  MASK    EQU   CURSOR
F901:           47  *
C000:           48  KBD     EQU   $C000
C010:           49  KBDSTRB EQU   $C010
F901:           50  *
03F8:           51  USERADR EQU   $3F8
F479:           52  BLOCKIO EQU   $F479
F689:           53  RECON   EQU   $F689       AS OF 12/20/79
F4EE:           54  DIAGN   EQU   $F4EE
0050:           55  INBUFLEN EQU  $50         ; ONLY 80 BYTES ($3A0-3EF)
0081:           56  IBSLOT  EQU   $81
0082:           57  IBDRVN  EQU   IBSLOT+1
0085:           58  IBBUFP  EQU   IBSLOT+4
0087:           59  IBCMD   EQU   IBSLOT+6
F901:           60  *
F901:           61  ENTRY   EQU   *
F901:BA         62          TSX
F902:86 6A      63          STX   STACK
F904            64  *
F904:D8         65  MON     CLD               ; MUST BE HEX MODE
F905:20 3A FC   66          JSR   BELL
F908:A6 6A      67  MONZ    LDX   STACK       ; RESTORE STACK TO ORIGINAL LOCATION
F90A:9A         68          TXS
F90B:A9 DF      69          LDA   #$DF        ; PROMPT (APPLE) FOR SARA MONITOR
F90D:85 6B      70          STA   PROMPT
F90F:20 D5 FC   71          JSR   GETLNZ      ; GET A LINE OF INPUT
F912:20 67 F9   72  SCAN    JSR   ZSTATE      ; SET REGULAR SCAN
F915:20 2C F9   73  NXTINP  JSR   GETNUM      ; ATTEMPT TO READ HEX BYTE
F918:84 7D      74          STY   YSAV        ; STORE CURRENT INPUT POINTER
F91A:A0 11      75          LDY   #$11        ; 17 COMMANDS
F91C:88         76  CMDSRCH DEY
F91D:30 E5      77          BMI   MON         ; GIVE UP IF UNRECOGNIZABLE
F91F:D9 6C F9   78          CMP   CMDTAB,Y    ; FOUND?
F922:D0 F8      79          BNE   CMDSRCH     ; NO KEEP LOOKING
F924:20 5E F9   80          JSR   TOSUB       ; PERFORM FUNCTION
F927:A4 7D      81          LDY   YSAV        ; GET NEXT POINTER
F929:4C 15 F9   82          JMP   NXTINP      ; DO NEXT COMMAND
F92C:           83  *
F92C:A2 00      84  GETNUM  LDX   #0          ; CLEAR A2
F92E:86 76      85          STX   A2L
F930:86 77      86          STX   A2H
F932:B1 7E      87  NXTCHR  LDA   (INBUF),Y
F934:C8         88          INY               ; BUMP INDEX FOR NEXT TIME
F935:49 B0      89          EOR   #$B0
F937:C9 0A      90          CMP   #$A         ; TEST FOR DIGIT
F939:90 06      91          BCC   DIGIT       ; SAVE IT IF 1-9
F93B:69 88      92          ADC   #$88        ; TEST FOR HEX A-F
F93D:C9 FA      93          CMP   #$FA
F93F:90 2A      94          BCC   DIGRET
F941:A2 03      95  DIGIT   LDX   #3
F943:0A         96          ASL   A
F944:0A         97          ASL   A
F945:0A         98          ASL   A
F946:0A         99          ASL   A
F947:0A        100  NXTBIT  ASL   A           ; SHIFT HEX DIGITS INTO A2
F948:26 76     101          ROL   A2L
F94A:26 77     102          ROL   A2H
F94C:CA        103          DEX               ; SHIFTED ALL YET?
F94D:10 F8     104          BPL   NXTBIT
F94F:A5 7C     105  NXTBAS  LDA   STATE
F951:D0 06     106          BNE   NXTBS2      ; IF ZERO THEN COPY TO A1,3
```

```
F953: B5 77      107            LDA    A2H,X
F955: 95 75      108            STA    A1H,X
F957: 95 79      109            STA    A3H,X
F959: E8         110 NXTBS2     INX
F95A: F0 F3      111            BEQ    NXTBAS
F95C: D0 D4      112            BNE    NXTCHR
F95E:            113 *
F95E: A9 FA      114 TOSUB      LDA    #<ASCII      ;PUSH ADDRESS OR FUNCTION
F960: 48         115            PHA                 ;AND RETURN TO IT.
F961: B9 7C F9   116            LDA    CMDVEC,Y
F964: 48         117            PHA
F965: A5 7C      118            LDA    STATE        ;PASS MODE VIA ACC.
F967: A0 00      119 ZSTATE     LDY    #0
F969: 84 7C      120            STY    STATE        ;RESET STATE OF SCAN
F96B: 60         121 DIGRET     RTS
F96C:            122 *
F96C:            123 CMDTAB     EQU    *
F96C: 00         124            DFB    $0           ; G   =GO (CALL) SUBROUTINE
F96D: 03         125            DFB    $3           ; J   =JUMP (CONT) PROGRAM
F96E: 06         126            DFB    $6           ; M   =MOVE MEMORY
F96F: EB         127            DFB    $EB          ; R   =READ DISK BLOCK
F970: EE         128            DFB    $EE          ; U   =USER FUNCTION
F971: EF         129            DFB    $EF          ; V   =VERIFY MEMORY BLOCKS
F972: F0         130            DFB    $F0          ; W   =WRITE DISK BLOCK
F973: F1         131            DFB    $F1          ; X   =REPEAT LINE OF COMMANDS
F974: 99         132            DFB    $99          ; SP  =SPACE (BYTE SEPARATOR)
F975: 9B         133            DFB    $9B          ; "   =ASCII (HI BIT ON)
F976: A0         134            DFB    $A0          ; '   =ASCII (HI BIT OFF)
F977: 93         135            DFB    $93          ; :   =SET STORE MODE
F978: A7         136            DFB    $A7          ; .   =RANGE SEPARATOR
F979: A8         137            DFB    $A8          ; /   =COMMAND SEPARATOR
F97A: 95         138            DFB    $95          ; <   =DEST/SOURCE SEPARATOR
F97B: C6         139            DFB    $C6          ; CR  =CARRAGE RETURN
F97C:            140 *
F97C:            141 CMDVEC     EQU    *
F97C: 7C         142            DFB    GO-1
F97D: 7A         143            DFB    JUMP-1
F97E: 2B         144            DFB    MOVE-1
F97F: BF         145            DFB    READ-1
F980: 77         146            DFB    USER-1
F981: 3A         147            DFB    VRFY-1
F982: C2         148            DFB    WRTE-1
F983: 18         149            DFB    REPEAT-1
F984: A3         150            DFB    SPCE-1
F985: 06         151            DFB    ASCII-1
F986: 08         152            DFB    ASCIIO-1
F987: B7         153            DFB    SETMODE-1
F988: B7         154            DFB    SETMODE-1
F989: 99         155            DFB    SEP-1
F98A: 90         156            DFB    DEST-1
F98B: 25         157            DFB    CRMON-1
F98C:            158 *
F98C:            159 *
F98C: E6 7A      160 NXTA4      INC    A4L          ;BUMP 16 BIT POINTERS
F98E: D0 02      161            BNE    NXTA1
F990: E6 7B      162            INC    A4H
F992: E6 74      163 NXTA1      INC    A1L          ;BUMP A1
F994: D0 05      164            BNE    TSTA1
F996: E6 75      165            INC    A1H
F998: 38         166            SEC                 ;IN CASE OF ROLL OVER.
F999: F0 10      167            BEQ    RETA1
F99B: A5 74      168 TSTA1      LDA    A1L          ;TEST A1>A2
F99D: 38         169            SEC
F99E: E5 76      170            SBC    A2L
F9A0: 85 80      171            STA    TEMP
```

```
F9A2: A5 75       172        LDA     A1H
F9A4: E5 77       173        SBC     A2H
F9A6: 05 30       174        ORA     TEMP
F9A8: D0 01       175        BNE     RETA1       ; IF A1 LESS THAN OR EQUAL TO A2
F9AA: 18          176        CLC                 ; THEN CARRY CLEAR ON RETURN
F9AB: 60          177 RETA1  RTS
F9AC:             178 *
F9AC:             179 *
F9AC: 48          180 PRBYTE PHA                 ; SAVE LOW NIBBLE
F9AD: 4A          181        LSR     A
F9AE: 4A          182        LSR     A           ; SHIFT HI NIBBLE TO PRINT.
F9AF: 4A          183        LSR     A
F9B0: 4A          184        LSR     A
F9B1: 20 B7 F9    185        JSR     PRHEXZ
F9B4: 68          186        PLA
F9B5: 29 0F       187 PRHEX  AND     #$0F        ; STRIP HI NIBBLE
F9B7: 09 B0       188 PRHEXZ ORA     #$B0        ; MAKE IT NUMERIC
F9B9: C9 BA       189        CMP     #$BA        ; IS IT >'9'
F9BB: 90 02       190        BCC     PRHEX2
F9BD: 69 06       191        ADC     #$6         ; MAKE IT 'A'-'F'
F9BF: 4C 25 FC    192 PRHEX2 JMP     COUT
F9C2:             193 *
F9C2: 20 AC F9    194 PRBYCOL JSR    PRBYTE
F9C5:             195 *
F9C5: A9 BA       196 PRCOLON LDA    #$BA        ; PRINT A COLON
F9C7: D0 F6       197        BNE     PRHEX2      ; BRANCH ALWAYS
F9C9:             198 *
F9C9: A9 07       199 TST80WID LDA   #7          ; ANTICIPATE
F9CB: 24 68       200        BIT     MODES       ; TEST FOR 80
F9CD: 50 02       201        BVC     SVMASK
F9CF: A9 0F       202        LDA     #$F
F9D1: 85 69       203 SVMASK STA     MASK
F9D3: 60          204        RTS
F9D4:             205 *
F9D4: 8A          206 A1PC   TXA                 ; TEST FOR NEW PC
F9D5: F0 07       207        BEQ     OLDPC
F9D7: B5 74       208 A1PC1  LDA     A1L,X
F9D9: 95 72       209        STA     PCL,X
F9DB: CA          210        DEX
F9DC: 10 F9       211        BPL     A1PC1
F9DE: 60          212 OLDPC  RTS
F9DF:             213 *
F9DF: 85 69       214 ASCII1 STA     MASK        ; SAVE HI BIT STATUS
F9E1: A4 7D       215 ASCII2 LDY     YSAV        ; MOVE ASCII TO MEMORY
F9E3: B1 7E       216        LDA     (INBUF),Y
F9E5: E6 7D       217        INC     YSAV        ; BUMP FOR NEXT THING.
F9E7: A0 00       218        LDY     #0
F9E9: C9 A2       219        CMP     #$A2        ; ASCII " ?
F9EB: D0 05       220        BNE     ASCII3      ; NOPE, CONTINUE.
F9ED: A5 69       221        LDA     MASK
F9EF: 10 20       222        BPL     BITON       ; HE'S CHANGED MODES.
F9F1: 60          223        RTS                 ; NO, HE'S DONE.
F9F2: C9 A7       224 ASCII3 CMP     #$A7        ; ASCII ' ?
F9F4: D0 05       225        BNE     CRCHK       ; NO, TEST FOR EOL.
F9F6: A5 69       226        LDA     MASK
F9F8: 30 1B       227        BMI     BITOFF      ; CHANGE MODES.
F9FA: 60          228        RTS
F9FB: C9 8D       229 CRCHK  CMP     #$8D        ; END OF LINE?
F9FD: F0 07       230        BEQ     ASCDONE     ; YES, FINISHED
F9FF: 25 69       231        AND     MASK
FA01: 20 AF FA    232        JSR     STOR1       ; GO STORE IT!
FA04: D0 DB       233        BNE     ASCII2      ; DO NEXT.
```

```
FA06: 60          234 ASCDONE RTS
FA07:             235 *
FA07: 38          236 ASCII    SEC                      ; INDICATE HI ON.
FA08: 90          237          DFB     $90              ; (BCC - NEVER TAKEN)
FA09: 18          238 ASCII0   CLC                      ; INDICATE HI OFF
FA0A: AA          239 CKMDE    TAX                      ; SAVE STATE
FA0B: 86 7C       240          STX     STATE            ; RETAIN STATE
FA0D: 49 BA       241          EOR     #$BA             ; ARE WE IN STORE MODE?
FA0F: D0 7D       242.         BNE     ERROR
FA11: A9 FF       243 BITON    LDA     #$FF             ; SET HI BIT UNMASKED
FA13: D0 CA       244          BCS     ASCII1
FA15: A9 7F       245 BITOFF   LDA     #$7F             ; MASK HI BIT
FA17: 10 C6       246          BPL     ASCII1           ; ALWAYS
FA19: 2C 00 C0    247 REPEAT   BIT     KBD              ; REPEAT UNTIL KEYPRESS
FA1C: 10 03       248          BPL     REPEAT1
FA1E: 4C 0F FD    249          JMP     KEYIN
FA21: 68          250 REPEAT1  PLA                      ; CLEAN UP STACK
FA22: 68          251          PLA
FA23: 4C 12 F9    252          JMP     SCAN
FA26:             253 *
FA26:             254 *
FA26: 20 A0 FA    255 CRMON    JSR     BL1
FA29: 4C 08 F9    256          JMP     MONZ
FA2C:             257 *
FA2C: 20 9B F9    258 MOVE     JSR     TSTA1            ; DON'T MOVE ANYTHING IF ILLEGAL INPUT.
FA2F: B0 5D       259          BCS     ERROR
FA31: B1 74       260 MOVNXT   LDA     (A1L),Y          ; MOVE A BYTE
FA33: 91 7A       261          STA     (A4L),Y
FA35: 20 8C F9    262          JSR     NXTA4            ; BUMP BOTH A1 AND A4
FA38: 90 F7       263          BCC     MOVNXT
FA3A: 60          264          RTS                      ; ALL DONE WITH MOVE
FA3B:             265 *
FA3B:             266 *
FA3B: 20 9B F9    267 VRFY     JSR     TSTA1            ; TEST VALID RANGE
FA3E: B0 4E       268          BCS     ERROR
FA40: B1 74       269 VRFY1    LDA     (A1L),Y          ; COMPARE BYTE FOR BYTE
FA42: D1 7A       270          CMP     (A4L),Y          ; MATCH?
FA44: F0 06       271          BEQ     VRFY2            ; YES, DO NEXT.
FA46: 20 52 FA    272          JSR     MISMATCH         ; PRINT BOTH BYTES
FA49: 20 EF FC    273          JSR     CROUT            ; GOTO NEWLINE
FA4C: 20 8C F9    274 VRFY2    JSR     NXTA4            ; BUMP BOTH A1 AND A4
FA4F: 90 EF       275          BCC     VRFY1
FA51: 60          276          RTS                      ; VERIFY DONE.
FA52:             277 *
FA52: A5 7B       278 MISMATCH LDA     A4H              ; PRINT ADDRESS OF A4
FA54: 20 AC F9    279          JSR     PRBYTE
FA57: A5 7A       280          LDA     A4L
FA59: 20 C2 F9    281          JSR     PRBYCOL          ; OUTPUT A COLON FOR SEPARATOR
FA5C: B1 7A       282          LDA     (A4L),Y          ; AND THE DATA...
FA5E: 20 70 FA    283          JSR     PRBYTSP          ; PRINT THE BYTE AND A SPACE
FA61: 20 73 FA    284 PRINTA1  JSR     PRSPC            ; LEAD WITH A SPACE
FA64: A5 75       285          LDA     A1H              ; OUTPUT ADDRESS A1
FA66: 20 AC F9    286          JSR     PRBYTE
FA69: A5 74       287          LDA     A1L
FA6B: 20 C2 F9    288          JSR     PRBYCOL          ; SEPARATE WITH A COLEN
FA6E: B1 74       289 PRA1BYTE LDA     (A1L),Y          ; PRINT BYTE POINTED TO BY A1
FA70: 20 AC F9    290 PRBYTSP  JSR     PRBYTE
FA73: A9 A0       291 PRSPC    LDA     #$A0             ; PRINT A SPACE
FA75: 4C 25 FC    292          JMP     COUT             ; END VIA OUTPUT ROUTINE
FA78:             293 *
FA78: 4C F8 03    294 USER     JMP     USERADR
FA7B:             295 *
FA7B: 68          296 JUMP     PLA
FA7C: 68          297          PLA                      ; LEAVE STACK WITH NOTHIN' ON IT.
FA7D: 20 D4 F9    298 GO       JSR     A1PC             ; STUFF PROGRAM COUNTER
FA80: 6C 72 00    299          JMP     (PCL)            ; JUMP TO USER PROG
FA83:             300 *
FA83:             301 RWERROR  EQU     *                ; PRINT ERROR NUMBER
```

```
FA83: 20 AC F9    302           JSR   PRBYTE       ;PRINT THE OFFENDER
FA86: A9 A1       303           LDA   #$A1         ;FOLLOWED BY A "!"
FA88: 20 25 FC    304           JSR   COUT
FA8B: 20 07 FD    305  ERROR2   JSR   NOSTOP       ;OUTPUT A CARRAGE RETURN (NO STOPLST)
FA8E: 4C 04 F9    306  ERROR    JMP   MON
FA91                307  *
FA91: A5 76       308  DEST     LDA   A2L          ;COPY A2 TO A4 FOR DESTINATION OF
FA93: 85 7A       309           STA   A4L
FA95: A5 77       310           LDA   A2H
FA97: 85 7B       311           STA   A4H
FA99: 60          312           RTS
FA9A               313  *
FA9A: 20 A4 FA    314  SEP      JSR   SPCE         ;SEPARATOR TEST STORE MODE OR DUMP,
FA9D: 98          315           TYA                ; ZERO MODE,
FA9E: F0 1D       316           BEQ   SETMDZ       ;BRANCH ALWAYS
FAA0              317  *
FAA0: C6 7D       318  BL1      DEC   YSAV         ;TEST FOR NO LINE
FAA2: F0 25       319           BEQ   DUMP8        ;IF NO LINE, GIVEN A ROW OF BYTES
FAA4: CA          320  SPC1     DEY                ;TEST IF AFTER ANOTHER SPACE
FAA5: D0 16       321           BNE   SETMDZ
FAA7: C9 BA       322           CMP   #$BA         ;STORE MODE?
FAA9: D0 4B       323           BNE   TSTDUMP
FAAB: 85 7C       324  STOR     STA   STATE        ;KEEP IT IN STORE STATE
FAAD: A5 76       325           LDA   A2L          ;GET BYTE TO BE STORED
FAAF: 91 78       326  STOR1    STA   (A3L),Y      ;PUT IT IN MEMORY,
FAB1: E6 78       327           INC   A3L          ;BUMP POINTER
FAB3: D0 02       328           BNE   DUMMY
FAB5: E6 79       329           INC   A3H
FAB7: 60          330  DUMMY    RTS                ;ALSO USED FOR '!' TO CLEAR MODE
FAB8              331  *
FAB8: A4 7D       332  SETMODE  LDY   YSAV         ;GET INPUT CHARACTER
FABA: 88          333           DEY
FABB: B1 7E       334           LDA   (INBUF),Y    ;TO SET MODE
FABD: 85 7C       335  SETMDZ   STA   STATE
FABF: 60          336           RTS
FAC0              337  *
FAC0: A9 01       338  READ     LDA   #1           ;SET DISK COMMAND TO READ
FAC2: 2C          339           DFB   $2C          ;DUMMY BIT TO SKIP 2 BYTES
FAC3: A9 02       340  WRTE     LDA   #2           ;SET DISK COMMAND TO WRITE
FAC5: 85 87       341  SAVCMD   STA   IBCMD
FAC7: A5 74       342  RWLOOP   LDA   A1L
FAC9: 85 85       343           STA   IBBUFP       ;COMMAND FORMAT IS
FACB: A5 75       344           LDA   A1H          ; BLOCKNUMBER,ADDRESS,ENDADDRESS
FACD: 85 86       345           STA   IBBUFP+1
FACF: A6 7B       346           LDX   A4H          ;SEND BLOCK NUMBER VIA X & A
FAD1: A5 7A       347           LDA   A4L
FAD3: 78          348           SEI                ;NO INTERUPTS WHILE IN MONITOR
FAD4: 20 29 FA    349           JSR   BLOCKIO      ;DO DISKO FEVER
FAD7: B0 AA       350           BCS   RWERROR      ;GIVE UP IF ERROR ENCOUNTERED
FAD9: E6 7A       351           INC   A4L          ;BUMP BLOCK NUMBER
FADB: D0 02       352           BNE   NOVER
FADD: E6 7B       353           INC   A4H
FADF: E6 75       354  NOVER    INC   A1H          ;BUMP RAM ADDRESS BY 512 BYTES
FAE1: E6 75       355           INC   A1H
FAE3: 20 9B F9    356           JSR   TSTA1        ;TEST FOR FINISHED
FAE6: 90 DF       357           BCC   RWLOOP       ;NOT DONE, DO NEXT BLOCK
FAE8: 60          358           RTS
FAE9              359  *
FAE9              360           CHN   MON9B
FAE9                1  DUMP8    EQU   *            ;OUTPUT 1 ROW OF BYTES
FAE9: A5 75       2            LDA   A1H
FAEB: 85 77       3            STA   A2H
FAED: 20 C9 F9    4            JSR   TST80WID      ;GET WIDTH MASK INTO ACC
FAF0: 05 74       5            ORA   A1L
FAF2: 85 76       6            STA   A2L
FAF4: D0 06       7            BNE   DUMP0         ;BRANCH ALWAYS
FAF6                8  *
FAF6: 4A          9  TSTDUMP   LSR   A             ;DUMP?
FAF7: B0 95      10  ERROR1    BCS   ERROR
```

```
FAF9 20 C9 F9    11  DUMP       JSR   TST80WID    ;SET FOR EITHER 80 OR 40 COLUMNS
FAFC A5 74       12  DUMP0      LDA   A1L         ;USE A4 FOR ASCII DUMP
FAFE 85 7A       13             STA   A4L
FB00 A5 75       14             LDA   A1H
FB02 85 7B       15             STA   A4H
FB04 20 98 F9    16             JSR   TSTA1       ;TEST FOR VALID RANGE
FB07 B0 EE       17             BCS   ERROR1
FB09 20 61 FA    18  DUMP1      JSR   PRINTA1     ;PRINT ADDRESS AND FIRST BYTE
FB0C 20 92 F9    19  DUMP2      JSR   NXTA1
FB0F B0 10       20             BCS   DUMPASC     ;END WITH ASCII
FB11 A5 74       21             LDA   A1L         ;TEST END OF LINE
FB13 29 69       22             AND   MASK        ;FOR 40/80 COLUMN
FB15 D0 05       23             BNE   DUMP3
FB17 20 21 FB    24             JSR   DUMPASC
FB1A D0 ED       25             BNE   DUMP1       ;BRANCH ALWAYS
FB1C 20 6E FA    26  DUMP3      JSR   PRA1BYTE    ;GO PRINT NEXT BYTE AND A SPACE
FB1F D0 EB       27             BNE   DUMP2       ;ALWAYS (ACC JUST PULLED AS $A0)
FB21             28  *
FB21 A5 7A       29  DUMPASC    LDA   A4L         ;RESET TO BEGINING OF LINE
FB23 85 74       30             STA   A1L
FB25 A5 7B       31             LDA   A4H
FB27 85 75       32             STA   A1H
FB29 20 73 FA    33             JSR   PRSPC       ;PRINT AN EXTRA SPACE
FB2C A0 00       34  ASC1       LDY   #0          ;TO INDEX MEMORY INDIRECT
FB2E B1 74       35             LDA   (A1L),Y
FB30 09 80       36             ORA   #$80        ;SET NORMAL VIDEO
FB32 C9 A0       37             CMP   #$A0        ;TEST FOR CONTROL CHARACTERS
FB34 B0 02       38             BCS   ASC2        ;OK TO PRINT NON CONTROLS
FB36 A9 AE       39             LDA   #$AE        ;OTHERWISE PRINT A SPACE
FB38 20 25 FC    40  ASC2       JSR   COUT        ;PUT IT OUT
FB3B 20 8C F9    41             JSR   NXTA4       ;BUMP BOTH A1 AND A4
FB3E B0 06       42             BCS   ASC3        ;FINISHED
FB40 A5 74       43             LDA   A1L         ;TEST END OF LINE
FB42 29 69       44             AND   MASK
FB44 D0 E6       45             BNE   ASC1        ;NOT DONE, PRINT NEXT
FB46 4C 6F FC    46  ASC3       JMP   CROUT
FB49             47  *
FB49:            48  *
FB49:            49  *
FB49 38          50  COL80      SEC               ;INDICATE 80 COLUMNS DESIRED
FB4A AD 53 C0    51             LDA   $C053       ;GOTO 80 COLUMN MODE
FB4D B0 04       52             BCS   SET80       ;BRANCH ALWAYS
FB4F             53  *
FB4F 18          54  COL40      CLC               ;INDICATE 40 COLUMNS DESIRED
FB50 AD 52 C0    55             LDA   $C052       ;GOTO 40 COLUMN MODE
FB53 A5 68       56  SET80      LDA   MODES
FB55 09 40       57             ORA   #$40        ;ASSUME 80
FB57 B0 02       58             BCS   SET80A      ;AND BRANCH IF IT IS
FB59 29 BF       59             AND   #$BF        ;BUT FIX FOR 40 IF NOT
FB5B 85 68       60  SET80A     STA   MODES
FB5D 09 7F       61             ORA   #$7F        ;ISOLATE BIT 7
FB5F 29 A0       62             AND   #$A0        ;(BIT 7 SETS NORMAL/INVERSE)
FB61 85 66       63             STA   FORGND
FB63 B0 02       64             BCS   SET80B      ;AGAIN ASSUMES 80 COLUMNS
FB65 A9 F0       65             LDA   #$F0        ;IF NOT, SET FOR/BACKGROUND COLOR
FB67 85 67       66  SET80B     STA   BKGND
FB69:            67  *
FB69 A5 58       68  CLSCRN     LDA   LMARGIN     ;SET CURSOR TO TOP LEFT OF WINDOW
FB6B 85 5C       69             STA   CH
FB6D A5 5A       70             LDA   WINTOP
FB6F 85 5D       71             STA   CV          ;NOW DROP INTO CLEAR END OF PAGE
FB71:            72  *
FB71 A5 5C       73  CLEOP      LDA   CH          ;SAVE CURRENT CURSOR POSITION
FB73 48          74             PHA
FB74 A5 5D       75             LDA   CV
FB76 48          76             PHA
FB77 20 B1 FB    77             JSR   SETCV
FB7A 20 8E FB    78  CLEOP1     JSR   CLEOL       ;CLEAR TO END OF FIRST LINE
FB7D A5 58       79             LDA   LMARGIN
FB7F 85 5C       80             STA   CH
FB81 20 C9 FB    81             JSR   CURDOWN     ;GOTO NEXT LINE
```

```
FB84:90 F4        82          BCC     CLEOP1
FB86:68           83          PLA
FB87:A8           84          TAY
FB88:68           85          PLA                     ;RESTORE CURSOR POSITION
FB89:85 5C        86          STA     CH
FB8B:98           87          TYA                     ;GET OLD CV IN ACC AGAIN
FB8C:B0 23        88          BCS     SETCV           ;BRANCH ALWAYS
FB8E:             89 *
FB8E:A5 5C        90 CLEOL    LDA     CH              ;CLEAR TO END OF LINE FIRST
FB90:4C 89 FC     91 CLEOL1   JMP     CLEOL1
FB93:             92 *
FB93:C9 80        93 CONTROL  CMP     #$80
FB95:90 65        94          BCC     DISPLAYX        ;IF INVERSE
FB97:C9 8D        95 TSTCR    CMP     #$8D            ;IF CARRAGE RETURN THEN NEW LINE.
FB99:D0 3A        96          BNE     TSTBACK
FB9B:20 8E FB     97 CARRAGE  JSR     CLEOL           ;FIRST CLEAR TO THE END OF THIS LINE
FB9E:20 C3 FB     98          JSR     SETCHZ          ;RESET CURSOR AND GOTO NEXT LINE (CARRY
FBA1:4C 02 FC     99          JMP     NXTLIN          ;THEN GOTO THE NEXT LINE.      IS SET)
FBA4:             100 *
FBA4:             101 *
FBA4:A5 5D        102 CURUP   LDA     CV              ;TEST FOR TOP OF SCREEM
FBA6:C6 5D        103         DEC     CV              ;ANTICIPATE 'NOT' TOP
FBA8:C5 5A        104         CMP     WINTOP
FBAA:D0 02        105         BNE     CURUP1          ;IT'S NOT TOP, CONTINUE.
FBAC:A5 5B        106         LDA     WINBTM          ;WRAP AROUND TO BOTTOM
FBAE:38           107 CURUP1  SEC                     ;DECREMENT BY ONE
FBAF:E9 01        108         SBC     #$1
FBB1:85 5D        109 SETCV   STA     CV              ;SAVE NEW VERTICAL LINE
FBB3:             110 BASCALC EQU     *
FBB3:             111 CURDN1  EQU     *
FBB3:A5 5D        112         LDA     CV              ;GET VALUES FOR FIRST PAGE ($400)
FBB5:10 4E        113         BPL     BASCALC1        ;ALWAYS
FBB7:             114 *
FBB7:24 68        115 CURIGHT BIT     MODES           ;TEST FOR 80 OR 40
FBB9:70 02        116         BVS     RIGHT1
FBBB:E6 5C        117         INC     CH
FBBD:E6 5C        118 RIGHT1  INC     CH              ;BUMP CUROSR HORIZONTAL
FBBF:A5 5C        119         LDA     CH              ;TEST FOR NEW LINE
FBC1:C5 59        120         CMP     RMARGIN
FBC3:A5 58        121 SETCH1  LDA     LMARGIN         ;JUST IN CASE WE HAVE
FBC5:90 9D        122         BCC     STORCHT
FBC7:85 5C        123 SETCVH  STA     CH              ;CURSOR AT START OF NEXT LINE
FBC9:             124 *DROP INTO CRDOWN FOR WRAP AROUND
FBC9:             125 *
FBC9:E6 5D        126 CURDOWN INC     CV              ;MOVE CURSOR DOWN ONE LINE
FBCB:A5 5D        127         LDA     CV              ;ANTICIPATE NOT BOTTOM
FBCD:C5 5B        128         CMP     WINBTM          ;TEST FOR BOTTOM
FBCF:90 E2        129         BCC     CURDN1
FBD1:A5 5A        130         LDA     WINTOP
FBD3:B0 DC        131         BCS     SETCV           ;BRANCH ALWAYS
FBD5:             132 *
FBD5:C9 88        133 TSTBACK CMP     #$88            ;BACKSPACE?
FBD7:D0 50        134         BNE     TSTBELL
FBD9:24 68        135 CURLEFT BIT     MODES           ;TEST FOR FORTY OR EIGHTY MODE
FBDB:70 02        136         BVS     LEFT80
FBDD:C6 5C        137         DEC     CH
FBDF:C6 5C        138 LEFT80  DEC     CH
FBE1:30 06        139         BMI     LEFTUP
FBE3:A5 5C        140         LDA     CH              ;TEST FOR WRAP AROUND
FBE5:C5 58        141         CMP     LMARGIN
FBE7:10 3B        142         BPL     CTRLRET
FBE9:20 A4 FB     143 LEFTUP  JSR     CURUP
FBEC:A5 59        144         LDA     RMARGIN
FBEE:85 5C        145         STA     CH              ;SAVE NEW CURSOR POSITION
FBF0:D0 E7        146         BNE     CURLEFT         ;BRANCH ALWAYS
FBF2:             147 *
FBF2:C9 A0        148 COUT2   CMP     #$A0            ;IS IT CONTROL CHARACTER
FBF4:90 9D        149         BCC     CONTROL
FBF6:24 68        150         BIT     MODES           ;TEST FOR INVERSE
FBF8:30 02        151         BMI     DISPLAYX        ;NO PUT IT OUT
```

```
FBFA 29 7F      152            AND   #$7F         ;STRIP HI BIT
FBFC 20 9D FC   153 DISPLAYX   JSR   DISPLAY
FBFF            154 *
FBFF 20 B7 FB   155 INCHORZ    JSR   CURIGHT      ;MOVE CURSOR RIGHT
FC02 90 57      156 NXTLIN     BCC   SCROLL       ;IF'S BOTTOM, RESET CH=0 AND SCROLL
FC04 60         157            RTS                ;RESET CH ONLY
FC05            158 *
FC05            159 BASCALC    PHP               ;CALC BASE ADR IN BAS4L,H
FC06 48         160            PHA
FC07 4A         161            LSR   A            ;FOR GIVEN LINE NO.
FC08 29 03      162            AND   #$03         ;0<=LINE NO. <=$17
FC0A 09 04      163            ORA   #$04         ;ARG=000ABCDE, GENERATE
FC0C 85 5F      164            STA   BAS4H        ;BAS4H=000001CD
FC0E 49 0C      165            EOR   #$C
FC10 85 61      166            STA   BAS8H
FC12 68         167            PLA                ;AND
FC13 29 18      168            AND   #$18         ;BAS4L=EABAB000
FC15 90 02      169            BCC   BSCLC2
FC17 69 7F      170            ADC   #$7F
FC19 85 5E      171 BSCLC2     STA   BAS4L
FC1B 0A         172            ASL   A
FC1C 0A         173            ASL   A
FC1D 05 5E      174            ORA   BAS4L
FC1F 85 5E      175            STA   BAS4L
FC21 85 60      176            STA   BAS8L        ;SAME FOR PAGE 2
FC23 28         177            PLP
FC24 60         178 CTRLRET    RTS
FC25            179 *
FC25 48         180 COUT       PHA               ;SAVE CHARACTER
FC26 84 6D      181            STY   TEMPY
FC28 86 6C      182            STX   TEMPX
FC2A 20 33 FC   183            JSR   COUT1
FC2D A4 6D      184            LDY   TEMPY
FC2F A6 6C      185            LDX   TEMPX
FC31 68         186            PLA
FC32 60         187            RTS
FC33            188 *
FC33 6C 6E 00   189 COUT1      JMP   (CSWL)       ;NORMALLY COUT1
FC36            190 *
FC36 C9 87      191 TSTBELL    CMP   #$87         ;BELL?
FC38 D0 18      192            BNE   LNFD         ;NO TEST FOR FORM FEED
FC3A            193 *
FC3A A2 10      194 BELL       LDX   #$10
FC3C 8A         195            TXA
FC3D A8         196 BELL1      TAY
FC3E 2C D8 FF   197 BELL2      BIT   $FFD8
FC41 F0 F8      198            BEQ   BELL2
FC43 2C D8 FF   199 BELL3      BIT   $FFD8
FC46 D0 FB      200            BNE   BELL3
FC48 88         201            DEY
FC49 D0 F3      202            BNE   BELL2
FC4B 2C 30 C0   203            BIT   $C030
FC4E CA         204            DEX
FC4F D0 EC      205            BNE   BELL1
FC51 60         206            RTS
FC52            207 *
FC52 C9 8A      208 LNFD       CMP   #$8A         ;LINE FEED?
FC54 D0 CE      209            BNE   CTRLRET
FC56 20 xx xx   210            JSR   CURDOWN      ;MOVE CURSOR DOWN A LINE
FC59 90 C9      211            BCC   CTRLRET      ;BRANCH IF NO SCROLL NECESSARY.
FC5B            212 *
FC5B A5 5A      213 SCROLL     LDA   WINTOP       ;START WITH TOP LINE
FC5D 48         214            PHA                ;SAVE IT FOR NOW
FC5E 20 xx xx   215            JSR   SETCV        ;GET BASCALC FOR THIS LINE
FC61 A2 03      216 SCRL1      LDX   #3           ;MOVE CURRENT BASCALC AS DESTINATION
FC63 xx         217 SCRL2      LDA   BAS4L,X
FC65 xx xx      218            STA   TBAS4L,X     ;(TEMPORARY BASE ADDR.)
FC67 CA         219            DEX
FC68 xx         220            BPL   SCRL2
FC6A 68         221            PLA                ;GET DESTINATION LINE
```

```
FC6B: 18            222            CLC
FC6C: 69 01         223            ADC     #1          ;CALCULATE SOURCE LINE
FC6E: C5 5B         224            CMP     WINBTM      ;IS IT THE LAST LINE?
FC70: B0 15         225            BCS     LASTLN      ;YES, CLEAR IT
FC72: 48            226            PHA                 ;SAVE AS NEXT DESTINATION LINE
FC73: 20 B1 FB      227            JSR     SETCV       ;GET BASE ADDR FOR SOURCE LINE
FC76: A5 59         228            LDA     RMARGIN     ;MOVE SOURCE TO DESTINATION
FC78: 4A            229            LSR     A           ;DIVIDE BY 2
FC79: A8            230            TAY
FC7A: 88            231  SCRL3     DEY                 ;DONE YET?
FC7B: 30 E4         232            BMI     SCRL1       ;YES, DO NEXT LINE
FC7D: B1 5E         233            LDA     (BAS4L),Y
FC7F: 91 62         234            STA     (TBAS4L),Y
FC81: B1 60         235            LDA     (BAS8L),Y   ;MOVE BOTH PAGES
FC83: 91 64         236            STA     (TBAS8L),Y
FC85: 90 F3         237            BCC     SCRL3       ;BRANCH ALWAYS
FC87: A5 58         238  LASTLN    LDA     LMARGIN     ;BLANK FILL THE LAST LINE
FC89: 4A            239  CLEOL1    LSR     A           ;DIVIDE BY 2
FC8A: A8            240            TAY
FC8B: B0 04         241            BCS     CLEOL2
FC8D: A5 66         242            LDA     FORGND      ;(NORMALLY A SPACE)
FC8F: 91 5E         243            STA     (BAS4L),Y
FC91: A5 67         244  CLEOL2    LDA     BKGND       ;(IF 80 COLUMNS, ALSO A SPACE)
FC93: 91 60         245            STA     (BAS8L),Y
FC95: C8            246            INY
FC96: 98            247            TYA                 ;TEST FOR END OF LINE
FC97: 0A            248            ASL     A           ;MULT BY 2 AGAIN
FC98: C5 59         249            CMP     RMARGIN
FC9A: 90 ED         250            BCC     CLEOL1      ;CONTINUE IF MORE TO DO
FC9C: 60            251            RTS                 ;ALL DONE.
FC9D:               252  *
FC9D: 24 68         253  DISPLAY   BIT     MODES       ;TEST FOR 40 OR 80
FC9F: 70 0C         254            BVS     DSPL80      ;STORE THE SINGLE CHARACTER AND RETURN
FCA1: 46 5C         255            LSR     CH          ;INSURE PROPER 40 COLUMN DISPLAY
FCA3: 06 5C         256            ASL     CH          ;BY DROPPING BIT 0
FCA5: 20 AD FC      257            JSR     DSPL80      ;DISPLAY IN $400 PAGE
FCA8: A5 67         258            LDA     BKGND       ;ALSO SET BACKGROUND COLOR
FCAA: 91 60         259  DSPBKGND  STA     (BAS8L),Y
FCAC: 60            260            RTS
FCAD:               261  *
FCAD: 48            262  DSPL80    PHA                 ;PRESERVE CHARACTER
FCAE: A5 5C         263            LDA     CH          ;DETERMINE WICH PAGE
FCB0: 4A            264            LSR     A
FCB1: A8            265            TAY
FCB2: 68            266            PLA
FCB3: B0 F5         267            BCS     DSPBKGND    ;BRANCH IF $800 PAGE
FCB5: 91 5E         268            STA     (BAS4L),Y
FCB7: 60            269            RTS
FCB8:               270  *
FCB8: B1 7E         271  NOTCR     LDA     (INBUF),Y   ;ECHO CHARACTER
FCBA: 20 25 FC      272            JSR     COUT
FCBD: C9 88         273            CMP     #$88        ;BACKSPACE?
FCBF: F0 1D         274            BEQ     BKSPCE
FCC1: C9 98         275            CMP     #$98        ;CANCEL?
FCC3: F0 08         276            BEQ     CANCEL
FCC5: E6 80         277            INC     TEMP
FCC7: A5 80         278            LDA     TEMP
FCC9: C9 F8         279            CMP     #INBUFLEN
FCCB: D0 17         280            BNE     NXTCHAR     ;NO WRAP AROUND ALLOWED
FCCD: A9 DC         281  CANCEL    LDA     #$DC        ;OUTPUT BACKSLASH
FCCF: 20 25 FC      282            JSR     COUT
FCD2: 20 EF FC      283            JSR     CROUT
FCD5:               284  GETLNZ    EQU     *
FCD5: A5 6B         285  GETLN     LDA     PROMPT
FCD7: 20 25 FC      286            JSR     COUT
FCDA: A0 01         287            LDY     #1
FCDC: 84 80         288            STY     TEMP        ;START AT BEGINNING OF INBUF
FCDE: A4 80         289  BKSPCE    LDY     TEMP
FCE0: F0 F3         290            BEQ     GETLN
FCE2: C6 80         291            DEC     TEMP        ;BACK UP INPUT BUFFER
FCE4: 20 60 FD      292  NXTCHAR   JSR     RDCHAR      ;GET INPUT
FCE7: A4 80         293            LDY     TEMP
```

```
FCE9:91 7E      294             STA     (INBUF),Y
FCEB:C9 8D      295             CMP     #$8D
FCED:D0 C9      296             BNE     NOTCR
FCEF:           297     CROUT   EQU     *
FCEF:2C 00 C0   298             BIT     KBD         ;TEST FOR START/STOP
FCF2:10 13      299             BPL     NOSTOP
FCF4:20 2E FD   300             JSR     KEYIN3      ;READ KBD
FCF7:C9 A0      301             CMP     #$A0        ;IS IT A SPACE?
FCF9:F0 07      302             BEQ     STOPLST     ;YES, PAUSE TIL NEXT KEYPRESS.
FCFB:C9 8D      303             CMP     #$8D        ;QUIT THIS OPERATION?
FCFD:D0 08      304             BNE     NOSTOP      ;NO, IGNORE THIS KEY.
FCFF:4C 8B FA   305             JMP     ERROR2      ;YES, RESTART
FD02:AD 00 C0   306     STOPLST LDA     KBD
FD05:10 FB      307             BPL     STOPLST
FD07:A9 8D      308     NOSTOP  LDA     #$8D
FD09:4C 25 FC   309             JMP     COUT
FD0C:           310     *
FD0C:6C 70 00   311     RDKEY   JMP     (KSWL)
FD0F:           312     *
FD0F:A9 7F      313     KEYIN   LDA     #$7F        ;MAKE SURE FIRST IS CURSOR
FD11:85 63      314             STA     TBAS4H
FD13:20 88 FD   315             JSR     PICK        ;GO READ SCREEN
FD16:48         316     KEYIN1  PHA                 ;SAVE CHR AT CURSOR POSITION
FD17:20 35 FD   317             JSR     KEYWAIT     ;TEST FOR KEYPRESS
FD1A:B0 08      318             BCS     KEYIN2      ;GO GET IT
FD1C:A5 69      319             LDA     CURSOR      ;GIVE THEM AN UNDERSCORE FOR A TIME
FD1E:20 9D FC   320             JSR     DISPLAY
FD21:20 35 FD   321             JSR     KEYWAIT     ;GO SEE IF KEYPRESSED
FD24:68         322     KEYIN2  PLA
FD25:08         323             PHP                 ;SAVE KEYPRESS STATUS
FD26:48         324             PHA
FD27:20 9D FC   325             JSR     DISPLAY
FD2A:68         326             PLA
FD2B:28         327             PLP
FD2C:90 E8      328             BCC     KEYIN1
FD2E:AD 00 C0   329     KEYIN3  LDA     KBD         ;READ KEYBOARD
FD31:2C 10 C0   330     KEYIN4  BIT     KBDSTRB     ;CLEAR KEYBOARD STROBE
FD34:60         331             RTS
FD35:E6 62      332     KEYWAIT INC     TBAS4L      ;JUST KEEP COUNTING
FD37:D0 09      333             BNE     KWAIT2
FD39:E6 63      334             INC     TBAS4H
FD3B:A9 7F      335             LDA     #$7F        ;TEST FOR DONE
FD3D:18         336             CLC
FD3E:25 63      337             AND     TBAS4H
FD40:F0 05      338             BEQ     KEYRET      ;RETURN IF TIMED OUT
FD42:0E 00 C0   339     KWAIT2  ASL     KBD
FD45:90 EE      340             BCC     KEYWAIT
FD47:60         341     KEYRET  RTS
FD48:           342     *
FD48:           343     *
FD48:           344     ESC3    EQU     *
FD48:20 77 FD   345             JSR     GOESC
FD4B:A5 68      346     ESCAPE  LDA     MODES       ;SET TO + SIGN FOR CURSOR MOVES
FD4D:29 80      347             AND     #$80
FD4F:49 AB      348             EOR     #$AB
FD51:85 69      349             STA     CURSOR
FD53:20 0C FD   350     ESC1    JSR     RDKEY       ;READ NEXT CHARACTER
FD56:A0 08      351             LDY     #8          ;TEST FOR ESCAPE COMMAND
FD58:D9 F0 FF   352     ESC2    CMP     ESCTABL,Y
FD5B:F0 EB      353             BEQ     ESC3
FD5D:88         354             DEY
FD5E:10 F8      355             BPL     ESC2        ;LOOP TIL FOUND OR DONE
FD60:           356     *
FD60:A9 80      357     RDCHAR  LDA     #$80        ;GO READ A CHARACTER
FD62:25 68      358             AND     MODES
FD64:85 69      359             STA     CURSOR      ;SAVE STANDARD CURSOR
FD66:20 0C FD   360             JSR     RDKEY
FD69:C9 9B      361             CMP     #$9B        ;ESCAPE CHARACTER?
FD6B:F0 DE      362             BEQ     ESCAPE
FD6D:C9 95      363             CMP     #$95        ;FORWARD COPY?
FD6F:D0 D6      364             BNE     KEYRET
FD71:20 88 FD   365             JSR     PICK        ;GET CHARACTER FROM SCREEN
```

```
FD74:09 80      366              ORA   #$80        ;SET TO NORMAL ASCII
FD76:60         367              RTS
FD77:           368 *
FD77:A9 FB      369 GOESC  LDA   #<CLSCRN
FD79:48         370              PHA
FD7A:B9 7F FD   371              LDA   ESCVECT,Y
FD7D:48         372              PHA
FD7E:60         373              RTS
FD7F:           374 *
FD7F:8D         375 ESCVECT DFB  CLEOL-1
FD80:70         376              DFB   CLEOP-1
FD81:68         377              DFB   CLSCRN-1
FD82:4E         378              DFB   COL40-1
FD83:48         379              DFB   COL80-1
FD84:D8         380              DFB   CURLEFT-1
FD85:B6         381              DFB   CURIGHT-1
FD86:C8         382              DFB   CURDOWN-1
FD87:A3         383              DFB   CURUP-1
FD88:           384 *
FD88:A5 5C      385 PICK   LDA   CH          ;GET A CHARACTER AT CURRENT CURSOR POSITION
FD8A:4A         386              LSR   A           ;DETERMINE WHICH PAGE
FD8B:A8         387              TAY
FD8C:24 68      388              BIT   MODES       ;AND IF 80 COLUMN MODE
FD8E:50 05      389              BVC   PICK40      ;FORGET CARRY IF 40 COLUMNS
FD90:90 03      390              BCC   PICK40      ;GET CHARACTER FROM $400 PAGE
FD92:B1 60      391              LDA   (BAS8L),Y
FD94:60         392              RTS
FD95:B1 5E      393 PICK40 LDA   (BAS4L),Y
FD97:60         394              RTS
FD98:           395 *
FD98:           2   CLDSTRT EQU  *
FD98:A9 03      3               LDA   #$3
FD9A:8D D0 FF   4               STA   $FFD0        ;ZERO PAGE IS ON 3!
FD9D:           5   SETUP   EQU  *
FD9D:D8         6               CLD                ;OF COURSE!
FD9E:A2 03      7               LDX   #3
FDA0:86 7F      8               STX   INBUF+1
FDA2:BD BC FF   9   SETUP1  LDA  NMIRQ,X
FDA5:9D CA FF   10              STA   $FFCA,X
FDA8:BD B4 FF   11              LDA   HOOKS,X
FDAB:95 6E      12              STA   CSWL,X
FDAD:BD B8 FF   13              LDA   VBOUNDS,X
FDB0:95 58      14              STA   LMARGIN,X
FDB2:CA         15              DEX
FDB3:10 ED      16              BPL   SETUP1
FDB5:85 82      17              STA   IBDRVN
FDB7:A9 A0      18              LDA   #$A0         ;INPUT BUFFER AT $3A0
FDB9:85 7E      19              STA   INBUF
FDBB:A9 60      20              LDA   #$60
FDBD:85 81      21              STA   IBSLOT
FDBF:A9 FF      22              LDA   #$FF
FDC1:85 68      23              STA   MODES
FDC3:20 4F FB   24              JSR   COL40        ;SET 40 COLUMNS, CLEAR SCREEN
FDC6:           25 *
00A0:           27  ADR     EQU  $A0
00A0:           28  CPORTL  EQU  ADR
00A1:           29  CPORTH  EQU  ADR+1
00A2:           30  CTEMP   EQU  ADR+2
00A3:           31  CTEMP1  EQU  ADR+3
00A4:           32  YTEMP   EQU  ADR+4
00B4:           33  ROWTEMP EQU  ADR+20
C0DB:           34  CWRTON  EQU  $C0DB
C0DA:           35  CWRTOFF EQU  $C0DA
FFEC:           36  CREAD   EQU  $FFEC
FFED:           37  CWRITE  EQU  $FFED
FDC6:           38 *
FDC6:           39 *
FDC6:A9 78      40  GENENTR LDA  #$78         ;INIT SCREEN INDX LOCATIONS
FDC8:85 A0      41              STA   CPORTL
FDCA:A9 08      42              LDA   #$8
FDCC:85 A1      43              STA   CPORTH
```

```
FDCE:A9 F0       44              LDA     #240           ;SET UP INDEX TO CHRSET
FDD0:85 A4       45              STA     YTEMP
FDD2:A9 00       46              LDA     #0
FDD4:AA          47              TAX
FDD5:95 B4       48   ZIPTEMPS   STA     ROWTEMP,X
FDD7:E8          49              INX
FDD8:E0 20       50              CPX     #$20
FDDA:D0 F9       51              BNE     ZIPTEMPS
FDDC:A9 05       52              LDA     #5             ;FAKE THE FIRST BIT PATTERN
FDDE:18          53              CLC                    ;(PHANTOM 9TH BIT SHIFTED AS BIT 0)
FDDF:08          54              PHP
FDE0:48          55              PHA
FDE1:86 A2       56   GENASC     STX     CTEMP          ;GENERATE THE ASCII
FDE3:A0 07       57   GASCI1     LDY     #7             ;CODES FOR THE FIRST PASS
FDE5:A6 A2       58   GASCI2     LDX     CTEMP
FDE7:98          59   GASCI3     TYA
FDE8:91 A0       60              STA     (CPORTL),Y     ; $XXF=CHR 0 / 4
FDEA:E8          61              INX                    ; $XXE=CHR 1 / 5
FDEB:88          62              DEY                    ; $XXD=CHR 2 / 6
FDEC:30 04       63              BMI     GASCI4         ; $XXC=CHR 3 / 7
FDEE:C0 03       64              CPY     #$3            ; $XXB=CHR 0 / 4
FDF0:D0 F6       65              BNE     GASCI3         ; $XXA=CHR 1 / 5
FDF2:F0 F1       66              BEQ     GASCI2         ; $XX9=CHR 2 / 6
FDF4:20 99 FE    67   GASCI4     JSR     NXTPORT        ; $XX8=CHR 3
FDF7:B0 08       68              BCS     CBYTES         ;GO DECODE CHARACTER TABLE
FDF9:C9 0A       69              CMP     #$A            ;SECOND SET OF 4?
FDFB:D0 E6       70              BNE     GASCI1
FDFD:A0 24       71              LDY     #$24
FDFF:D0 E0       72              BNE     GENASC         ;BRANCH ALWAYS
FE01:68          73   CBYTES     PLA                    ;RESTORE BIT PATTERN
FE02:28          74              PLP
FE03:A2 17       75              LDX     #23            ;(4 CHARACTERS OF 6 ROWS)
FE05:A0 05       76   CCOLMS     LDY     #5             ;(FIVE COLUMNS)
FE07:36 B8       77   CSHFT      ROL     ROWTEMP+4,X    ;BREAK BYTES INTO
FE09:0A          78              ASL     A              ;5 BIT GROUPS
FE0A:D0 0E       79              BNE     SHFTCNT        ;BRANCH IF MORE BITS IN THIS BYTE
FE0C:84 A2       80              STY     CTEMP
FE0E:C6 A4       81              DEC     YTEMP          ;(NOTE: CARRY IS SET)
FE10:F0 16       82              BEQ     DONE           ;BRANCH IF ALL DONE
FE12:A4 A4       83              LDY     YTEMP          ;GET CHARACTER TABLE INDEX
FE14:B9 00 FC    84              LDA     CHRSET-1,Y
FE17:2A          85              ROL     A              ;(CARRY KEEPS BYTE NON-ZERO UNTIL ALL 8
FE18:A4 A2       86              LDY     CTEMP          ;RESTORE COLUMN COUNT    ARE SHIFTED)
FE1A:88          87   SHFTCNT    DEY                    ;GOT ALL FIVE BITS?
FE1B:D0 EA       88              BNE     CSHFT          ;NO, DO NEXT
FE1D:CA          89              DEX                    ;ALL ROWS DONE?
FE1E:10 E5       90              BPL     CCOLMS         ;NO, DO NEXT
FE20:08          91              PHP                    ;SAVE REMAINING BIT PATTERN AND CARRY
FE21:48          92              PHA
FE22:20 28 FE    93              JSR     STORCHRS       ;MOVE EM TO NON DISPLAYED VIDEO AREA
FE25:4C 01 FE    94              JMP     CBYTES
FE28             95   *
FE28             96   DONE       EQU     *
FE28:A2 1F       97   STORCHRS   LDX     #$1F           ;MOVE CHARACTER PATTERNS TO VIDEO AREA
FE2A:A0 00       98   STORSET    LDY     #0
FE2C:B5 B4       99   STOROW     LDA     ROWTEMP,X
FE2E:0A          100             ASL     A              ;SHIFT TO CENTER
FE2F:29 3E       101             AND     #$3E           ;STRIP EXTRA GARBAGE
FE31:91 A0       102             STA     (CPORTL),Y
FE33:CA          103             DEX
FE34:C8          104             INY
FE35:C0 08       105             CPY     #$8            ;THIS GROUP DONE?
FE37:D0 F3       106             BNE     STOROW         ;NO, NEXT ROW
FE39:20 99 FE    107             JSR     NXTPORT
FE3C:C9 08       108             CMP     #$8
FE3E:F0 04       109             BEQ     GENDONE        ;ALL ROWS STORED?
FE40:8A          110             TYA
FE41:10 E7       111             BPL     STORSET
FE43:60          112             RTS                    ;PARTIAL SET ($478-$5FF)
FE44             113  *
```

```
FE44:A9 01       114 GENDONE LDA  #1           ;SET NORMAL MODE
FE46:85 A2       115          STA  CTEMP
FE48:A9 60       116 GEN1    LDA  #$60         ;PREPARE TO SEND BYTES TO CHARACTER
FE4A:2C DB C0    117          BIT  CWRTON       ; GENERATOR RAM
FE4D:20 AE FE    118          JSR  VRETRCE      ;WAIT FOR NEXT VERTICAL RETRACE
FE50:A9 20       119          LDA  #$20         ;WAIT AGAIN
FE52:20 AE FE    120          JSR  VRETRCE
FE55:2C DA C0    121          BIT  CWRTOFF      ;CHARACTERS ARE NOW LOADED
FE58:20 88 FE    122          JSR  ALTCHR       ;REPEAT THIS SET FOR OTHER 64 CHARACTERS
FE5B:C6 A2       123          DEC  CTEMP        ;HAVE WE DONE ALTERNATES YET?
FE5D:10 16       124          BPL  GEN2         ;NO, DO IT!
FE5F:A9 08       125          LDA  #$8          ;BUMP ASCII VALUES FOR NEXT SET
FE61:85 A1       126          STA  CPORTH
FE63:A0 07       127 NXTASCI LDY  #7           ;THE USUAL COUNTDOWN
FE65:B1 A0       128 NXTASC2 LDA  (CPORTL),Y
FE67:18          129          CLC
FE68:69 08       130          ADC  #$8
FE6A:91 A0       131          STA  (CPORTL),Y
FE6C:88          132          DEY
FE6D:10 F6       133          BPL  NXTASC2
FE6F:20 99 FE    134          JSR  NXTPORT
FE72:90 EF       135          BCC  NXTASCI
FE74:60          136          RTS
FE75:A0 03       137 GEN2    LDY  #$3          ;SETUP ALTERNATE WITH UNDERLINES
FE77:A9 7F       138          LDA  #$7F
FE79:99 FC 05    139 UNDER   STA  $5FC,Y
FE7C:99 FC 07    140          STA  $7FC,Y
FE7F:88          141          DEY
FE80:10 F7       142          BPL  UNDER
FE82:A9 08       143          LDA  #$8
FE84:85 A1       144          STA  CPORTH
FE86:D0 C0       145          BNE  GEN1
FE88:            146 *
FE88:A0 07       147 ALTCHR  LDY  #7           ;ADJUST ASCII FOR ALTERNATE SET
FE8A:B1 A0       148 ALTC1   LDA  (CPORTL),Y
FE8C:49 20       149          EOR  #$20         ;$20-->0  $40-->$60
FE8E:91 A0       150          STA  (CPORTL),Y
FE90:88          151          DEY
FE91:10 F7       152          BPL  ALTC1        ;ADJUST THEM ALL
FE93:20 99 FE    153          JSR  NXTPORT
FE96:90 F0       154          BCC  ALTCHR
FE98:60          155          RTS
FE99:            156 *
FE99:A5 A0       157 NXTPORT LDA  CPORTL       ;CONVERT $78->$F8 OR $F8-$78
FE9B:49 80       158          EOR  #$80
FE9D:85 A0       159          STA  CPORTL
FE9F:30 02       160          BMI  NOHIGH
FEA1:E6 A1       161          INC  CPORTH       ;IF =C THEN =4
FEA3:A5 A1       162 NOHIGH  LDA  CPORTH
FEA5:C9 0C       163          CMP  #$C
FEA7:D0 04       164          BNE  PORTDN
FEA9:A9 04       165          LDA  #$4
FEAB:85 A1       166          STA  CPORTH
FEAD:60          167 PORTDN  RTS
FEAE:            168 *
FEAE:            169 *
FEAE:85 A3       170 VRETRCE STA  CTEMP1       ;SAVE BITS TO BE STORED
FEB0:AD EC FF    171          LDA  CB2CTRL      ;CONTROL PORT FOR 'CB2'
FEB3:29 3F       172          AND  #$3F         ;RESET HI BITS TO 0
FEB5:05 A3       173          ORA  CTEMP1
FEB7:8D EC FF    174          STA  CB2CTRL
FEBA:A9 08       175          LDA  #$8          ;TEST VERTICAL RETRACE
FEBC:8D ED FF    176          STA  CB2INT
FEBF:2C ED FF    177 VWAIT   BIT  CB2INT       ;WAIT FOR RETRACE
FEC2:F0 FB       178          BEQ  VWAIT
FEC4:60          179          RTS
FEC5:            180 *
FEC5:            181 CHRSET  EQU  *
```

```
FEC5: F0 01 82    182        DFB    $F0,$01,$82,$18
FEC8: 18
FEC9: 40 84 81    183        DFB    $40,$84,$81,$2F
FECC: 2F
FECD: 58 44 81    184        DFB    $58,$44,$81,$29
FED0: 29
FED1: 02 1E 01   185        DFB    $02,$1E,$01,$91
FED4: 91
FED5: 7C 1F 49    186        DFB    $7C,$1F,$49,$30
FED8: 30
FED9: 8A 08 43   187        DFB    $8A,$08,$43,$14
FEDC: 14
FEDD: 31 2A 22   188        DFB    $31,$2A,$22,$13
FEE0: 13
FEE1: E3 F7 C4    189        DFB    $E3,$F7,$C4,$91
FEE4: 91
FEE5: 48 A2 DA    190        DFB    $48,$A2,$DA,$24
FEE8: 24
FEE9: C6 4A 62    191        DFB    $C6,$4A,$62,$8C
FEEC: 8C
FEED: 24 C6 F8    192        DFB    $24,$C6,$F8,$63
FEF0: 63
FEF1: 8C C1 46    193        DFB    $8C,$C1,$46,$17
FEF4: 17
FEF5: 52 8A AF    194        DFB    $52,$8A,$AF,$16
FEF8: 16
FEF9: 14 E3 33    195        DFB    $14,$E3,$33,$31
FEFC: 31
FEFD: C6 F8 DC    196        DFB    $C6,$F8,$DC,$73
FF00: 73
FF01: 3F 46 17    197        DFB    $3F,$46,$17,$62
FF04: 62
FF05: 8C 21 E6    198        DFB    $8C,$21,$E6,$18
FF08: 18
FF09: 6A 8D 61    199        DFB    $6A,$8D,$61,$CF
FF0C: CF
FF0D: 18 62 74    200        DFB    $18,$62,$74,$D1
FF10: D1
FF11: B9 18 49    201        DFB    $B9,$18,$49,$4C
FF14: 4C
FF15: 91 C0 F3    202        DFB    $91,$C0,$F3,$09
FF18: 09
FF19: 2C 91 C0    203        DFB    $2C,$91,$C0,$14
FF1C: 14
FF1D: 1D 8C EF    204        DFB    $1D,$8C,$EF,$07
FF20: 07
FF21: 17 43 88    205        DFB    $17,$43,$88,$31
FF24: 31
FF25: 84 1E DF    206        DFB    $84,$1E,$DF,$0B
FF28: 0B
FF29: 31 84 F8    207        DFB    $31,$84,$F8,$FE
FF2C: FE
FF2D: 77 3E 3E    208        DFB    $77,$3E,$3E,$17
FF30: 17
FF31: 62 8C FD    209        DFB    $62,$8C,$FD,$C7
FF34: C7
FF35: 50 E3 0B    210        DFB    $50,$E3,$0B,$51
```

```
FF38 51
FF39 C5 E8 08    211        DFB    $C5,$E8,$08,$73
FF3C 73
FF3D 18 0C 42    212        DFB    $18,$0C,$42,$3E
FF40 3E
FF41 01 02 20    213        DFB    $01,$02,$20,$42
FF44 42
FF45 3E 41 18    214        DFB    $3E,$41,$18,$8C
FF48 8C
FF49 08 00 70    215        DFB    $08,$00,$70,$EE
FF4C EE
FF4D 00 11 11    216        DFB    $00,$11,$11,$21
FF50 21
FF51 11 02 60    217        DFB    $11,$02,$60,$30
FF54 30
FF55 21 31 02    218        DFB    $21,$31,$02,$E0
FF58 E0
FF59 1C 00 C8    219        DFB    $1C,$00,$C8,$B9
FF5C B9
FF5D 80 62 14    220        DFB    $80,$62,$14,$1F
FF60:1F
FF61:46 A2 DE    221        DFB    $46,$A2,$DE,$43
FF64,43
FF65 2C 04 8B    222        DFB    $2C,$04,$8B,$BE
FF68.BE
FF69 FF CE 7D    223        DFB    $FF,$CE,$7D,$37
FF6C 37
FF6D 49 8B 95    224        DFB    $49,$8B,$95,$18
FF70 18
FF71 98 09 62    225        DFB    $98,$09,$62,$D1
FF74 D1
FF75 44 E8 88    226        DFB    $44,$E8,$88,$FB
FF78 FB
FF79 02 90 40    227        DFB    $02,$90,$40,$00
FF7C 00
FF7D 10 E0 03    228        DFB    $10,$E0,$03,$02
FF80 02
FF81 00 40 00    229        DFB    $00,$40,$00,$00
FF84 00
FF85 08 00 00    230        DFB    $08,$00,$00,$28
FF88 28
FF89 10 42 44    231        DFB    $10,$42,$44,$25
FF8C 25
FF8D 82 B8 2F    232        DFB    $82,$B8,$2F,$48
FF90:48
FF91:25 44 10    233        DFB    $25,$44,$10,$82
FF94:82
FF95 02 00 2F    234        DFB    $02,$00,$2F,$5A
FF98 5A
FF99:40 45 02    235        DFB    $40,$45,$02,$8E
FF9C:8E
FF9D 64 50 90    236        DFB    $64,$50,$90,$01
FFA0:01
FFA1 3E 26 42    237        DFB    $3E,$26,$42,$80
FFA4 80
FFA5:21 80 00    238        DFB    $21,$80,$00,$05
FFA8:05
FFA9:00 F8 80    239        DFB    $00,$F8,$80,$00
FFAC:00
FFAD:05 08 F8    240        DFB    $05,$08,$F8,$80
FFB0.80
FFB1:28 05 88   241        DFB    $28,$05,$88
FFB4:          242 *
FFB4:          243 HOOKS  EQU    *
FFB4:F2 FB    244        DW     COUT2
FFB6:0F FD    245        DW     KEYIN
FFB8:         246 *
```

```
FFB8.            247 VBOUNDS EGU    *
FFB8: 00 50 00   248          DFB   $0,$50,0,$18
FFBB: 18
FFBC             249 *
FFBC: 4C 89 F6   250 NMIRQ    JMP   RECON      ;IN DIAGNOSTICS
FFBF: 40         251          RTI
FFC0: C3 CF D0   252          ASC   'COPYRIGHT JANUARY, 1980 APPLE COMPUTER INC..JRH'
FFC3: D9 D2 C9
FFC6: C7 C8 D4
FFC9: A0 CA C1
FFCC: CE D5 C1
FFCF: D2 D9 AC
FFD2: A0 B1 B9
FFD5: B8 B0 A0
FFD8: A0 C1 D0
FFDB: D0 CC C5
FFDE: A0 C3 CF
FFE1: CD D0 D5
FFE4: D4 C5 D2
FFE7: A0 C9 CE
FFEA: C3 AE AE
FFED: CA D2 C8
FFF0             253          CHN   MONVECT
FFF0:              1 *
FFF0: CC           2 ESCTABL  DFB   $CC
FFF1: D0           3          DFB   $D0
FFF2: D3           4          DFB   $D3
FFF3: B4           5          DFB   $B4
FFF4: B8           6          DFB   $B8
FFF5: 88           7          DFB   $88
FFF6: 95           8          DFB   $95
FFF7: 8A           9          DFB   $8A
FFF8: 8B          10          DFB   $8B
FFF9: 00          11          DFB   $00        ;NOTHING
FFFA             12 *
FFFA: CA FF      13 NMI       DW    $FFCA
FFFC: EE F4      14 RESET     DW    DIAGN      ;FIRST DIAGNOSTICS
FFFE: CD FF      15 IRQ       DW    $FFCD
0000             16 *

*** SUCCESSFUL ASSEMBLY: NO ERRORS
   75 A1H            74 A1L           F9D4 A1PC          F9D7 A1PC1
   77 A2H            76 A2L            79 A3H             78 A3L
   7B A4H            7A A4L            A0 ADR            FE8A ALTC1
 FE8B ALTCHR       FB2C ASC1         FB38 ASC2          FB46 ASC3
 FA06 ASCDONE      FA09 ASCII0       F9DF ASCII1        F9E1 ASCII2
 FA07 ASCII        F9F2 ASCII3         5F BAS4H           5E BAS4L
   61 BAS8H          60 BAS8L         FC05 BASCALC1     ?FBB3 BASCALC
 FC3D BELL1        FC3E BELL2        FC43 BELL3         FC3A BELL
 FA15 BITOFF       FA11 BITON          67 BKGND         FCDE BKSPCE
 FAA0 BL1          F479 BLOCK1D      FC19 BSCLC2        FCCD CANCEL
?FB9B CARRAGE      FFEC CB2CTRL      FFED CB2INT        FE01 CBYTES
 FE05 CCOLMS         5C CH           FEC5 CHRSET       ?FA0A CKMDE
?FD98 CLDSTRT      FC89 CLEOL1       FB8E CLEOL         FC91 CLEOL2
 FB71 CLEOP        FB7A CLEOP1       FB69 CLSCRN        F91C CMDSRCH
 F96C CMDTAB       F97C CMDVEC       FB4F COL40         FB49 COL80
 FB93 CONTROL      FC33 COUT1        FBF2 COUT2         FC25 COUT
   A1 CPORTH          A0 CPORTL      F9FB CRCHK         FA26 CRMON
 FCEF CROUT        FE07 CSHFT        ?  6F CSWH           6E CSWL
   A3 CTEMP1          A2 CTEMP       FC24 CTRLRET       FBB3 CURDN1
 FBC9 CURDOWN      FBB7 CURIGHT      FBD9 CURLEFT         69 CURSOR
```

| | | | |
|---|---|---|---|
| FBAE CURUP1 | FBA4 CURUP | 5D CV | CODA CWRTOFF |
| CODB CWRTON | FA91 DEST | F4EE DIAGN | F941 DIGIT |
| F96B DIGRET | FBFC DISPLAYX | FC9D DISPLAY | FE28 DONE |
| FCAA DSPBKGND | FCAD DSPL80 | FAB7 DUMMY | FAFC DUMP0 |
| FB09 DUMP1 | FB0C DUMP2 | FB1C DUMP3 | FAE9 DUMP8 |
| FB21 DUMPASC | ?FAF9 DUMP | ?F901 ENTRY | FA8B ERROR2 |
| FA8E ERROR | FAF7 ERROR1 | ?FD53 ESC1 | FD58 ESC2 |
| FD48 ESC3 | FD4B ESCAPE | FFF0 ESCTABL | FD7F ESCVECT |
| 66 FORGND | FDE3 GASCI1 | FDE5 GASCI2 | FDE7 GASCI3 |
| FDF4 GASCI4 | FE48 GEN1 | FE75 GEN2 | FDE1 GENASC |
| FE44 GENDONE | ?FDC6 GENENTR | FCD5 GETLN | FCD5 GETLNZ |
| F92C GETNUM | FD77 GOESC | FA7D GO | FFB4 HOOKS |
| 85 IBBUFP | 87 IBCMD | 82 IBDRVN | 81 IBSLOT |
| 50 INBUFLEN | 7E INBUF | ?FBFF INCHORZ | ?FFFE IRQ |
| FA7D JUMP | C010 KBDSTRB | C000 KBD | FD16 KEYIN1 |
| FD24 KEYIN2 | FD2E KEYIN3 | ?FD31 KEYIN4 | FD0F KEYIN |
| FD47 KEYRET | FD35 KEYWAIT | ? 71 KSWH | 70 KSWL |
| FD42 KWAIT2 | FC87 LASTLN | FBDF LEFT80 | FBE9 LEFTUP |
| 58 LMARGIN | FC52 LNFD | 69 MASK | FA52 MISMATCH |
| 68 MODES | F904 MON | F908 MONZ | FA2C MOVE |
| FA31 MOVNXT | FFBC NMIRQ | ?FFFA NMI | FEA3 NOHIGH |
| FD07 NOSTOP | FCB8 NOTCR | FADF NOVER | F992 NXTA1 |
| F98C NXTA4 | FE65 NXTASC2 | FE63 NXTASCI | F94F NXTBAS |
| F947 NXTBIT | F959 NXTBS2 | FCE4 NXTCHAR | F932 NXTCHR |
| F915 NXTINP | FC02 NXTLIN | FE99 NXTPORT | F9DE OLDPC |
| ? 73 PCH | 72 PCL | FD95 PICK40 | FD88 PICK |
| FEAD PORTDN | FA6E PRA1BYTE | F9C2 PRBYCOL | F9AC PRBYTE |
| FA70 PRBYTSP | ?F9C5 PRCOLON | F9BF PRHEX2 | F9B7 PRHEXZ |
| ?F9B5 PRHEX | FA61 PRINTA1 | 6D PROMPT | FA73 PRSPC |
| FD60 RDCHAR | FD0C RDKEY | FAC0 READ | F689 RECON |
| FA19 REPEAT | FA21 REPEAT1 | ?FFFC RESET | F7FF RET1 |
| F900 RET2 | F882 RET3 | F9AB RETA1 | FBBD RIGHT1 |
| 59 RMARGIN | B4 ROWTEMP | FA83 RWERROR | FAC7 RWLOOP |
| ?FAC5 SAVCMD | F912 SCAN | FC61 SCRL1 | FC63 SCRL2 |
| FC7A SCRL3 | 58 SCRNLOC | FC5B SCROLL | FA9A SEP |
| FB5B SET80A | FB53 SET80 | FB67 SET80B | FBC3 SETCHZ |
| FBB1 SETCV | ?FBC7 SETCVH | FADD SETMDZ | FAB8 SETMODE |
| ?FD9D SETUP | FDA2 SETUP1 | FE1A SHFTCNT | FAA4 SPCE |
| 6A STACK | 7C STATE | FD02 STOPLST | FAAF STOR1 |
| FE28 STORCHRS | FE2C STOROW | FE2A STORSET | ?FAAB STOR |
| F9D1 SVMASK | 63 TBAS4H | 62 TBAS4L | ? 65 TBAS8H |
| 64 TBAS8L | 6C TEMPX | 80 TEMP | 6D TEMPY |
| F95E TOSUB | F9C9 TST80WID | F99B TSTA1 | FBD5 TSTBACK |
| FC36 TSTBELL | ?FB97 TSTCR | FAF6 TSTDUMP | FE79 UNDER |
| 03F8 USERADR | FA78 USER | FFB8 VBOUNDS | FEAE VRETRCE |
| FA4C VRFY2 | FA3D VRFY | FA40 VRFY1 | FEBF VWAIT |
| 5B WINBTM | 5A WINTOP | FAC3 WRTE | 7D YSAV |
| 64 YTEMP | FDD5 ZIPTEMPS | F967 ZSTATE | |
| 50 INBUFLEN | 58 SCRNLOC | 58 LMARGIN | 59 RMARGIN |
| 5A WINTOP | 5B WINBTM | 5C CH | 5D CV |
| 5E BAS4L | 5F BAS4H | 60 BAS8L | 61 BAS8H |
| 62 TBAS4L | 63 TBAS4H | 64 TBAS8L | ? 65 TBAS8H |
| 66 FORGND | 67 BKGND | 68 MODES | 69 MASK |
| 69 CURSOR | 6A STACK | 6B PROMPT | 6C TEMPX |
| 6D TEMPY | 6E CSWL | ? 6F CSWH | 70 KSWL |
| ? 71 KSWH | 72 PCL | ? 73 PCH | 74 A1L |
| 75 A1H | 76 A2L | 77 A2H | 78 A3L |
| 79 A3H | 7A A4L | 7B A4H | 7C STATE |
| 7D YSAV | 7E INBUF | 80 TEMP | 81 IBSLOT |
| 82 IBDRVN | 85 IBBUFP | 87 IBCMD | A0 CPORTL |
| A0 ADR | A1 CPORTH | A2 CTEMP | A3 CTEMP1 |
| A4 YTEMP | B4 ROWTEMP | 03F8 USERADR | C000 KBD |
| C010 KBDSTRB | C0DA CWRTOFF | C0DB CWRTON | F479 BLOCKIO |
| F4EE DIAGN | F689 RECON | F7FF RET1 | F882 RET3 |
| F900 RET2 | ?F901 ENTRY | F904 MON | F908 MONZ |

| | | | |
|---|---|---|---|
| F912 SCAN | F915 NXTINP | F91C CMDSRCH | F92C GETNUM |
| F932 NXTCHR | F941 DIGIT | F947 NXTBIT | F94F NXTBAS |
| F959 NXTBS2 | F95E TOSUB | F967 ZSTATE | F96B DIGRET |
| F96C CMDTAB | F97C CMDVEC | F98C NXTA4 | F992 NXTA1 |
| F99B TSTA1 | F9AB RETA1 | F9AC PRBYTE | ?F9B5 PRHEX |
| F9B7 PRHEX2 | F9BF PRHEX2 | F9C2 PRBYCOL | ?F9C5 PRCOLON |
| F9C9 TST80WID | F9D1 SVMASK | F9D4 A1PC | F9D7 A1PC1 |
| F9DE OLDPC | F9DF ASCII1 | F9E1 ASCII2 | F9F2 ASCII3 |
| F9FB CRCHK | FA06 ASCDONE | FA07 ASCII | FA09 ASCII0 |
| ?FA0A CKMDE | FA11 BITON | FA15 BITOFF | FA19 REPEAT |
| FA21 REPEAT1 | FA26 CRMON | FA2C MOVE | FA31 MOVNXT |
| FA3B VRFY | FA40 VRFY1 | FA4C VRFY2 | FA52 MISMATCH |
| FA61 PRINTA1 | FA6E PRA1BYTE | FA70 PRBYTSP | FA73 PRSPC |
| FA78 USER | FA7B JUMP | FA7D GO | FA83 RWERROR |
| FA8B ERROR2 | FA8E ERROR | FA91 DEST | FA9A SEP |
| FAA0 BL1 | FAA4 SPCE | ?FAA8 STOR | FAAF STOR1 |
| FAB7 DUMMY | FAB8 SETMODE | FABD SETMDZ | FAC0 READ |
| FAC3 WRTE | ?FAC5 SAVCMD | FAC7 RWLOOP | FADF NOVER |
| FAE9 DUMP8 | FAF6 TSTDUMP | FAF7 ERROR1 | ?FAF9 DUMP |
| FAFC DUMP0 | FB09 DUMP1 | FB0C DUMP2 | FB1C DUMP3 |
| FB21 DUMPASC | FB2C ASC1 | FB35 ASC2 | FB46 ASC3 |
| FB49 COL80 | FB4F COL40 | FB53 SET80 | FB5B SET80A |
| FB67 SET80B | FB69 CLSCRN | FB71 CLEOP | FB7A CLEOP1 |
| FB8E CLEOL | FB93 CONTROL | ?FB97 TSTCR | ?FB9B CARRAGE |
| FBA4 CURUP | FBAE CURUP1 | FBB1 SETCV | FBB3 CURDN1 |
| ?FBB3 BASCALC | FBB7 CURIGHT | FBBD RIGHT1 | FBC3 SETCH2 |
| ?FBC7 SETCVH | FBC9 CURDOWN | FBD5 TSTBACK | FBD9 CURLEFT |
| FBDF LEFT80 | FBE9 LEFTUP | FBF2 COUT2 | FBFC DISPLAYX |
| ?FBFF INCHORZ | FC02 NXTLIN | FC05 BASCALC1 | FC19 BSCLC2 |
| FC24 CTRLRET | FC25 COUT | FC33 COUT1 | FC36 TSTBELL |
| FC3A BELL | FC3D BELL1 | FC3E BELL2 | FC43 BELL3 |
| FC52 LNFD | FC5B SCROLL | FC61 SCRL1 | FC65 SCRL2 |
| FC7A SCRL3 | FC87 LASTLN | FC89 CLEOL1 | FC91 CLEOL2 |
| FC9D DISPLAY | FCAA DSPBKGND | FCAD DSPL80 | FCB8 MOTOR |
| FCCD CANCEL | FCD5 GETLN | FCD5 GETLNZ | FCDE BKSPCE |
| FCE4 NXTCHAR | FCEF CROUT | FD02 STOPLST | FD07 NOSTOP |
| FD0C RDKEY | FD0F KEYIN | FD16 KEYIN1 | FD24 KEYIN2 |
| FD2E KEYIN3 | ?FD31 KEYIN4 | FD35 KEYWAIT | FD42 KWAIT2 |
| FD47 KEYRET | FD48 ESC3 | FD4B ESCAPE | ?FD53 ESC1 |
| FD58 ESC2 | FD60 RDCHAR | FD77 GOESC | FD7F ESCVECT |
| FD68 PICK | FD95 PICK40 | ?FD98 CLDSTRT | ?FD9D SETUP |
| FDA2 SETUP1 | ?FDC6 GENENTR | FDD5 ZIPTEMPS | FDE1 GENASC |
| FDE3 GASCI1 | FDE5 GASCI3 | FDE7 GASCI3 | FDF4 GASCI4 |
| FE01 CBYTES | FE05 CCOLMS | FE07 CSHFT | FE1A SHFTCNT |
| FE28 DONE | FE2B STORCHRS | FE2A STORSET | FE2C STOROW |
| FE44 GENDONE | FE48 GEN1 | FE63 NXTASCI | FE65 NXTASC2 |
| FE75 GEN2 | FE79 UNDER | FE88 ALTCHR | FE8A ALTC1 |
| FE99 NXTPORT | FEA3 NOHIGH | FEAD PORTDN | FEAE VRETRCE |
| FEBF VWAIT | FEC5 CHRSET | FFB4 HOOKS | FFB8 VBOUNDS |
| FFBC NMIRG | FFEC CB2CTRL | FFED CB2INT | FFF0 ESCTABL |
| ?FFFA NMI | ?FFFC RESET | ?FFFE IRQ | |

I claim:

1. In a digital computer which includes a central processing unit (CPU), a random-access memory (RAM), an address bus interconnecting said CPU and RAM such that said CPU addresses locations in said RAM and a data bus interconnecting said CPU and RAM, said CPU for certain functions addressing predetermined locations in said RAM with a predetermined range of address signals, an improvement comprising:
   detection means for detecting said predetermined range of address signals, coupled to said address bus;
   register means for storing digital signals, coupled to said data bus, and;
   switching means for coupling said digital signals stored in said register means to said address bus when said detection means detects said predetermined range of said address signals;
   whereby data for said certain functions normally stored by said CPU in said predetermined locations may be stored elsewhere in said RAM, thereby enhancing the performance of said computer.

2. The improvement defined by claim 2 wherein said detection means detects all binary zeros.

3. The improvement defined by claim 1 wherein said switching means comprises a multiplexer controlled by said detection means for selecting said register means.

4. The improvement defined by claim 1 including a read-only memory coupled to said address bus and said data bus.

5. The improvement defined by claim 4 wherein said stored signals in said register means provide a pointer for locations in said RAM during a direct memory access transfer.

6. The improvement defined by claim 5 wherein said read-only memory in response to signals on said address bus provides instructions to said CPU causing it to increment address signals during said direct memory access transfer.

7. In a digital computer which includes a central processing unit (CPU), a random-access memory (RAM), an address bus having a first plurality and a second plurality of lines for coupling said CPU with said RAM, and a data bus interconnecting said CPU and RAM, said CPU for certain operations addressing predetermined locations in said RAM with address signals on said first plurality of lines by coupling a predetermined address on said second plurality of lines, an improvement comprising:
   register means for storing signals, coupled to said data bus;
   multiplexing means coupled to said second plurality of lines and said register means for selecting signals from one of said second plurality of lines and said register means;
   logic means coupled to said second plurality of lines and said multiplexing means for causing said multiplexing means to select signals from said register means when said CPU couples said predetermined address on said second plurality of lines;
   whereby said signals from said register means provide alternate locations in RAM for storage associated with said certain operations.

8. The improvement defined by claim 7 wherein said predetermined address is all binary zeros.

9. The improvement defined by claim 7 including a read-only memory coupled to said address bus and said data bus.

10. The improvement defined by claim 8 wherein said stored signal in said register means provides a pointer for locations in said RAM during a direct memory access transfer.

11. The improvement defined by claim 9 wherein said read-only memory in response to signals on said address bus provides instructions to said CPU causing it to increment address signals during said direct memory access transfer.

12. In a digital processor used in conjunction with a display, said processor including a data bus and an address bus, a memory comprising:
   a first plurality of memory devices for storing data, coupled to receive data from said data bus;
   a first memory output bus coupled to receive data from said first plurality of memory device;
   a second plurality of memory devices for storing data coupled to receive data from said data bus;
   a second memory output bus coupled to receive data from said second plurality of memory devices;
   addressing means coupled to said address bus for providing address signal for addressing said first and second plurality of memory devices;
   first switching means for selecting data from one of said first and second memory buses for coupling to said data bus, said first switching means coupled to said first and second memory bus and said data bus;
   second switching means for selecting data from said first and second memory buses for coupling to said display, said second switching means coupled to said first and second memory buses and said display; and,
   circuit means for coupling one of a selected said first and second memory buses to said addressing means such that data from said selected one of said buses provides addressing information for selecting subsequent locations in said memory devices when said data bus is receiving data from the other of said memory buses,
   whereby said memory provides data for a high resolution display and whereby some data stored in said memory is used for remapping locations in said memory.

13. The memory defined by claim 12 wherein said circuit means comprises a multiplexer, said multiplexer selecting between said data from said selected one of said buses and bank switching signals coupled to said multiplexer.

14. The memory defined by claim 13 wherein said multiplexer is controlled by a logic circuit which is coupled to said address bus and said selected one of said buses.

15. The memory defined by claim 14 wherein said logic circuit causes said multiplexer to select said bank switching signals each time said processor switches an OP code.

16. In a digital computer with a memory, which is used in conjunction with a raster scanned display, said display including a digital counter which provides a vertical count representative of the horizontal line scanned by the beam for said display, said memory providing data for displaying rows of characters, an addressing means coupled to said memory for scrolling displayed characters, comprising:
- an adder having a first and a second input terminal, the output of said adder providing a portion of an address signal for said memory, said first terminal of said adder being coupled to receive the lesser significant bits of said vertical count;
- said computer providing a periodically repeated sequence of digital numbers coupled to said second terminal of said adder, said sequence of digital numbers provided by said computer having a maximum value equal to the number of scanned lines in each of said rows,
- whereby the characters on said display are scrolled with a minimum of movement of data within said memory.

17. The addressing means defined by claim 16 wherein said sequence of digital numbers is incremented for each displayed frame.

18. In a ditital computer which includes a single chip central processing unit (CPU), a random-access memory (RAM), an address bus interconnecting said CPU and RAM such that said CPU addresses locations in said RAM, and a data bus coupled to said CPU and RAM, said CPU for certain functions addressing the zero page in said RAM by providing binary zeroes on certain lines of said address bus; an improvement comprising:
- a detection circuit for detecting said binary zeroes on said certain lines of said address bus;
- a register for storing digital signals, said register coupled to said data bus for receiving digital signals from said data bus; and,
- a multiplexer for selecting between said digital signals stored in said register and said certain lines of said address bus, said multiplexer being controlled by said detection circuit so as to select said register when said binary zeroes are detected on said certain lines of said address bus;
- whereby data for said certain functions normally stored on page one of said RAM, may be stored elsewhere in said RAM, and still easily addressed by said CPU.

19. The improvement defined by claim 18 wherein one of said stored signals from said register is coupled to said multiplexer through an exclusive OR gate, said gate being coupled to one of said certain lines of said address bus.

20. The improvement defined by claim 18 or 19 wherein said computer provides an alternate stack signal and wherein said detection circuit also detects addresses for page one on said address bus, and said multiplexer selects said register if said page one addresses are detected and said alternate stack signal is in a predetermined state.

21. In a digital computer which includes a central processing unit (CPU), a random-access memory (RAM), an address bus interconnecting said CPU and RAM such that said CPU addresses locations in said RAM and a data bus interconnecting said CPU and RAM, said CPU for certain functions addressing predetermined locations in said RAM with a predetermined range of address signals, an improvement comprising:
- detection means for detecting said predetermined range of address signals, coupled to said address bus;
- register means for storing digital signals, coupled to said data bus, and;
- switching means for coupling said digital signals stored in said register means to said address bus when said detection means detects said predetermined range of said address signals, said switching means also for coupling said digital signals stored in said register means to said address bus when a certain direct memory access (DMA) signal is in a predetermined state;
- a read-only memory (ROM) coupled between said address bus and said data bus, said ROM in response to signals on said address bus providing instructions to said CPU on said data bus to cause said CPU to increment address signals when said DMA signal is in said predetermined state;
- said register providing a pointer for locations in said RAM when said DMA signal is in said predetermined state, and said register providing RAM address signals when said certain functions are selected by said CPU,
- whereby data for said certain functions normally stored by said CPU in said predetermined locations may be stored elsewhere in said RAM, thereby enhancing the performance of said computer.

22. The improvement defined by claim 21 wherein said switching means comprise a multiplexer which selects said register when said detection means detects all binary zeroes or when said DMA signal is in said predetermined state.

* * * * *